United States Patent
Goodson

(10) Patent No.: US 9,093,832 B2
(45) Date of Patent: Jul. 28, 2015

(54) ELECTRICAL WIRING SYSTEM AND METHOD

(71) Applicant: Mark E. Goodson, Corinth, TX (US)

(72) Inventor: Mark E. Goodson, Corinth, TX (US)

(73) Assignee: 4G1D HOLDCO LLC, Carrollton, TX (US)

(*) Notice: Subject to any disclaimer, the term of this patent is extended or adjusted under 35 U.S.C. 154(b) by 0 days.

(21) Appl. No.: 14/619,755

(22) Filed: Feb. 11, 2015

(65) Prior Publication Data
US 2015/0155695 A1    Jun. 4, 2015

Related U.S. Application Data

(63) Continuation-in-part of application No. 13/455,686, filed on Apr. 25, 2012.

(51) Int. Cl.
| | |
|---|---|
| *H01C 7/12* | (2006.01) |
| *H02H 1/00* | (2006.01) |
| *H02H 1/04* | (2006.01) |
| *H02H 3/22* | (2006.01) |
| *H02H 9/06* | (2006.01) |
| *H02G 13/00* | (2006.01) |
| *H02H 7/20* | (2006.01) |

(52) U.S. Cl.
CPC ..................... *H02G 13/80* (2013.01)

(58) Field of Classification Search
USPC ......................................................... 361/118
See application file for complete search history.

(56) References Cited

U.S. PATENT DOCUMENTS

| | | | |
|---|---|---|---|
| 2,864,036 A | 12/1958 | Steiner | |
| 4,751,603 A | 6/1988 | Kwan | |
| 5,329,065 A | 7/1994 | Marney et al. | |
| 5,418,332 A | 5/1995 | Moncrieff | |
| 5,781,394 A * | 7/1998 | Lorenz et al. | 361/124 |
| 6,094,128 A * | 7/2000 | Bennett et al. | 338/21 |
| 6,188,557 B1 * | 2/2001 | Chaudhry | 361/111 |
| 6,292,337 B1 | 9/2001 | Legatti et al. | |
| 7,307,211 B1 | 12/2007 | Caccia | |
| 7,417,841 B2 * | 8/2008 | Hotchkiss et al. | 361/103 |
| 7,518,063 B2 | 4/2009 | Zhang et al. | |
| 7,808,364 B2 * | 10/2010 | Chou et al. | 338/21 |
| 8,125,308 B1 * | 2/2012 | Barton | 338/21 |
| 8,310,800 B1 * | 11/2012 | Williams | 361/131 |
| 8,390,977 B2 * | 3/2013 | Fife | 361/118 |
| 8,658,900 B2 | 2/2014 | Picard et al. | |
| 2002/0048132 A1 * | 4/2002 | Jakwani et al. | 361/118 |
| 2003/0151874 A1 * | 8/2003 | Shipp | 361/126 |
| 2006/0062029 A1 | 3/2006 | Arnold | |
| 2006/0170428 A1 | 8/2006 | Richter et al. | |
| 2008/0047735 A1 | 2/2008 | Sexton et al. | |

* cited by examiner

*Primary Examiner* — Dharti Patel
(74) *Attorney, Agent, or Firm* — David W. Carstens; Kevin M. Klughart; Carstens & Cahoon, LLP

(57) ABSTRACT

An electrical wiring system/method implementing transient voltage suppression is disclosed. The system/method incorporates HOT, NEUTRAL, GROUND wiring in conjunction with a series drop resistor (SDR) on the HOT conductor that supplies current to the load device. Parallel shunting metal oxide varistors (MOVs) are used in conjunction with corresponding shunt diode rectifiers (SDRs) to suppress transients on the HOT conductor to either the GROUND conductor and/or NEUTRAL conductor. The parallel shunting MOV/SDR pairs may be integrated into a singular structure that is encapsulated in an insulating material to permit implementation of the transient protection wiring system/method into electrical loads and common power distribution equipment such as electrical outlets and power strips.

27 Claims, 64 Drawing Sheets

*Prior Art*

*Prior Art*

FIG. 12
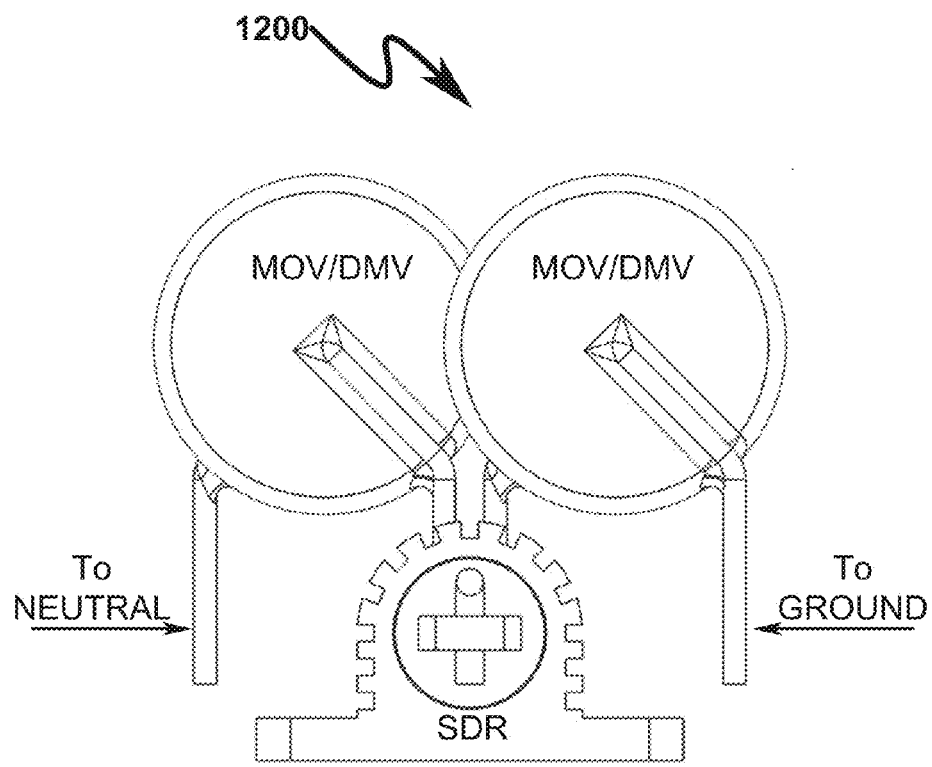
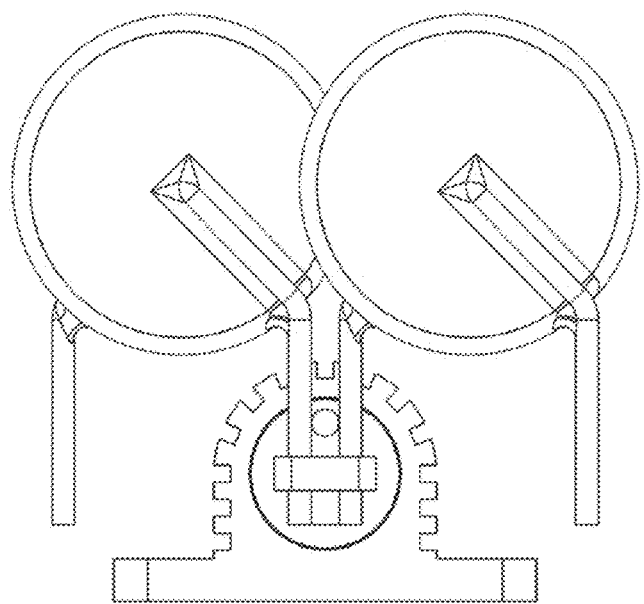

FIG. 14
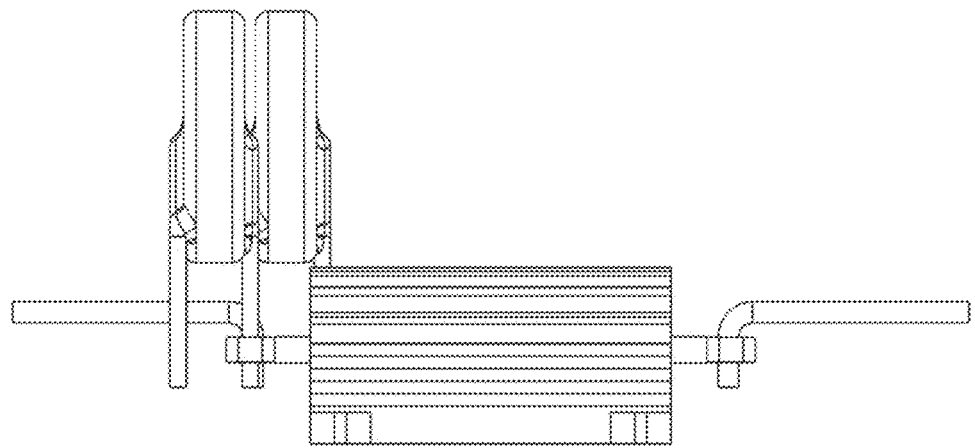
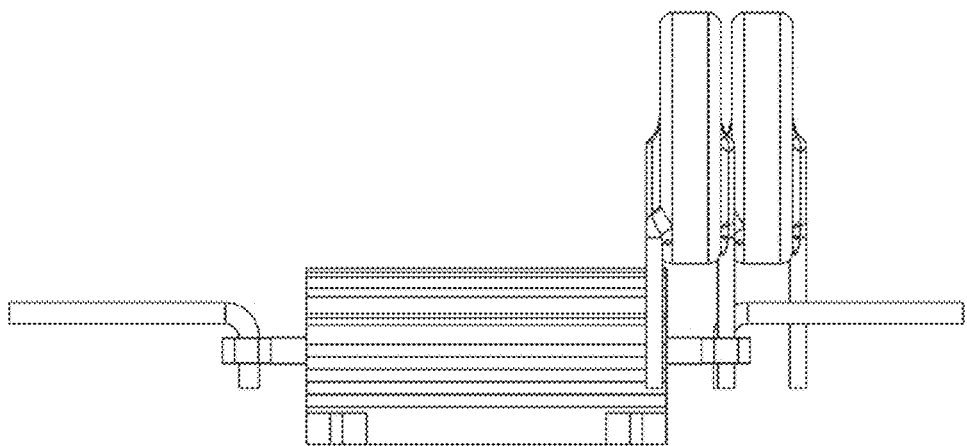

*Prior Art*

*Prior Art*

FIG. 19
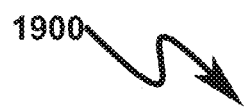
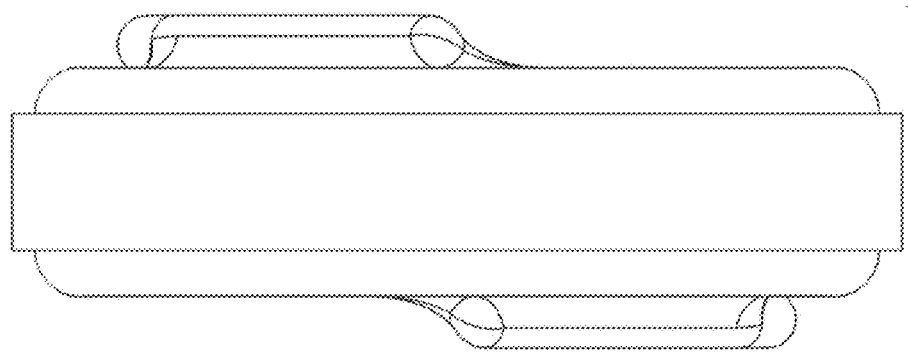
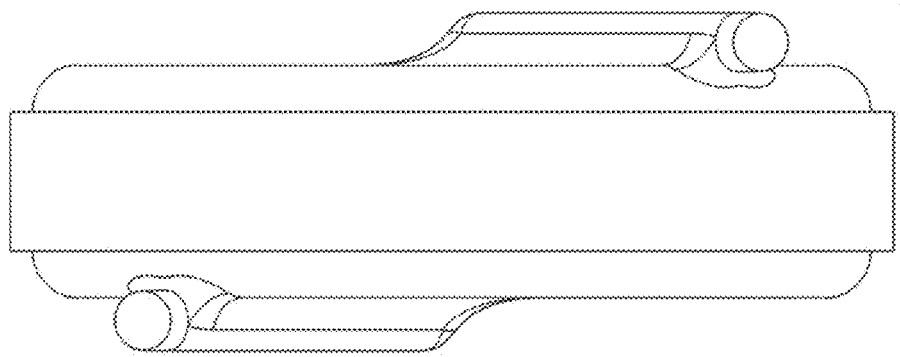
*Prior Art*

*Prior Art*

*Prior Art*

*Prior Art*

*Prior Art*

*Prior Art*

FIG. 27
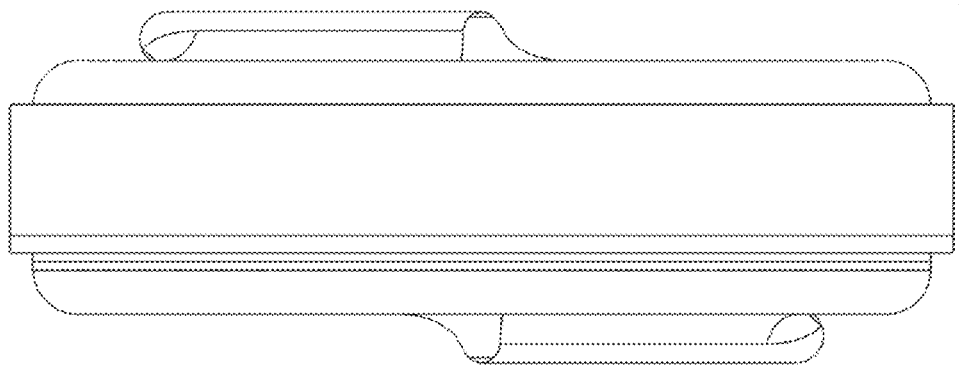
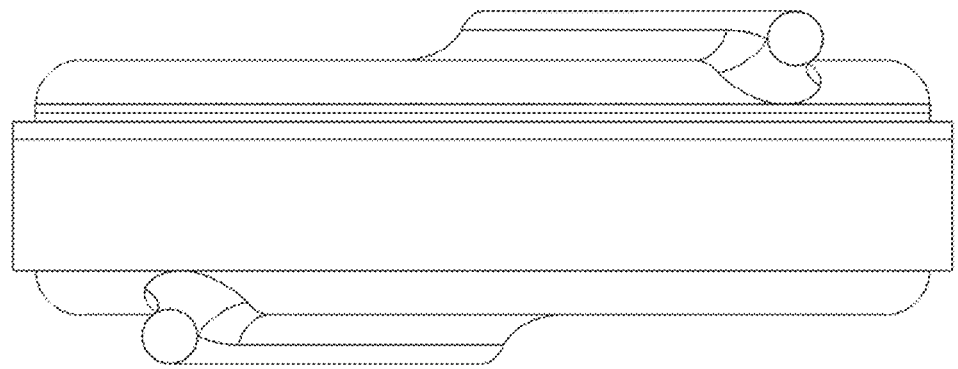

FIG. 43
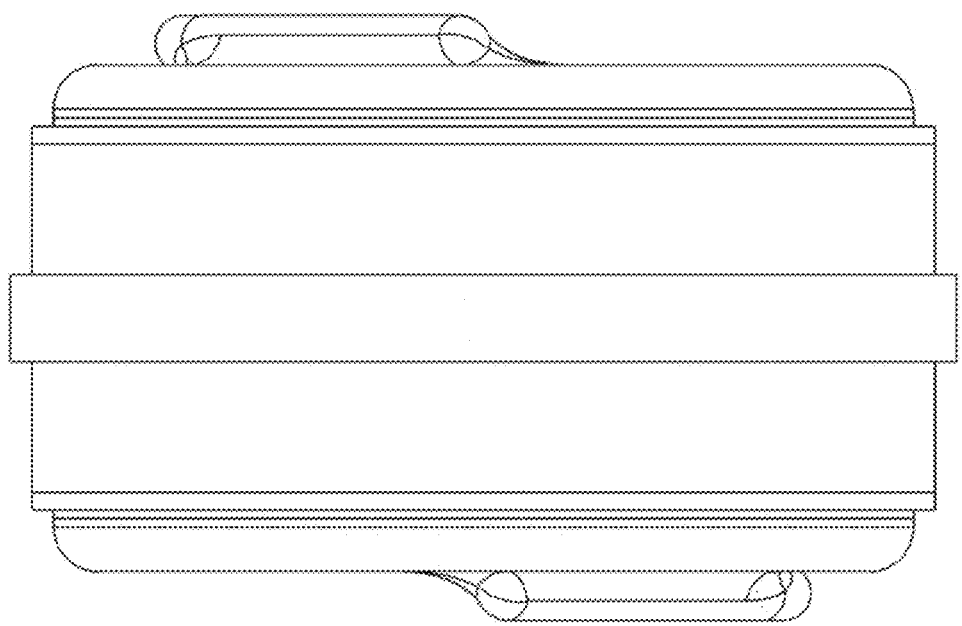
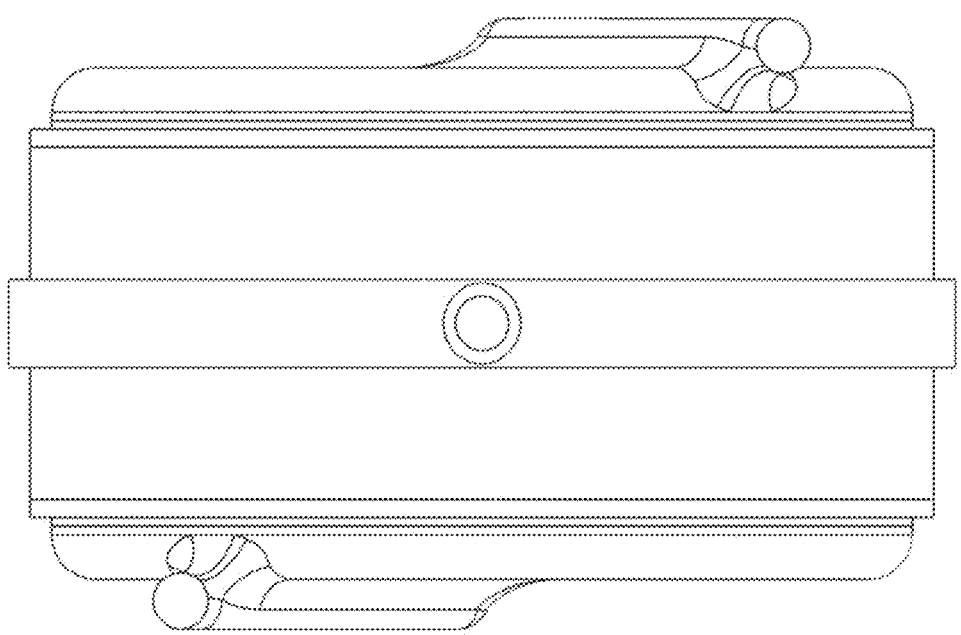

FIG. 58
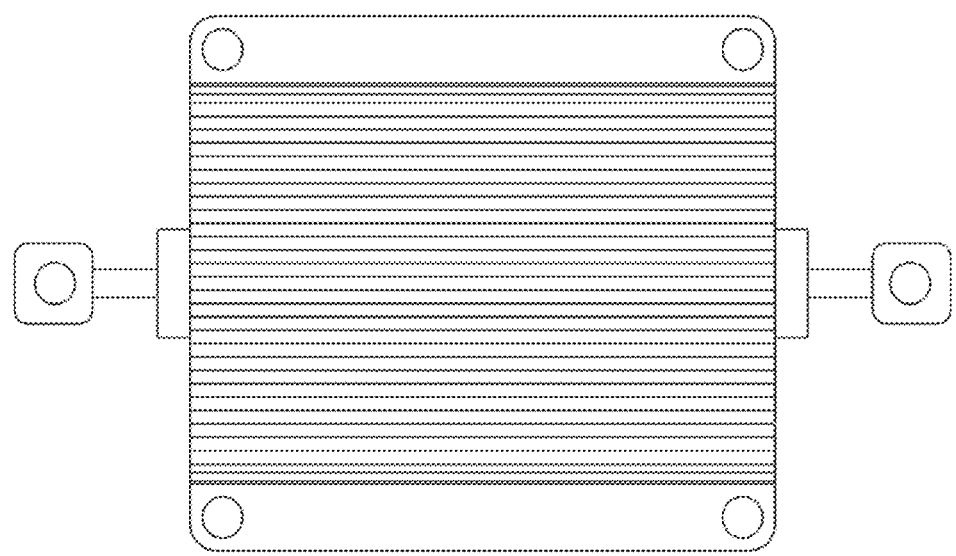
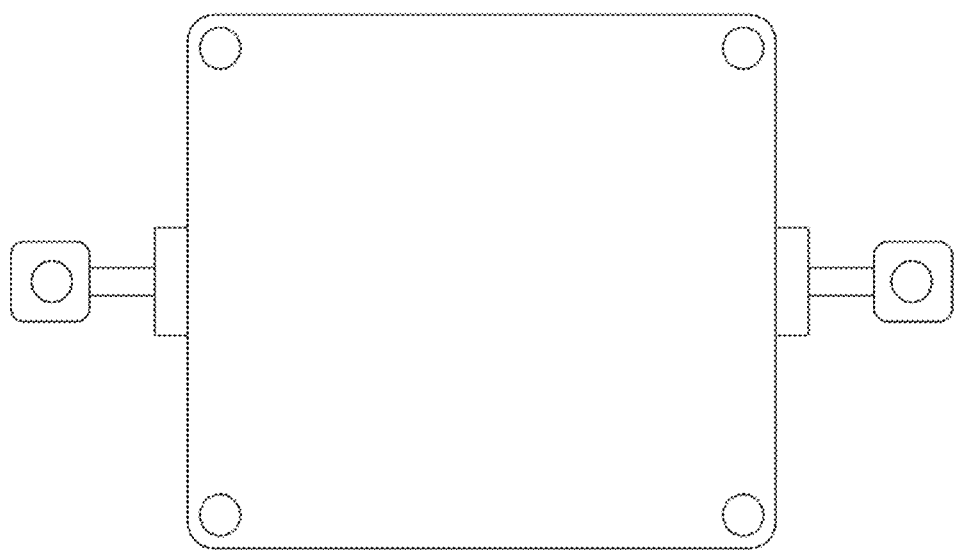

FIG. 59
5900

FIG. 60
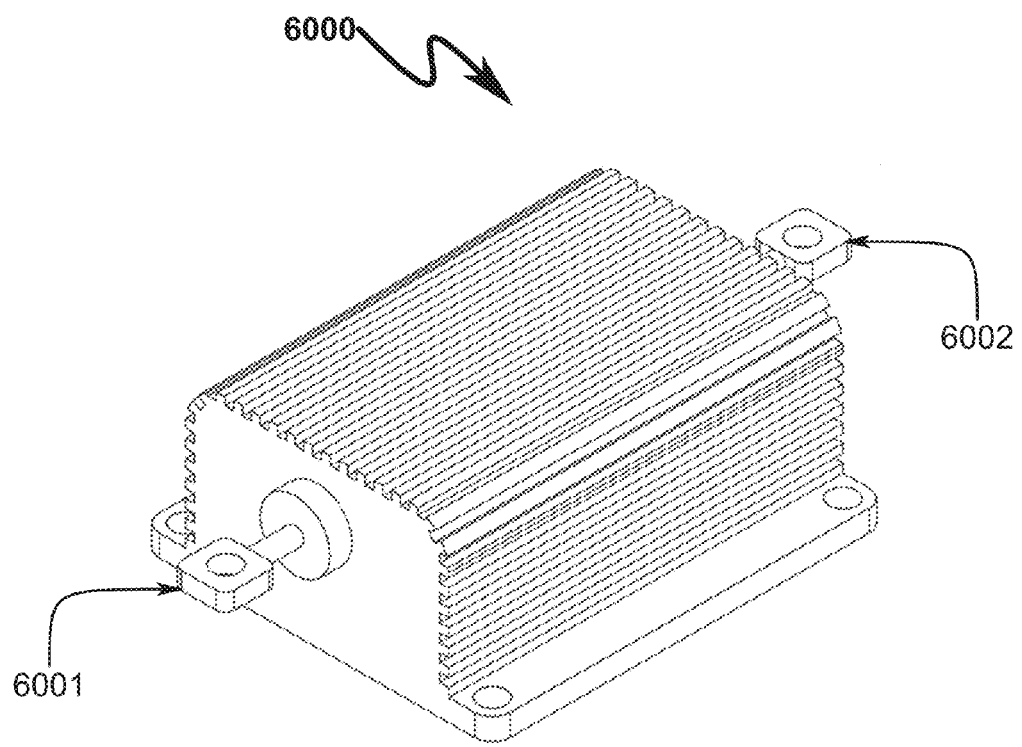
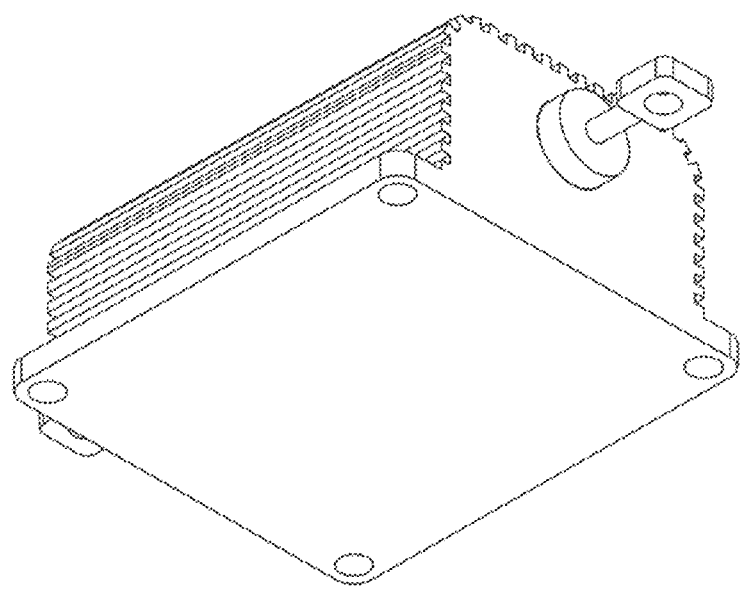

ELECTRICAL WIRING SYSTEM AND METHOD

CROSS REFERENCE TO RELATED APPLICATIONS

U.S. Utility Patent Applications

This is a Continuation-In-Part (CIP) patent application of United States Utility patent application for ELECTRICAL WIRING SYSTEM by inventor Mark E. Goodson, filed electronically with the USPTO on Apr. 25, 2012, with Ser. No. 13/455,686, EFS ID 12628238, confirmation number 5731.

U.S. Utility Patent Applications

This application claims benefit under 35 U.S.C. §120 and incorporates by reference United States Utility patent application for ELECTRICAL WIRING SYSTEM by inventor Mark E. Goodson, filed electronically with the USPTO on Apr. 25, 2012, with Ser. No. 13/455,686, EFS ID 12628238, confirmation number 5731.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates generally to wiring or cabling carrying electrical power or fault current to or from appliances and electrical devices and is particularly suited for use with appliances and devices that are protected by transient voltage surge suppressors.

PRIOR ART AND BACKGROUND OF THE INVENTION

Modern household appliances such as, for example, audio and video equipment, and commercial equipment have solid state circuits or other sensitive circuits that are subject to damage caused by electrical transients. As used herein, the term appliance refers to any device that receives electrical power. Currently, in an effort to minimize the effects of transient voltages, variations of a class of device known as a Transient Voltage Surge Suppressor (TVSS) are used. Such devices are used in, for example, consumer and industrial electronics, automotive electronics, and telecom systems as well as commercially available surge protector strips.

The main component within a TVSS is typically a voltage clamping Metal Oxide Varistor (MOV). Additionally, other types of voltage clamping devices such as gas tubes or Zener diodes are used. An MOV has a non-linear Voltage and Current (V-I) curve that has a very high resistance when the voltage across it is small compared to its threshold voltage. Conversely, when the voltage across an MOV is high compared to its threshold voltage, the MOV has a low resistance and allows current to pass through it, thus providing a shunt for transient voltages above the MOV's threshold voltage. In such situations, for example, an MOV can be placed between HOT and NEUTRAL conductors, between HOT and GROUND conductors, and/or between NEUTRAL and GROUND conductors. When the MOV threshold voltage is exceeded, such as when a large enough transient occurs, the nonlinear characteristics of the MOV allows a fault current, possibly in the many hundreds of amps (or more) to temporarily flow. The voltage drop of the wiring feeding the MOV, which temporarily carries this fault current, may cause the output voltage seen by the appliance or sensitive circuit to drop in turn.

For example, if an appliance that has an MOV protecting it that is placed across the HOT line and NEUTRAL at the appliance, and a transient voltage occurs, the flow of current may cause a voltage drop across the HOT feeder conductor to the MOV and a corresponding voltage drop across the NEUTRAL conductor that handles the return current. The net effect is that the NEUTRAL voltage at the appliance is no longer zero volts (with respect to GROUND), and thus presents a shock hazard.

If an MOV is placed, instead, between HOT and GROUND and a transient occurs, a similar voltage drop can occur on the GROUND return path. In this situation, the GROUND may float to a higher voltage. For example, on a grounded appliance, where that appliance contains or is connected to a sensitive electronic circuit, such as, for example, a data circuit, the increase in the GROUND voltage can damage the circuit.

The current method of manufacturing cable assemblies such as type NM (nonmetallic), for example, calls for equal resistance in all conductors (HOT, NEUTRAL, and GROUND) or for the GROUND conductor to be of a smaller diameter (and having a higher resistance) with respect to the other conductors. For conductors made of the same material, these dimensions will reduce in equal voltage drops on conductors that are equal in diameter, or in a greater voltage rise on the GROUND leg for those cable assemblies with reduced diameter GROUND legs. Thus, current commercially available products are not well suited for use with circuits protected by modern TVSS devices.

An additional limitation of current cabling systems is that the circuit breaker that protects the MOV (the breaker that is part of the residential or commercial wiring) cannot always respond rapidly if the MOV begins to fail. In situations such as these, the MOVs can overheat and may even cause a fire. For example, when a 14 AWG wire is feeding an appliance, and the MOV within the appliance starts to fail, the MOV fault current will largely be a function of the two conductors (HOT and NEUTRAL) that are part of the branch circuit wiring. Under many circumstances, the fault current will be insufficient to cause a typical Thermal-Magnetic (TM) circuit breaker to trip.

Therefore, in order to reduce the risk of electrical shock, fire, and potential damage to equipment where TVSS devices are used, a new type of cabling is needed.

OBJECTIVES OF THE INVENTION

Accordingly, the objectives of the present invention are (among others) to circumvent the deficiencies in the prior art and affect the following objectives:
(1) Provide for an electrical wiring system and method that reduces voltage transients in an electrical appliance chassis serviced by a TVSS device.
(2) Provide for an electrical wiring system and method that reduces voltage transients in an electrical appliance chassis in the event of a NEUTRAL/GROUND fault within the appliance.
(3) Provide for an electrical wiring system and method that is compatible with existing NM electrical wiring standards.
(4) Provide for an electrical wiring system and method that permits rapid circuit breaker activation in the event of TVSS activation and/or a NEUTRAL/GROUND fault in an electrical appliance.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention overcomes the disadvantages of currently available cabling and wiring when used in conjunction with transient voltage suppressors and provides for cabling designed such that a HOT wire is asymmetrically conductive (sized differently, etc.) with respect to the NEUTRAL and the GROUND wires. In one embodiment, the NEUTRAL and GROUND wires are several wire sizes larger in diameter than the HOT wire. This minimizes the voltage differential between NEUTRAL and GROUND wires during TVSS faulting conditions. Additionally, this helps to minimize the temporary voltage rise on the chassis of a grounded appliance that can occur during both TVSS operation or during an internal short or fault condition.

Method Overview

The present invention system may be utilized in the context of an overall electrical wiring method, wherein the electrical wiring system described previously operates in conjunction with a method in which the electrical wiring system described above having reduced NEUTRAL and/or GROUND wire resistivity is connected to one or more appliances having a TVSS device to reduce appliance chassis voltage spikes in the event of TVSS activation and/or a NEUTRAL/GROUND fault within the appliance.

BRIEF DESCRIPTION OF THE DRAWINGS

For a fuller understanding of the advantages provided by the invention, reference should be made to the following detailed description together with the accompanying drawings wherein:

FIG. 12 illustrates front and rear views of a preferred exemplary transient suppression electrical wiring system embodiment construction;

FIG. 14 illustrates right and left side views of a preferred exemplary transient suppression electrical wiring system embodiment construction;

FIG. 19 illustrates top and bottom views of a prior art metal oxide varistor (MOV);

FIG. 27 illustrates top and bottom views of a present invention integrated MOV+DIODE transient surge suppression structure;

FIG. 43 illustrates top and bottom views of a present invention integrated DIODE+MOV+MOV+DIODE transient surge suppression structure;

FIG. 58 illustrates top and bottom views of a present invention integrated DMV+RESISTOR transient surge suppression structure;

FIG. 59 illustrates right and left side views of a present invention integrated DMV+RESISTOR transient surge suppression structure;

FIG. 60 illustrates top right front and bottom left front perspective views of a present invention integrated DMV+RESISTOR transient surge suppression structure;

DESCRIPTION OF THE PRESENTLY PREFERRED EXEMPLARY EMBODIMENTS

Figure 1:
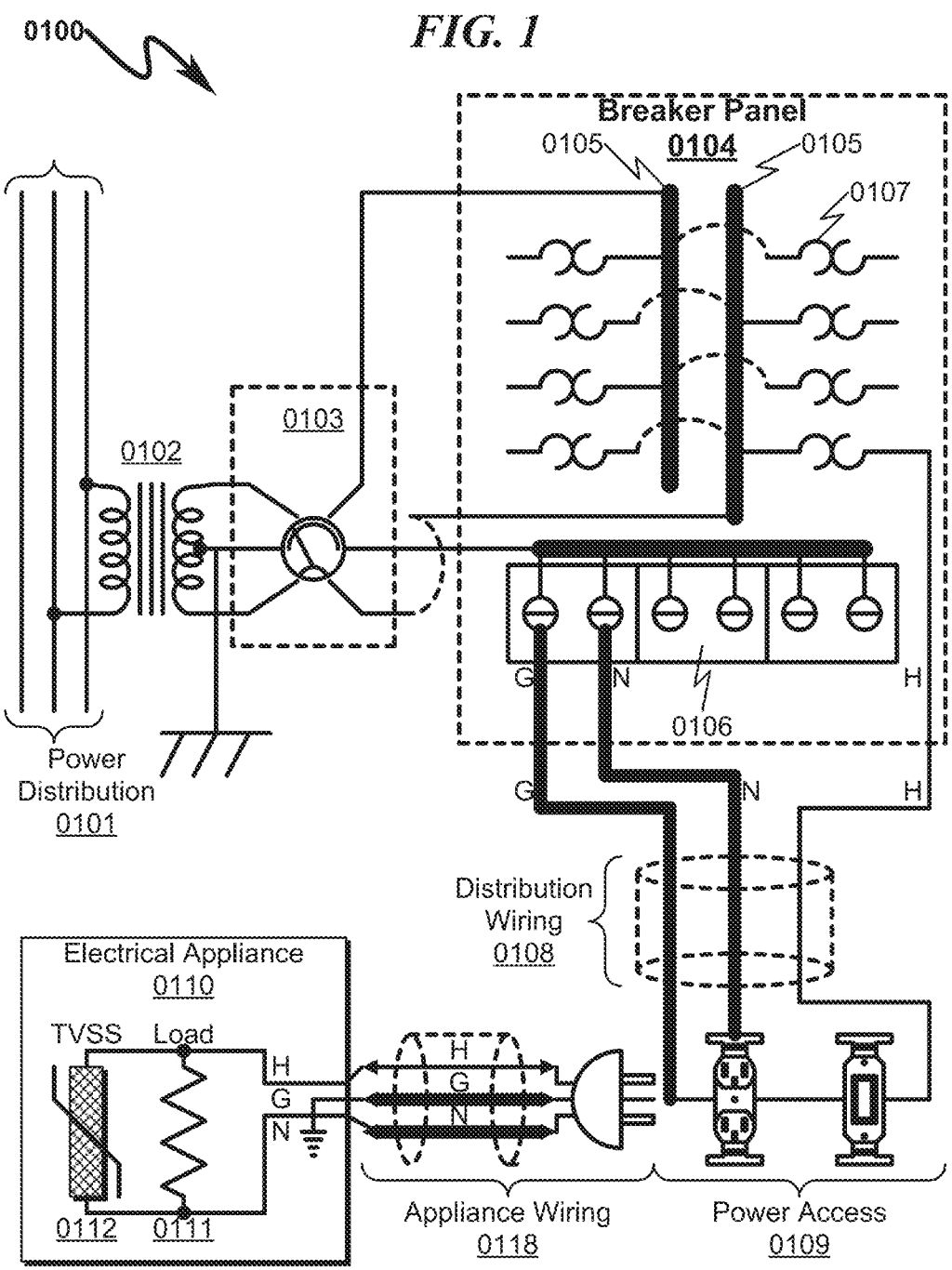
FIG. 1 illustrates a system block diagram of a preferred exemplary system embodiment of the present invention used in the context of conventional commercial/residential wiring application.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an ELECTRICAL WIRING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Wiring Conductor not Limitive

The present invention anticipates a wide variety of wire types may be used to implement the various aspects of the invention and makes no limitation on the type of wiring conductor that may be used to implement these functions.

Wire Sizing Not Limitive

The present invention anticipates a wide variety of wire sizes may be used to implement the various aspects of the invention and makes no limitation on the wire conductor sizes that may be used to implement these functions. The specific wire sizes used herein are given for purpose of example only and do not limit the scope of the claimed invention. Wire sizes depicted herein are relative, and may be equally applied to #10 AWG, #12 AWG, and #14 AWG baseline cable wire sizes.

TVSS not Limitive

The present invention anticipates that a wide variety of Transient Voltage Surge Suppressor (TVSS) technologies may be used to implement various embodiments of the present invention and makes no limitation on the particular type of TVSS that may be used to construct various invention embodiments.

System Overview (0100)

The present invention may be best understood by inspection of the system overview depicted in FIG. 1 (0100) wherein a preferred exemplary commercial/residential power distribution system embodiment is depicted. Here power is provided from a three-phase distribution power infrastructure (0101) to supply a step-down transformer (0102) connected to a metering system (0103) at the service entrance of a building or other structure. Power from the metering system (0103) is supplied to a breaker panel (0104) comprising internal HOT bus bars (0105), a NEUTRAL/GROUND bus bar (0106), and circuit breakers (0107) connected to one or more of the HOT bus bars (0105).

Power flows from the circuit breakers (0107) (supplying power from the HOT wire leg of the transformer (0102)) and the NEUTRAL wire through distribution wiring (0108) to switches/outlets that represent the power access point (0109) for electrical appliances (0110) to derive power. In this context the electrical appliances comprise an internal load (0111) and TVSS (0112) device to suppress load voltage transients. Appliance wiring (0118) comprising wires and/or connectors may be part of the electrical appliance (0110) configuration and as such serves as the mechanical/electrical interface to the power access point (0109).

Within this context the present invention teaches that reduction of the wiring resistance in the distribution wiring (0108) and/or appliance wiring (0118) can affect a reduction in chassis potential spikes due to electrical faults within the electrical appliance (0110) caused by either activation of the TVSS device (0112) and/or a load/ground fault resulting in either application of HOT supply voltage to the chassis of the electrical appliance (0110). Decreased wiring resistance in this context can be achieved using a variety of methods, with one preferred method being increasing the wiring cross section of the NEUTRAL and/or GROUND wires in the distribution wiring (0108) and/or appliance wiring (0118).

Method Overview (0200)

Figure 2:
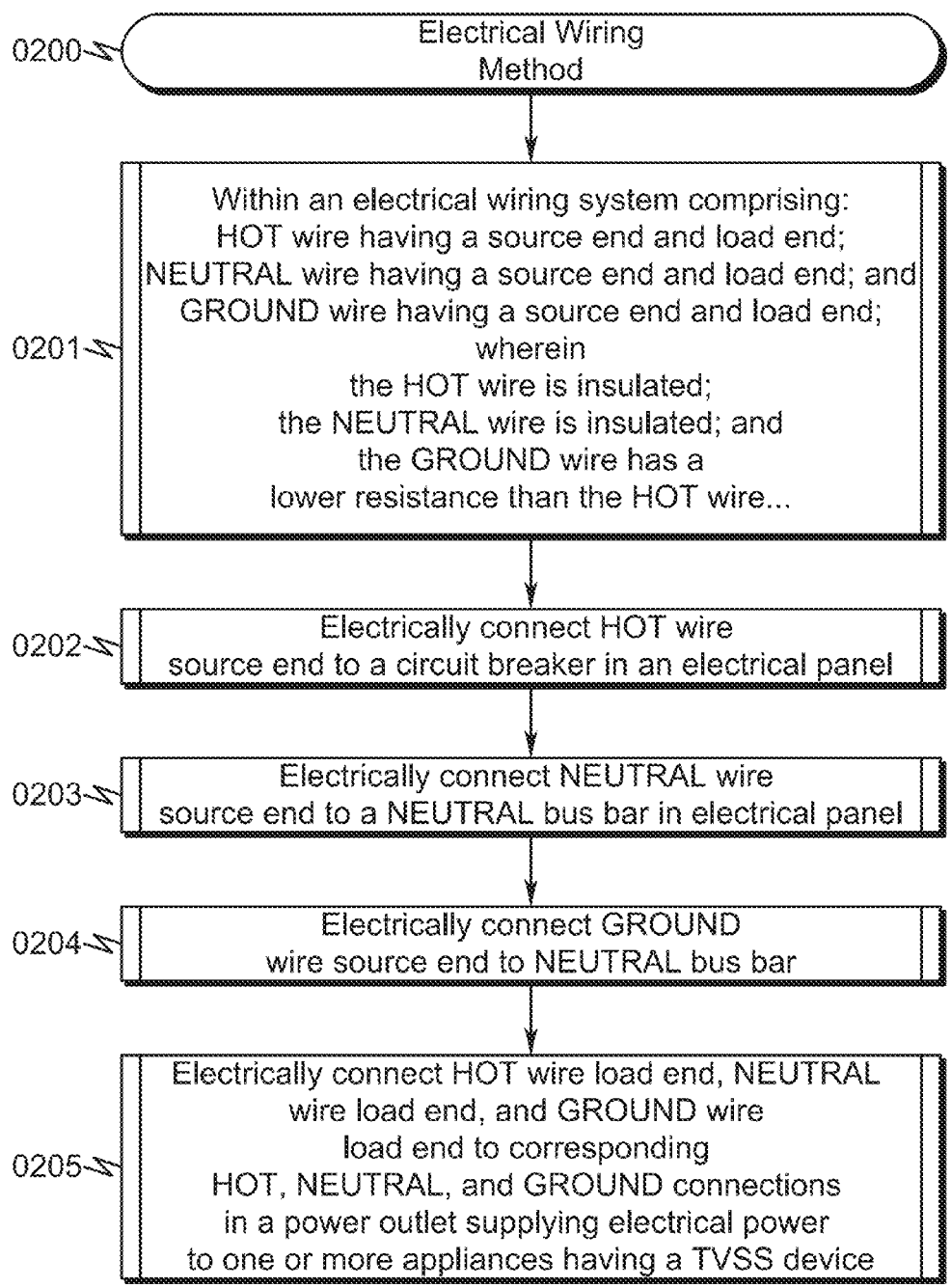
FIG. 2 illustrates a method flowchart of a preferred exemplary method embodiment of the present invention.

The present invention method may be seen in an overview context as generally illustrated in the flowchart of FIG. 2 (0200), and can be generally described as an electrical wiring method that comprises the following method steps:

(1) Within an electrical wiring system comprising: HOT wire having a source end and load end; NEUTRAL wire having a source end and load end; and GROUND wire having a source end and load end;
wherein the HOT wire is insulated; the NEUTRAL wire is insulated; and the GROUND wire has a lower resistance than the HOT wire . . . (0201);
(2) Electrically connect the HOT wire source end to a circuit breaker in an electrical panel (0202);
(3) Electrically connect the NEUTRAL wire source end to a NEUTRAL bus bar in electrical panel (0203);
(4) Electrically connect the GROUND wire source end to NEUTRAL bus bar (0204);
(5) Electrically connect the HOT wire load end, NEUTRAL wire load end, and GROUND wire load end to the corresponding HOT, NEUTRAL, and GROUND connections in a power outlet supplying electrical power to one or more appliances having a TVSS device (0205).

One skilled in the art will recognize that these method steps may be augmented or rearranged without limiting the teachings of the present invention.

System Detailed Description

The present invention described below generally teaches a system and method for electrically connecting to an electrical appliance that is protected by a TVSS circuits device via use of asymmetrically conductive NEUTRAL and GROUND wiring.

Prior Art NM Wiring (0300, 0400)

Figure 3:
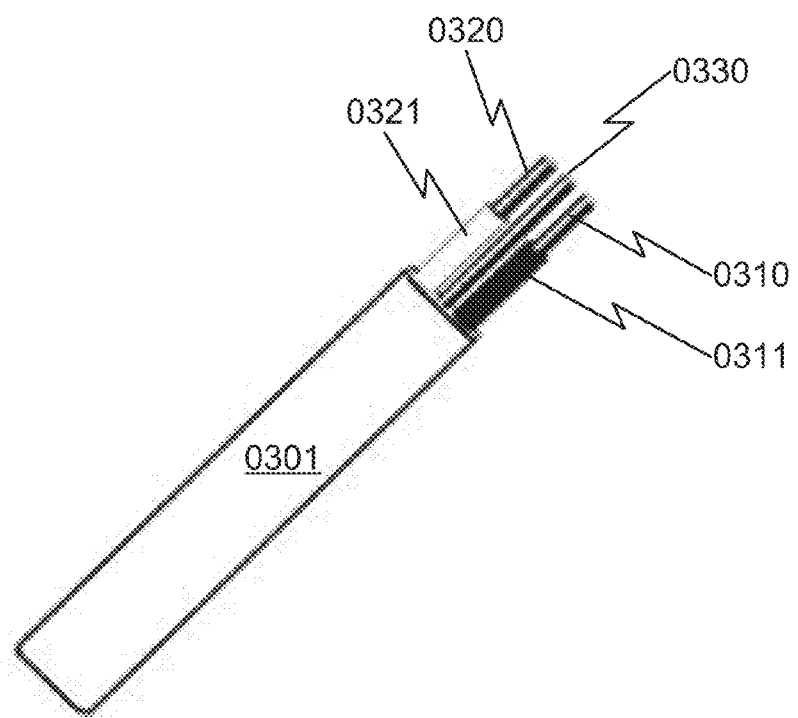
FIG. 3 illustrates a perspective view of prior art NM electrical wiring cable.

FIG. 3 (0300) depicts a perspective view of currently available NM (nonmetallic) wiring cable. Nonmetallic-sheathed cable is one of the most widely used cables for branch circuits and feeders in residential and commercial systems. Such cable is commonly and generally called ROMEX® by electrical construction personnel, as this is the trade name under which the cable is sold by General Cable Corporation. Type NM cable has an overall covering of fibrous or plastic material which is flame-retardant and moisture-resistant. Type NMC is similar, but the overall covering is also fungus-resistant and corrosion-resistant. The letter "C" indicates that it is corrosion-resistant.

This NM wiring cable is composed of a polymer jacket (0301) covering an insulated HOT (0310) and NEUTRAL (0320) wire with an exposed GROUND wire (0330). Insulation (0311, 0321) covers the HOT (0310) and NEUTRAL (0320) wires respectively. The GROUND wire (0330) is generally not insulated as it is not normally designed to carry current in this configuration absent an equipment fault condition.

Figure 4:
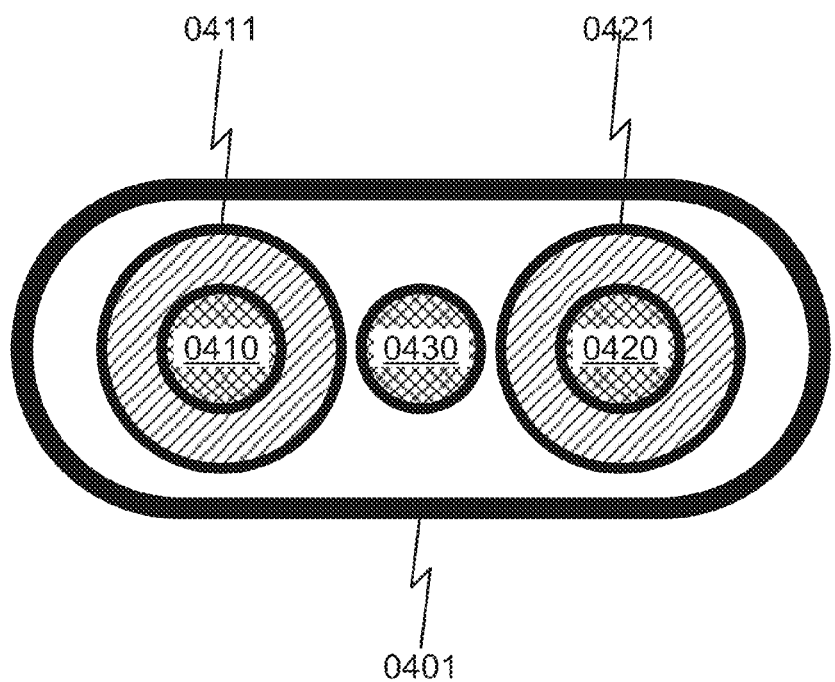
FIG. 4 illustrates a side plan view of prior art NM electrical wiring cable.

FIG. 4 (0400) is a side plan view of a cross section of currently available NM cable as previously depicted in FIG. 3 (0300). The outer jacketing (0401) is a typically a polymer jacket, which has internally conductors (0410, 0420, 0430). The HOT wire conductor (0410) is commonly #14 AWG (American Wire Gauge) corresponding to the diameter of the cross section of the conductor. The HOT wire (0410) has about it a layer of insulation (0411), normally made of PVC thermoplastic. The NEUTRAL conductor (0420) also has a diameter referred to in the trade as #14 AWG. The NEUTRAL conductor (0420) has about it an insulating thermoplastic layer (0421), similar to layer (0411) with respect to the HOT wire conductor (0410). The GROUND conductor (0430) also has a diameter referred to as #14 AWG. In the instance of commercially available cabling, the GROUND conductor (0430) is typically not individually insulated by PVC thermoplastic. Conductors (0410, 0420, 0430) are typically made of copper or a copper alloy.

Present Invention Preferred Exemplary Embodiment (0500)

Figure 5:
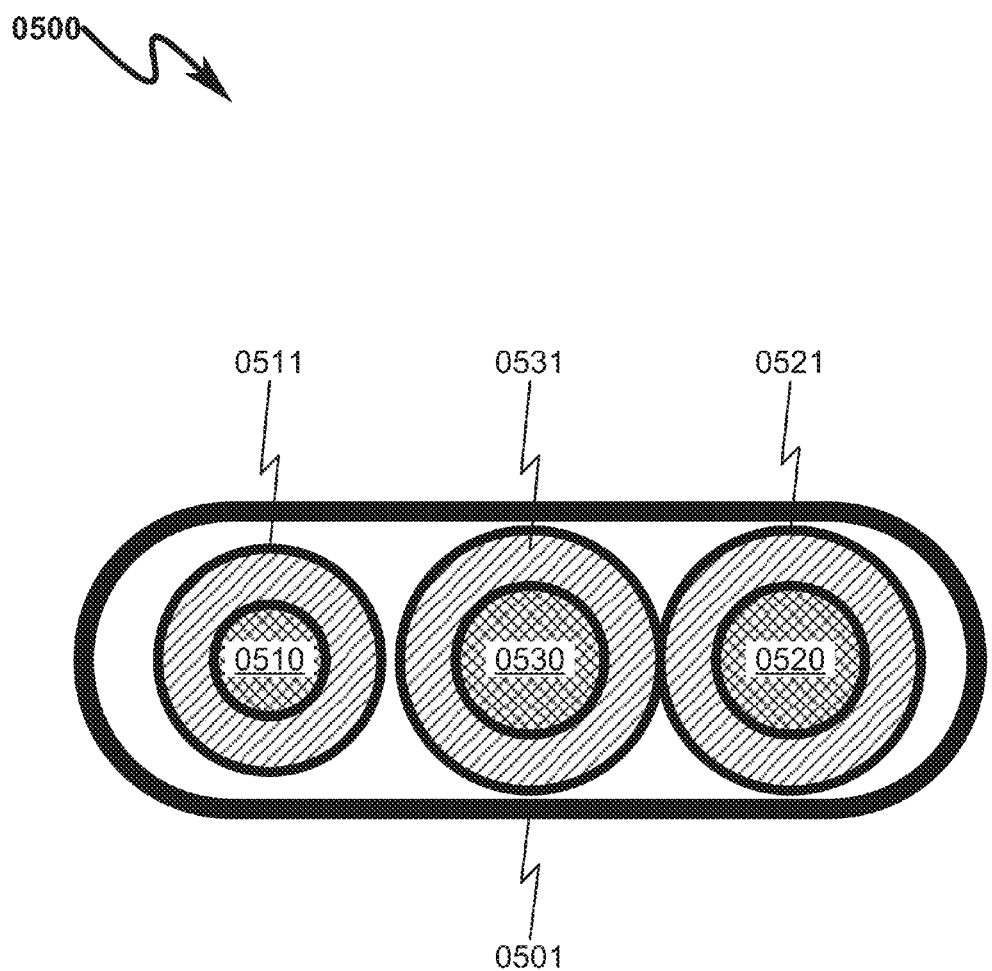
FIG. 5 illustrates a side plan view of a presently preferred exemplary embodiment of the present invention system.

FIG. 5 (0500) is a side plan view of a cross section of a preferred exemplary embodiment of the present invention implementing asymmetrical electrical cable wire sizing. The outer jacketing (0501) is a polymer jacket that contains a number of wires. In this presently preferred exemplary embodiment of the present invention cable system, the cable contains three insulated wires: a HOT wire (0510), a NEUTRAL wire (0520), and a GROUND wire (0530). In this embodiment the HOT wire (0510) has a nominal diameter of approximately 0.0641 inches, and is commonly referred to as #14 AWG. The HOT wire (0510) has about it a layer of insulation (0511). The NEUTRAL wire (0520) has a diameter of 0.102 inches referred to in the trade as #10 AWG. The NEUTRAL wire (0520) has about it an insulating layer (0521). The GROUND wire (0530) has a nominal diameter of 0.102 inches, and is referred to as #10 AWG. The GROUND wire (0530) has about it a layer of insulation (0531).

In this presently preferred exemplary embodiment, the insulation around the wires (0511, 0521, 0531) is made of PVC thermoplastic although other types of insulation are also envisioned. Likewise, the polymer jacket (0501) may be made up of other material. In the current embodiment, the HOT (0510), NEUTRAL (0520), and GROUND (0530) wires are made of copper. Other conductors, including but not limited to aluminum and copper alloys, are also envisioned.

Although FIG. 5 (0500) depicts a wiring cable containing one HOT wire, one skilled in the art will appreciate that that cable may contain any number of HOT wires to serve a variety of functions such as, for example, wiring of a three-way light switch or distributing three-phase power. Additionally, although FIG. 5 (0500) shows a cable where the HOT (0510), GROUND (0530), and NEUTRAL (0520) wires are situated linearly with respect to each other, the wires may be situated in any order and need not be oriented linearly.

Theory of Operation

To minimize the negative effects of voltage transients or surges, the resistance of the NEUTRAL path is reduced by, for example, increasing the diameter of the NEUTRAL wire with respect to the HOT wire. With the reduced resistance, increased current will flow, resulting in a more rapid tripping of a TM breaker and reducing the chances for fire when the TVSS/MOV begins to fail.

Portable Equipment Electrical Cabling (0600)

Figure 6:
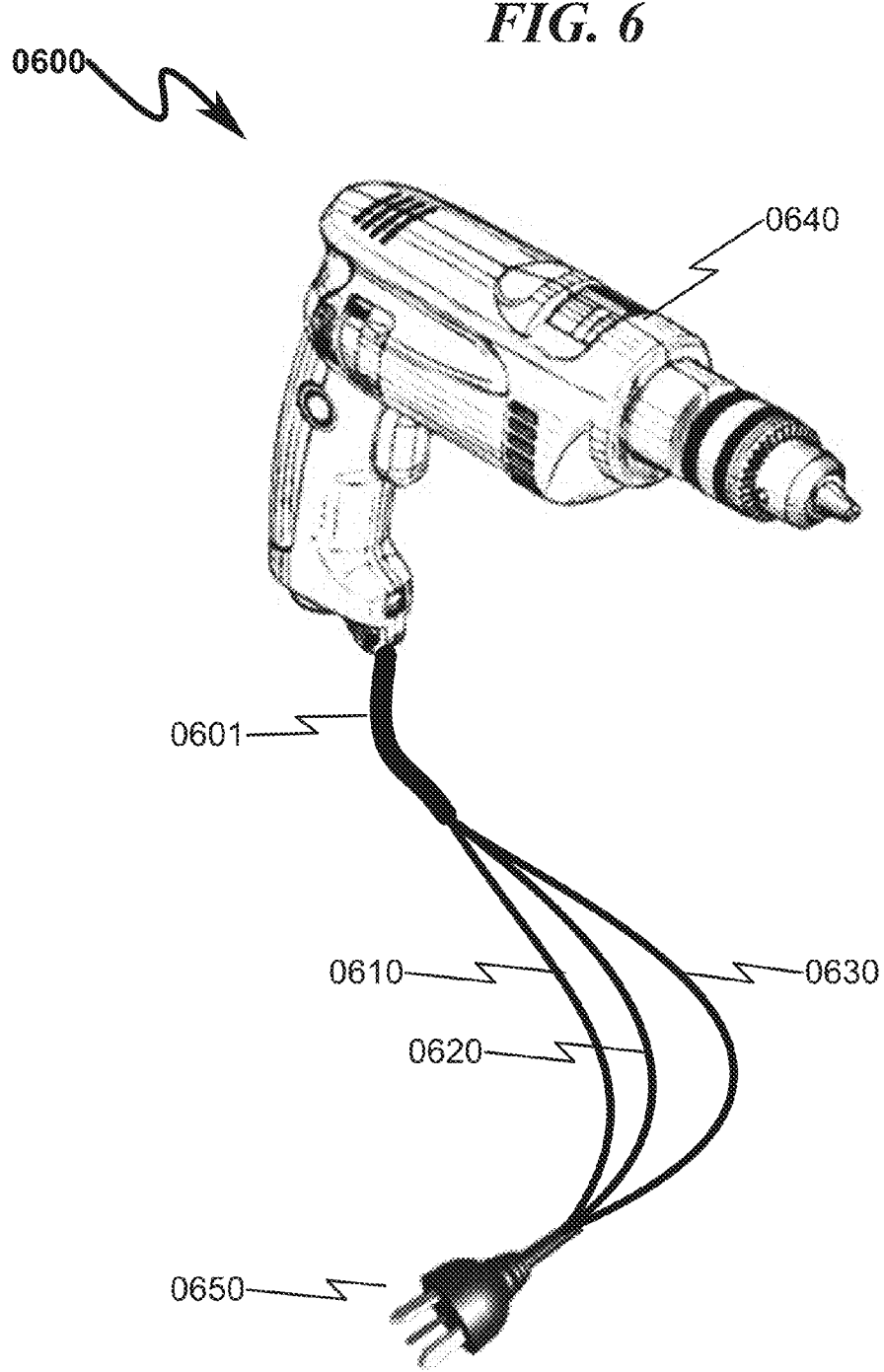
FIG. 6 illustrates a perspective view of a presently preferred exemplary embodiment of the present invention as applied to a hand-drill appliance.

While the above descriptions have concerned themselves with cabling that once installed is stationary, the same techniques could also be used for both appliance line cord and extension cords. FIG. 6 (0600) illustrates a perspective view of an embodiment of the invention used in conjunction with a hand-drill appliance. The embodiment of the invention in this figure shows a hand-drill (0640) with an asymmetrical electrical cable (0601) supplying its power. Three conductors: a HOT wire (0610), a NEUTRAL wire (0620), and a GROUND wire (0630) are shown in a breakaway view. The cabling (0601) is also connected to a three-prong grounded AC plug (0650) to receive electrical power from a power outlet. In this embodiment, both the NEUTRAL wire (0620) and the GROUND wire (0630) are at least four AWG sizes less than the HOT wire (0610). Such a hand drill may be used to drill a hole in a wall. If the bit of the drill were to encounter a live wire hidden behind the wall, the larger GROUND wire (0630) would allow a greater fault current to flow from the energized bit to GROUND, speeding the action of an overcurrent protection device and causing a lower voltage to be present on the chassis of the tool. Similarly, the rise in voltage as seen by the person holding the drill on the drill chassis (0640) as fault current flows will be lessened as the lower GROUND resistance keeps the voltage on the chassis closer in value to GROUND thus reducing the severity of electrical shock.

Surge Protector Application (0700)

Figure 7:
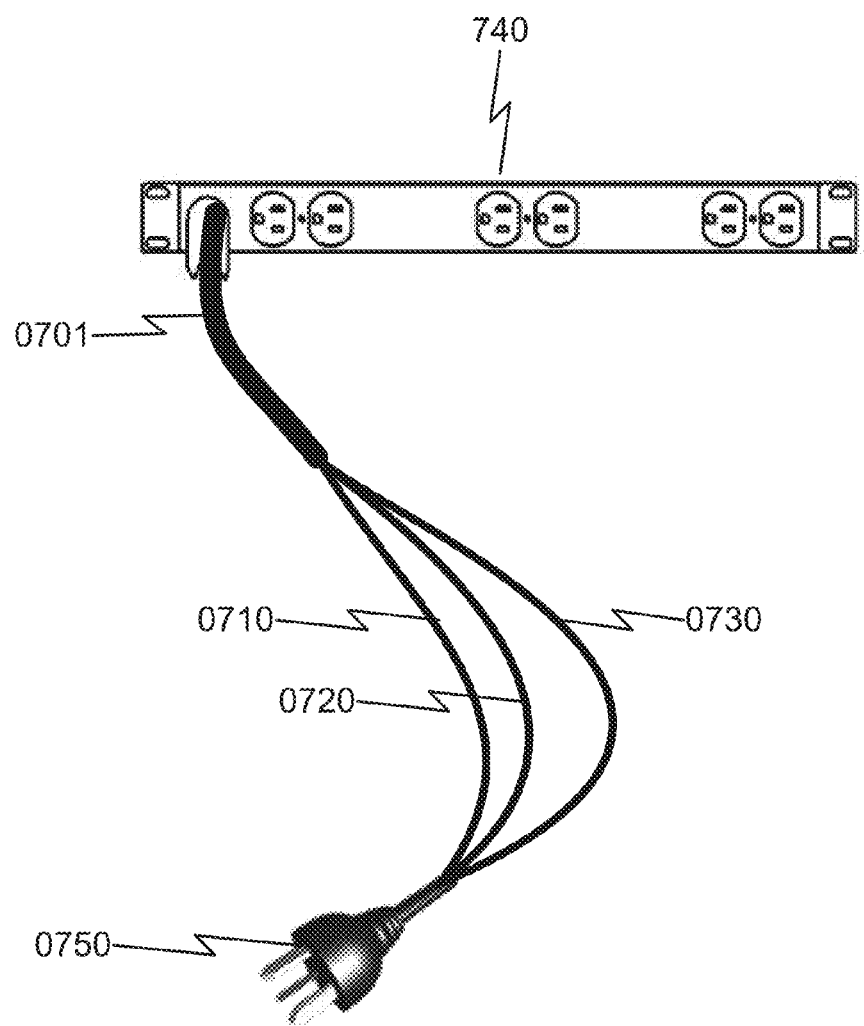
FIG. 7 illustrates a perspective view of a presently preferred exemplary embodiment of the present invention as applied to a surge protector electrical outlet strip.

This invention also has application with common surge protector strips. FIG. 7 (0700) is a perspective view of an embodiment of the invention used in conjunction with a surge protector strip. The body of the surge protector (0740) contains one or more TVSS devices. The asymmetrical electrical cabling (0701) in this embodiment contains three conductors, a HOT wire (0710), a NEUTRAL wire (0720), and a GROUND wire (0730) shown in breakaway view. In this embodiment, both the NEUTRAL wire (0720) and the GROUND wire (0730) are at least four AWG sizes less than the HOT wire (0710). The cabling (0701) is also connected to a three-prong grounded AC plug (0750) to receive electrical power from a power outlet.

Exemplary Building Wiring Application (0800)

Figure 8:
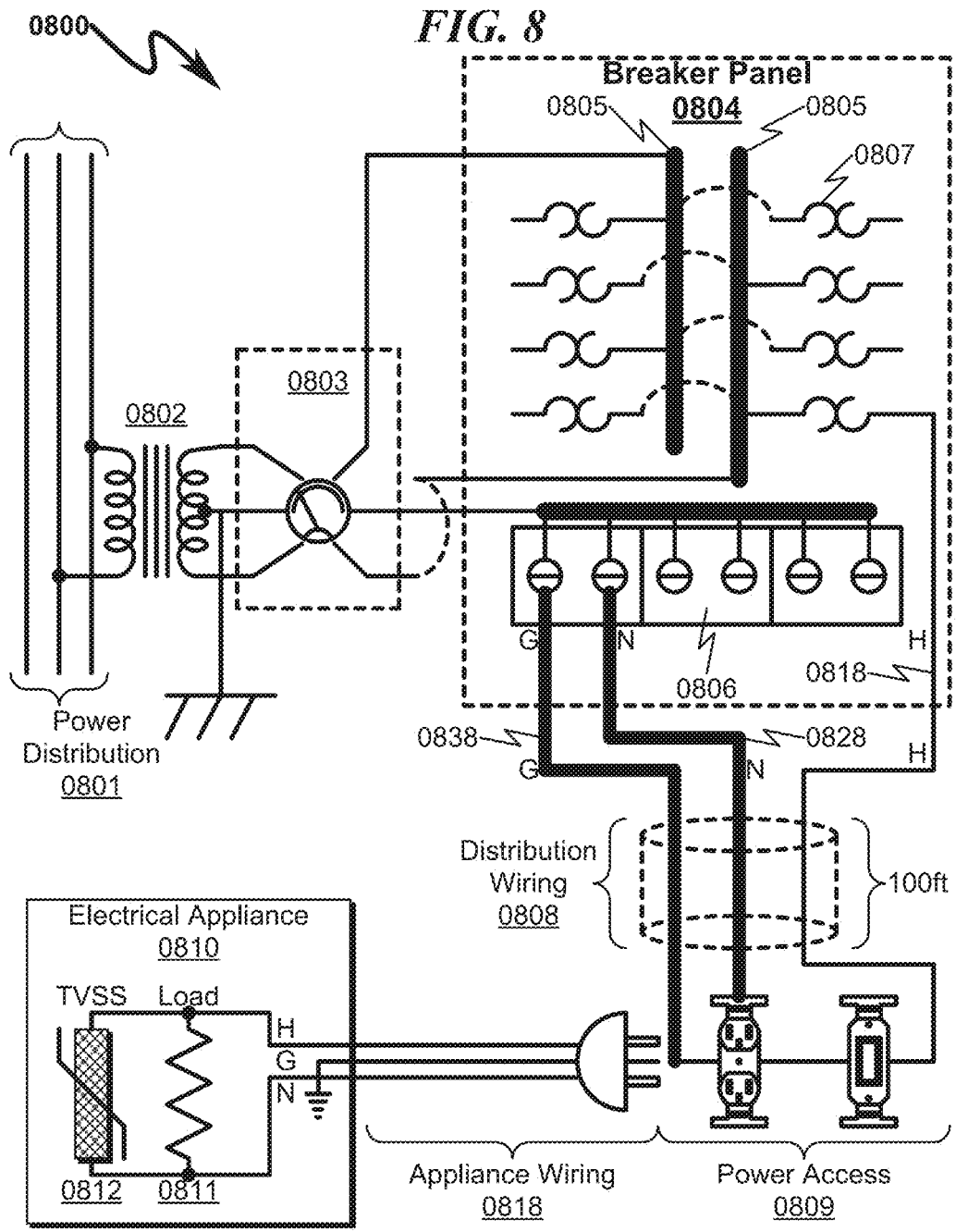
FIG. 8 illustrates a system block diagram of a preferred exemplary system embodiment of the present invention.

FIG. 8 (0800) is a schematic diagram showing house wiring connecting to an appliance (0810) load (0811) containing a TVSS circuit (0812). In this configuration, power (0801) is supplied to a house from an external transformer (0802) and runs through a breaker box (0804) via power bus bars (0805) and protected by a TM breaker (0807). Electrical cabling is run from the breaker box (0804) to a power outlet (0809) which supplies the power for an appliance (0810) having a load (0811) protected by a TVSS (0812). The NEUTRAL wire (0828) and the GROUND wire (0838) are electrically connected in the breaker box at the NEUTRAL bar (0806).

As an example of one mode of operation, if a load (0811) in an appliance (0810) (or other TVSS protected circuit) is 100 feet from the breaker panel (0804) when there is a fault (whether from TVSS action or other fault) causing 200 amperes of fault current to temporarily flow between the HOT wire (0818) and the GROUND wire (0838), then the voltage drop as seen by the load (0811), according to Ohm's law, could be 50 volts for #14 AWG copper wire such as the currently available cabling illustrated in FIG. 3 (0300) and FIG. 4 (0400). However, by using the cabling of a preferred embodiment of the present invention as generally depicted in FIG. 5 (0500), the voltage drop, as seen by the load (0811), can be reduced to approximately 20 volts where the fault current is only carried by the GROUND wire (0838). In other cases, which are typical, the voltage drop is even smaller when the fault current is carried by both the GROUND wire and the NEUTRAL wire.

Alternate System Embodiments

While the present system has been depicted in terms of a baseline #14 AWG wiring conductor for the HOT wire, other embodiments of the present invention may utilize #12 or #10 wire for the HOT conductor, with similar upsizing of the NEUTRAL/GROUND conductors. Furthermore, while many preferred embodiments of the present invention utilize NEUTRAL/GROUND conductors that are four AWG sizes larger than the HOT conductor, other preferred embodiments utilize NEUTRAL/GROUND conductors that are two AWG sizes larger than the HOT conductor. This wiring size selection will be highly application dependent.

Furthermore, while the present invention anticipates that circular conductors may be used in many embodiments, the present invention may also use oval or non-circular wire conductors, or conductors made of metals having different resistivity/conductivity.

SDR-MOV Transient Surge Suppression Cable (0900)

Figure 9:
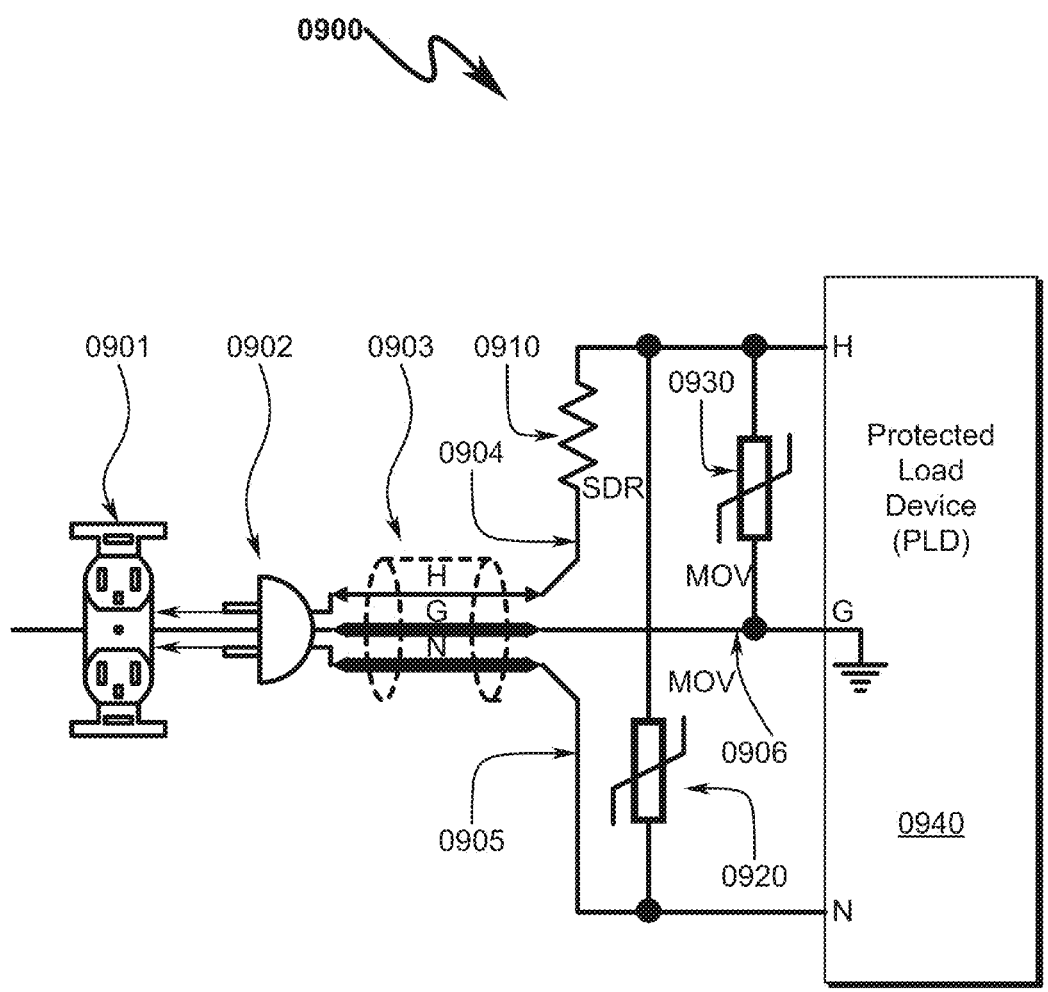
FIG. 9 illustrates a preferred exemplary SDR-MOV transient suppression electrical wiring system embodiment.

A preferred exemplary embodiment of a present invention transient surge suppression electrical wiring system is generally depicted in FIG. 9 (0900) wherein the electrical power receptacle (0901) mates with a cable plug (0902) (typically a NEMA-15 or equivalent plug/receptacle combination). The cable plug (0902) is electrically coupled with a cable (0903) having characteristics as described herein having a HOT (0904), NEUTRAL (0905), and GROUND (0906) conductors. A series drop resistor (SDR) (0910) is configured in series with the HOT (0904) conductor to the protected load device (PLD) (0940). A first metal oxide varistor (MOV) (0920) is electrically coupled between the SDR/PLD node and the NEUTRAL cable conductor (0905). A second metal oxide varistor (MOV) (0920) is electrically coupled between the SDR/PLD node and the GROUND cable conductor (0906).

The SDR (0910) in this configuration permits overvoltage transients to be primarily shunted through the MOVs (0920, 0930) through the higher conductivity NEUTRAL (0904) and GROUND (0905) conductors when a transient occurs and activates the MOV (0920, 0930) conduction paths. Under normal operating voltage circumstances the MOV (0920, 0930) devices are in a non-conducting state and have no impact on the operation of the PLD (0940). Under a transient surge condition, the voltage across the SDR (0910) will be significant due to the shunting conduction of the MOV (0920, 0930) devices to the higher conductivity NEUTRAL (0904) and GROUND (0905) conductors. This shunting action protects the PLD (0940) by limiting the voltage presented to the HOT input to the PLD (0940).

SDR-DMV Transient Surge Suppression Cable (1000)

Figure 10:
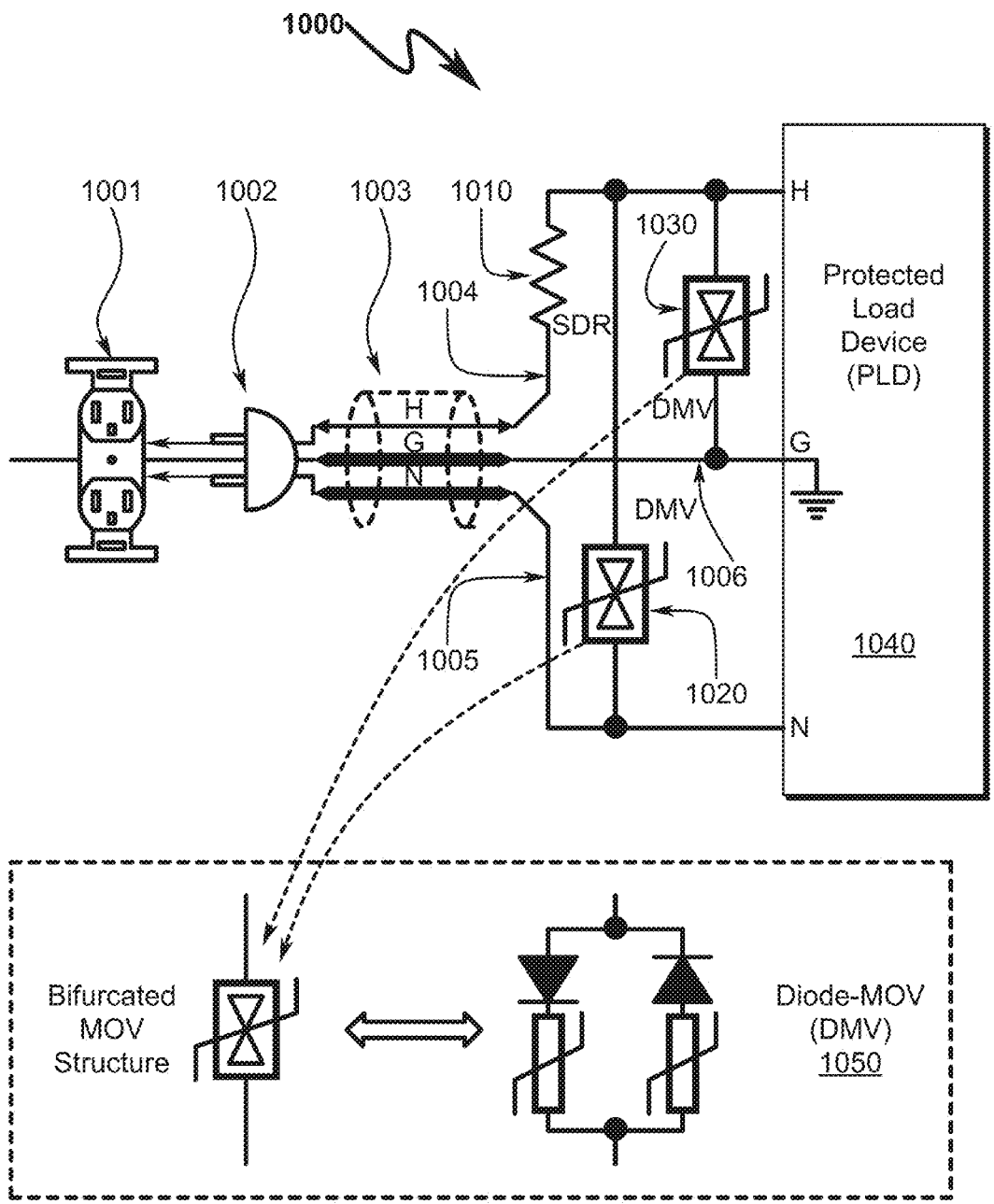
FIG. 10 illustrates a preferred exemplary SDR-DMV transient suppression electrical wiring system embodiment.

An alternative preferred exemplary embodiment of a present invention transient surge suppression electrical wiring system is generally depicted in FIG. 10 (1000) wherein the electrical power receptacle (1001) mates with a cable plug (1002) (typically a NEMA-15 or equivalent plug/receptacle combination). The cable plug (1002) is electrically coupled with a cable (1003) having characteristics as described herein having a HOT (1004), NEUTRAL (1005), and GROUND (1006) conductors. A series drop resistor (SDR) (1010) is configured in series with the HOT (1004) conductor to the protected load device (PLD) (1040). A first diode metal oxide varistor (DMV) (1020) is electrically coupled between the SDR/PLD node and the NEUTRAL cable conductor (1005). A second diode metal oxide varistor (DMV) (1020) is electrically coupled between the SDR/PLD node and the GROUND cable conductor (1006).

The SDR (1010) in this configuration permits overvoltage transients to be primarily shunted through the DMVs (1020, 1030) through the higher conductivity NEUTRAL (1004) and GROUND (1005) conductors when a transient occurs and activates the DMV (1020, 1030) conduction paths. Under normal operating voltage circumstances the DMV (1020, 1030) devices are in a non-conducting state and have no impact on the operation of the PLD (1040). Under a transient surge condition, the voltage across the SDR (1010) will be significant due to the shunting conduction of the DMV (1020, 1030) devices to the higher conductivity NEUTRAL (1004) and GROUND (1005) conductors. This shunting action protects the PLD (1040) by limiting the voltage presented to the HOT input to the PLD (1040).

The DMV device structure (1050) depicted is not taught by the prior art and is used herein as shorthand notation for separating the forward and reverse conduction paths through separate MOVs as depicted using rectifying diodes that isolate the positive current path through one MOV and the negative current path through a separate MOV. This current splitting has several benefits. First, the diodes permit positive and negative current splitting between separate MOV devices thus limiting current spikes through each individual MOV. This in some circumstances permits disparate MOV sizing depending on application context. Furthermore, the diodes present some limited resistance and capacitance when the MOV is activated on a transient and thus serve to dampen the impulse presented to the MOV. Finally, in situations where the overvoltage transient is limited to one or another of the polarities, the diode ensures that a complete collapse of the input power source is not triggered by mere excursions of the positive or negative cycle individually.

Additionally, it should be noted that MOVs are inherently non-linear devices that are rarely if ever matched in performance. Thus, paralleling MOVs does not work to increase the transient suppression characteristics of the paralleled devices. If two MOVS are both rated at 100 volts and 60 joules each, paralleling them does NOT give 120 joules heat capacity. One MOV will do 90 to 99% of the work unless the MOVs are an EXACT match—which is an exceedingly rare situation.

The present invention DMV arrangement allows the MOVs to be 'paralleled' in terms of heat dissipation—one MOV does the positive cycle transient suppression work, and one does the negative cycle transient suppression work. Ergo, if both MOVs are rated at 100 volts and 60 joules, each MOV has effectively doubled heat dissipation. Moreover, heat capacity MORE than doubles, in that each MOV is allowed to cool during the half cycle that it is not conducting due to the diode rectification. A further advantage is that the life of the MOVs is extended, since MOVs degraded for the number of transient suppression activations they receive.

Figure 64:
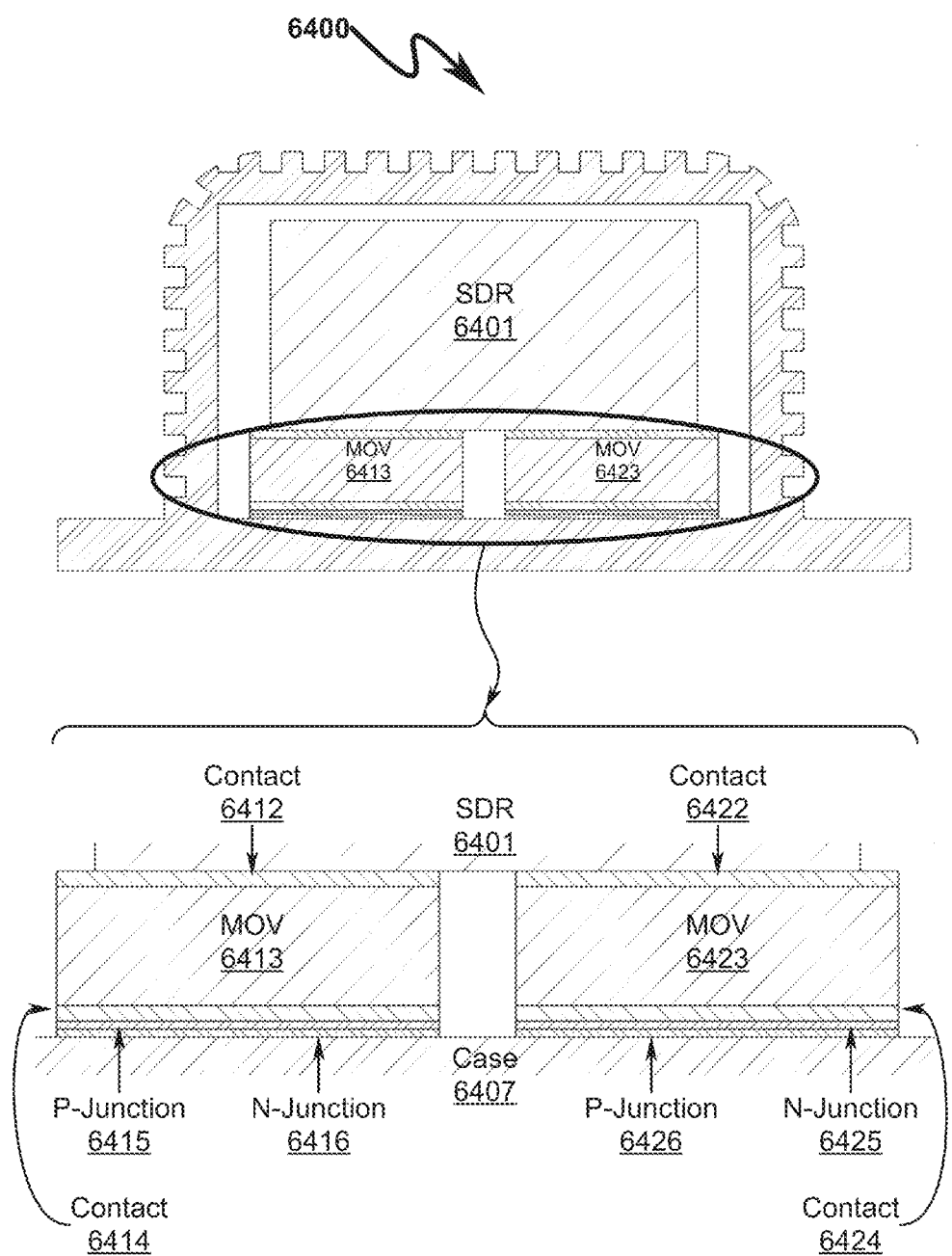
FIG. 64 illustrates a front sectional view of a present invention integrated DMV+RESISTOR transient surge suppression structure.

While many forms of diode/rectifier may be used in this DMV application context the present invention specifically anticipates the use of silicon rectifiers and/or Schottky rectifier diodes in this context. While single diodes are illustrated in the examples provided, some embodiments may utilize paralleled diode structures and in these embodiments the diode structures may be constructed of differing forward voltage drops and/or species (e.g., silicon/Schottky hybrid diode structures). Specific embodiments of a variety of anticipated DMV (1050) structures are detailed in FIG. 17 (1700)-FIG. 64 (6400).

SDR-DMV Distributed Surge Suppression Cable (1100)

Figure 11:
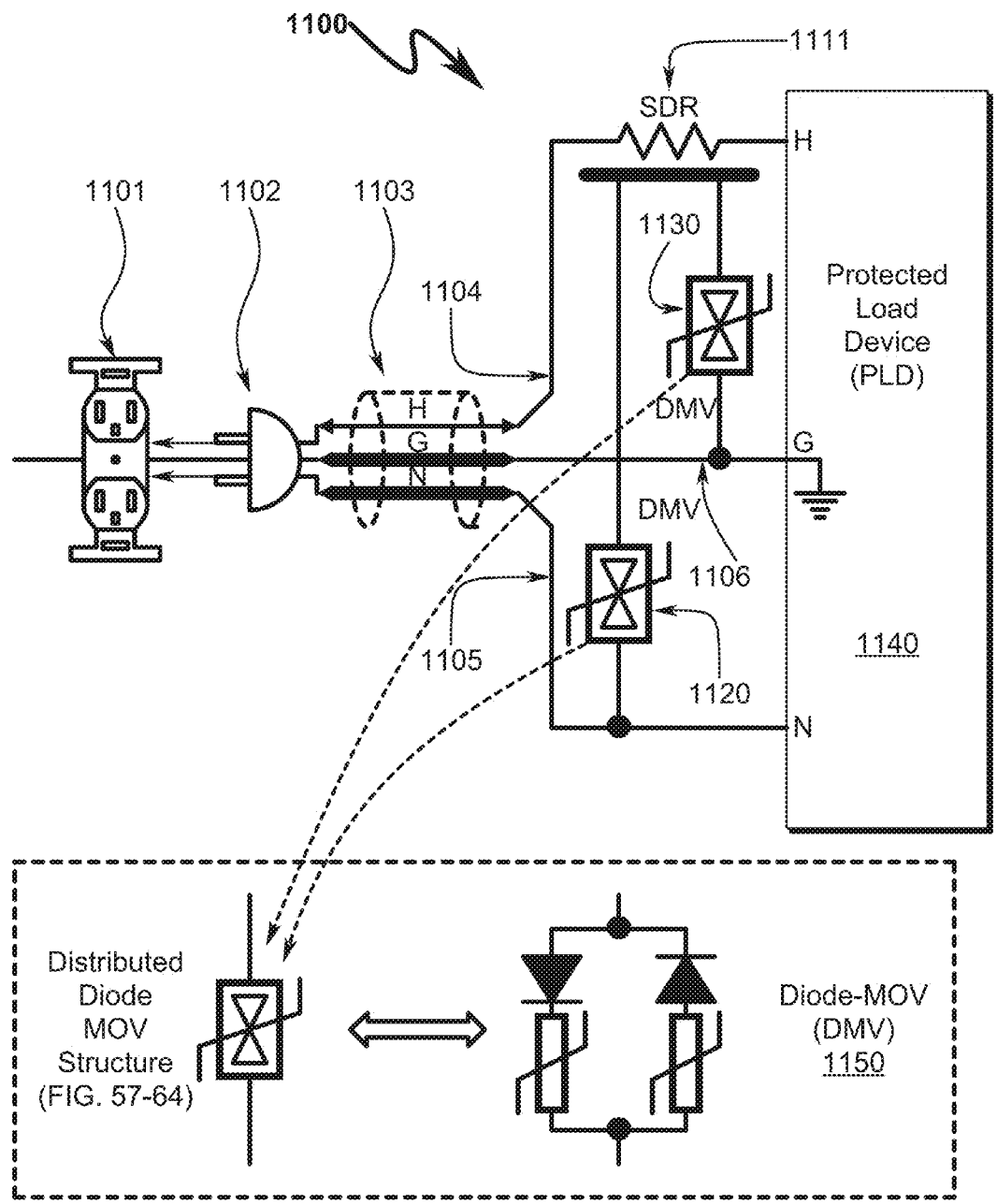
FIG. 11 illustrates a preferred exemplary SDR-DMV distributed transient suppression electrical wiring system embodiment.
Figure 13:
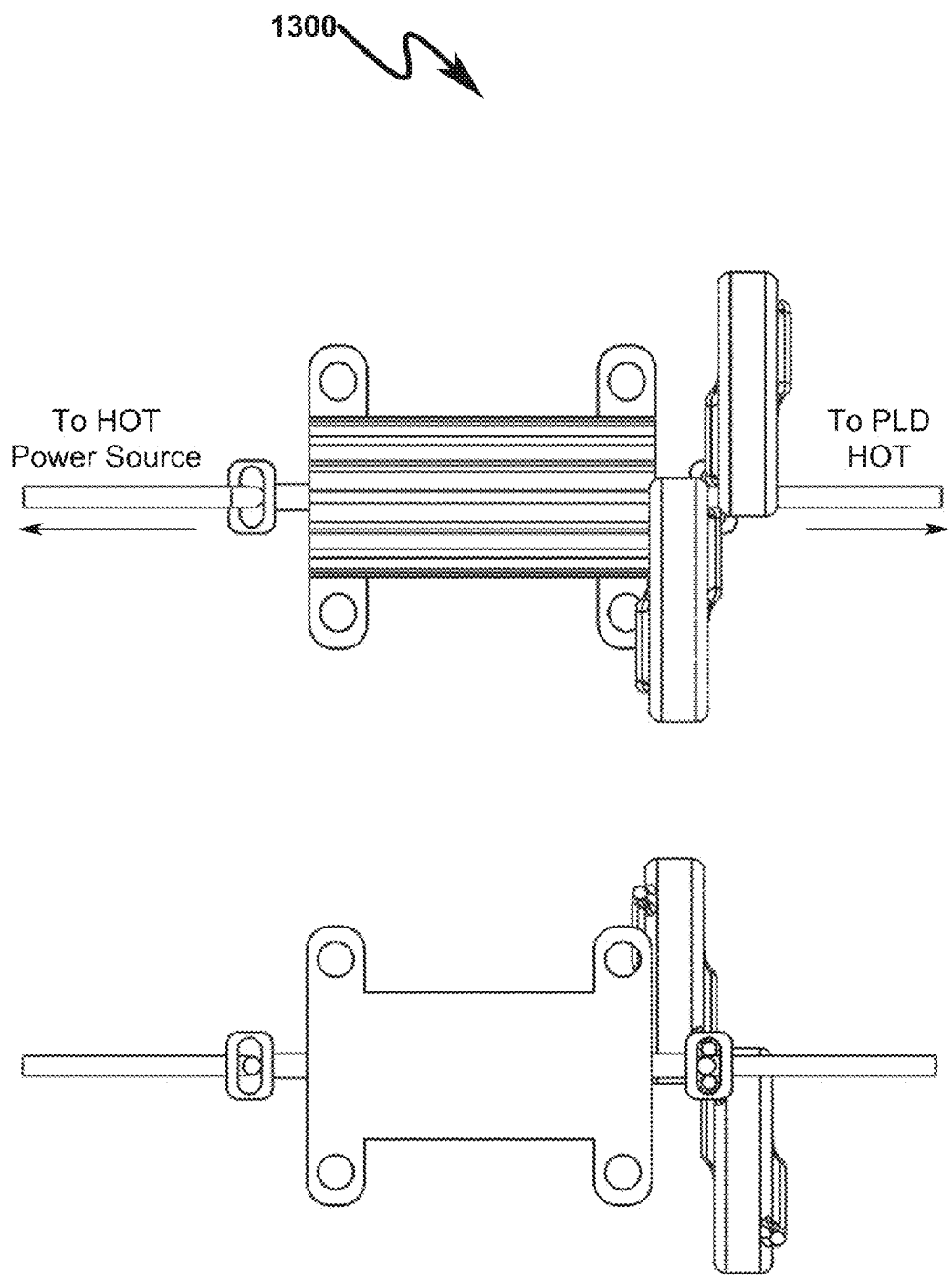
FIG. 13 illustrates top and bottom views of a preferred exemplary transient suppression electrical wiring system embodiment construction.
Figure 15:
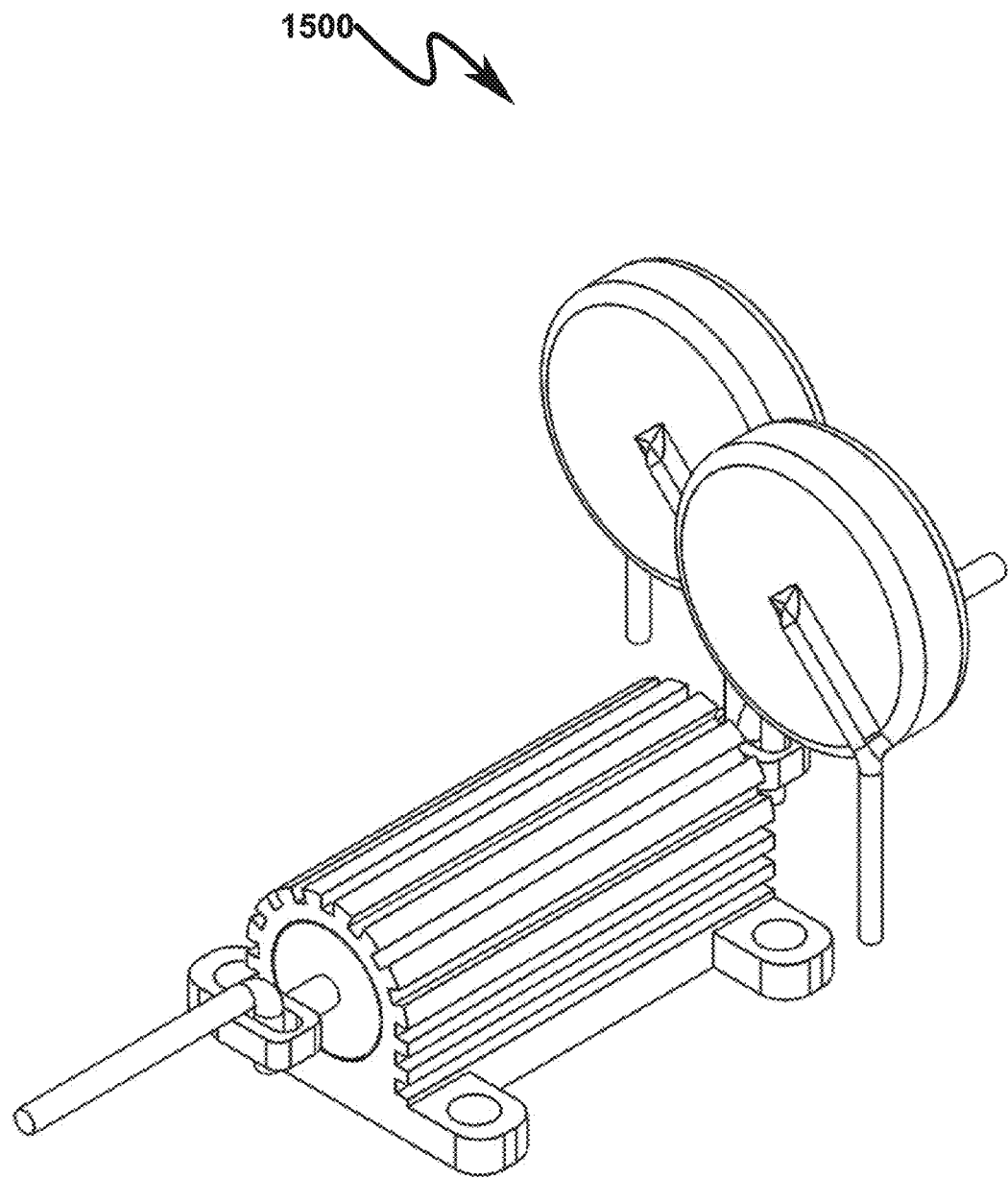
FIG. 15 illustrates a front top perspective view of a preferred exemplary transient suppression electrical wiring system embodiment construction.
Figure 57:
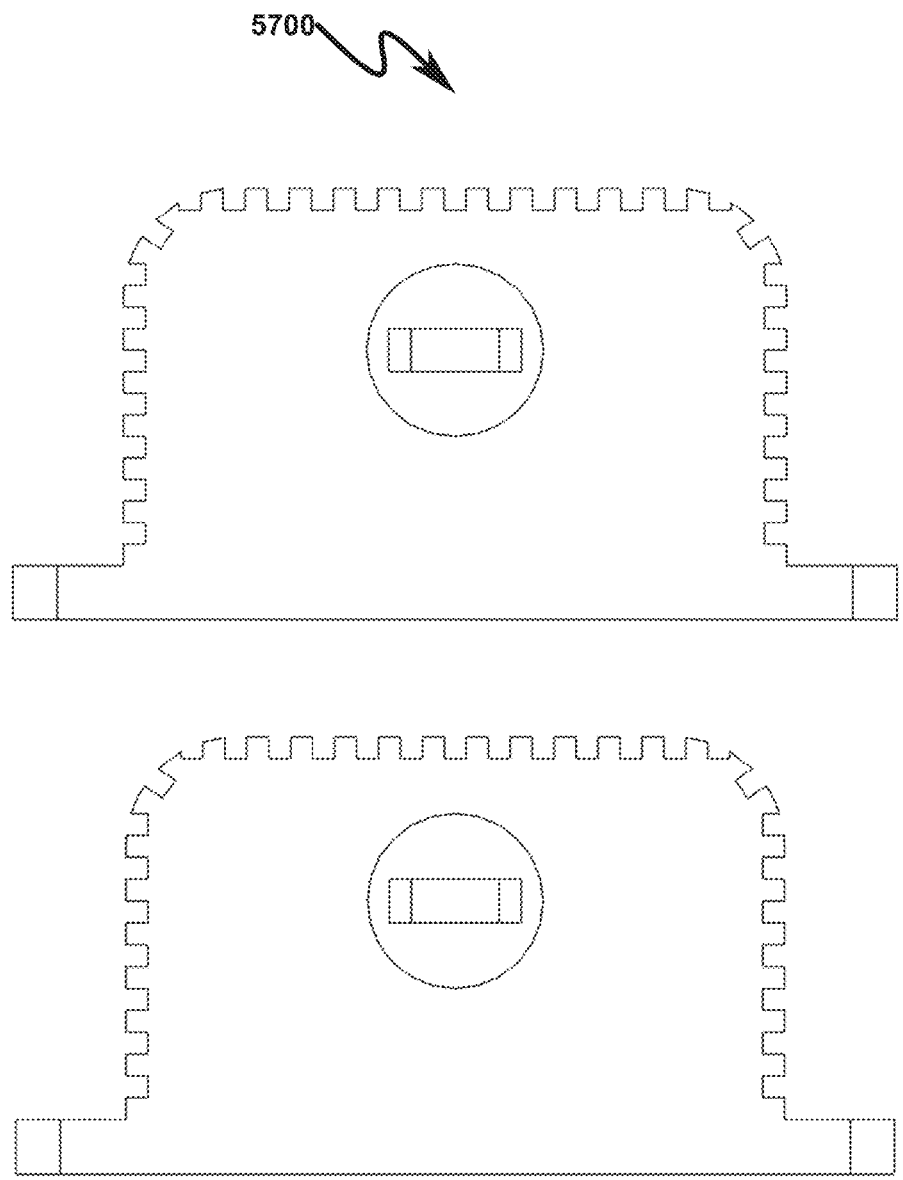
FIG. 57 illustrates front and rear views of a present invention integrated DMV+RESISTOR transient surge suppression structure.

An alternative preferred exemplary embodiment of a present invention transient surge suppression electrical wiring system is generally depicted in FIG. 11 (1100) wherein the SDR (1111) forms a distributed electrical connection to the DMV structures (1150). In this configuration the SDR/MOV/DIODE structures are integrated into a unified structure wherein the voltage drop across the SDR is fed into the MOV/DIODE structure for shunting to either the NEUTRAL (1105) or GROUND (1106) conductors. The series drop resistance provided by the SDR (1111) protects the PLD (1140) when the MOV structure is activated in the presence of a transient surge event. More details of the physical structure of this SDR-DMV device are depicted in FIG. 57 (5700)-FIG. 64 (6400).

Exemplary Construction (1200)-(1600)

Figure 16:
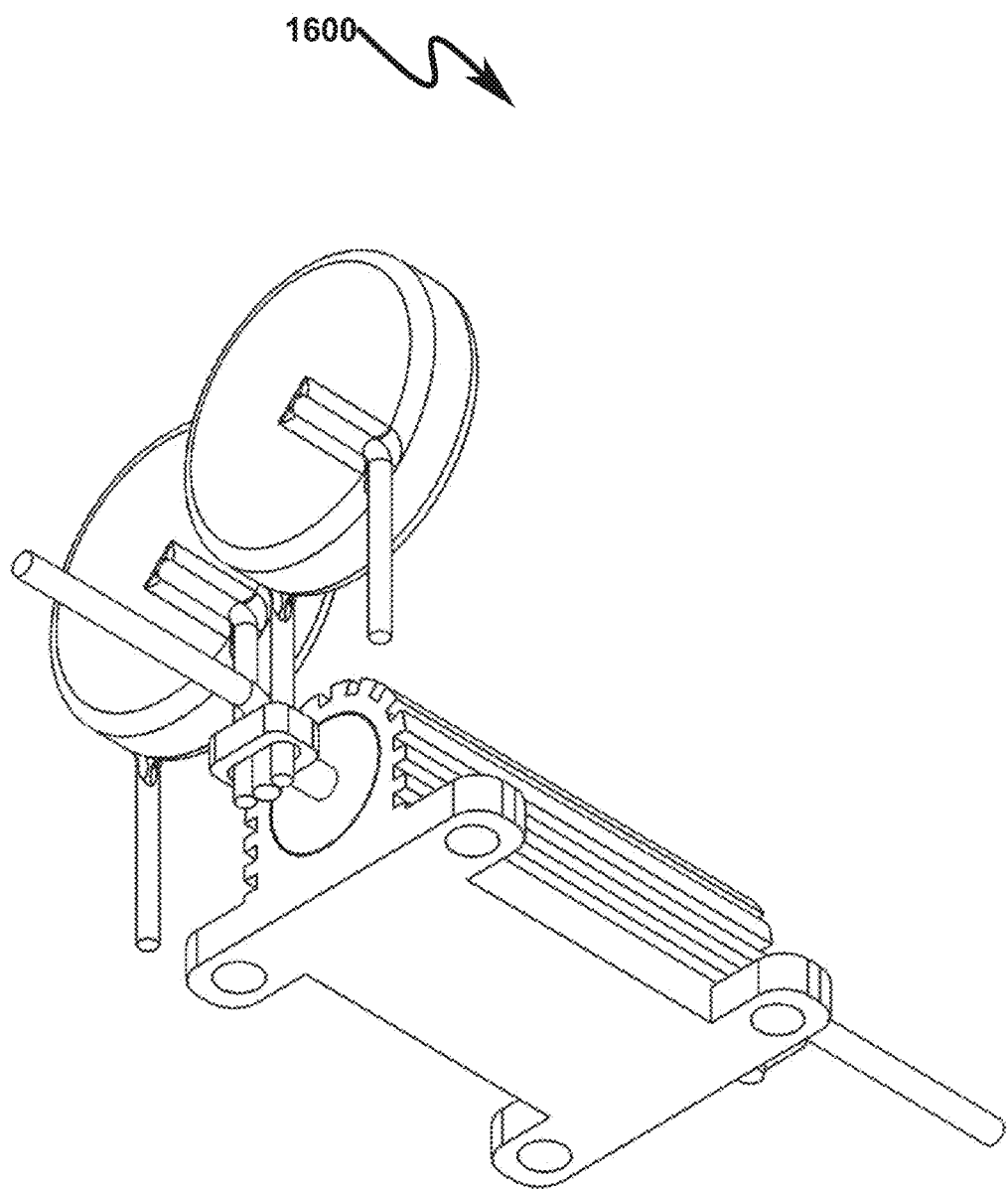
FIG. 16 illustrates a rear bottom perspective view of a preferred exemplary transient suppression electrical wiring system embodiment construction.

While the present invention may be constructed in a variety of ways, a preferred construction technique is depicted in FIG. 12 (1200)-FIG. 16 (1600). Here the SDR is embodied as a power resistor configured in an extruded aluminum housing with input lug connected to the HOT power input and output lug connected to the PLD. The output lead is also shunted to the NEUTRAL and GROUND cable wiring via the use of either a MOV device or a hybrid MOV-DIODE device. The depiction of this integrated surge suppression device is consistent with packaging of various embodiments depicted in FIG. 17 (1700)-FIG. 56 (5600). In some embodiments the use of a shunting diode will require the connection of the MOV devices to corresponding discrete rectifier diodes. Multiple MOV+DIODE structures may be required if discrete DMV surge suppression techniques are employed as described in other system embodiments detailed below.

Prior Art MOV Construction (1700)-(2400)

Figure 17:
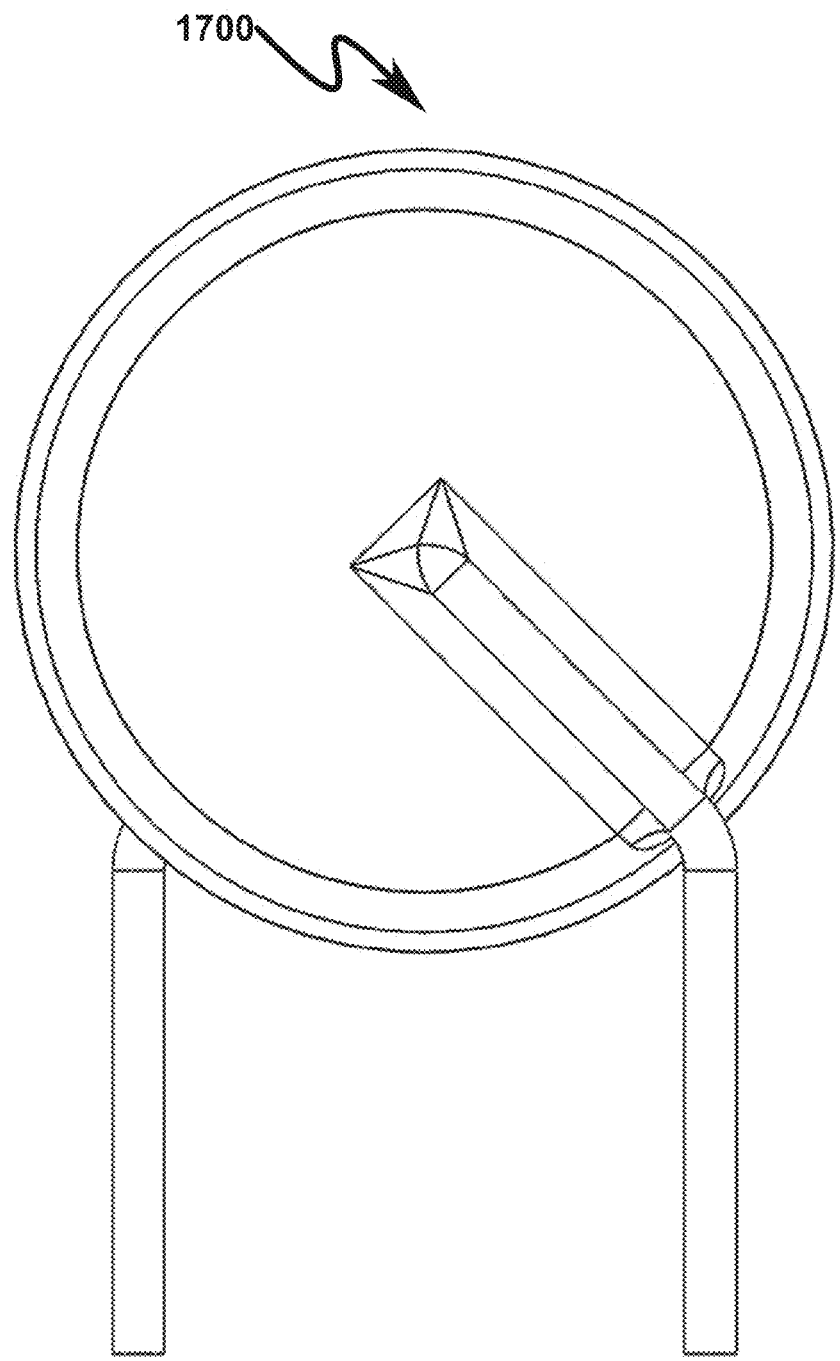
FIG. 17 illustrates a front view of a prior art metal oxide varistor (MOV)
Figure 18:
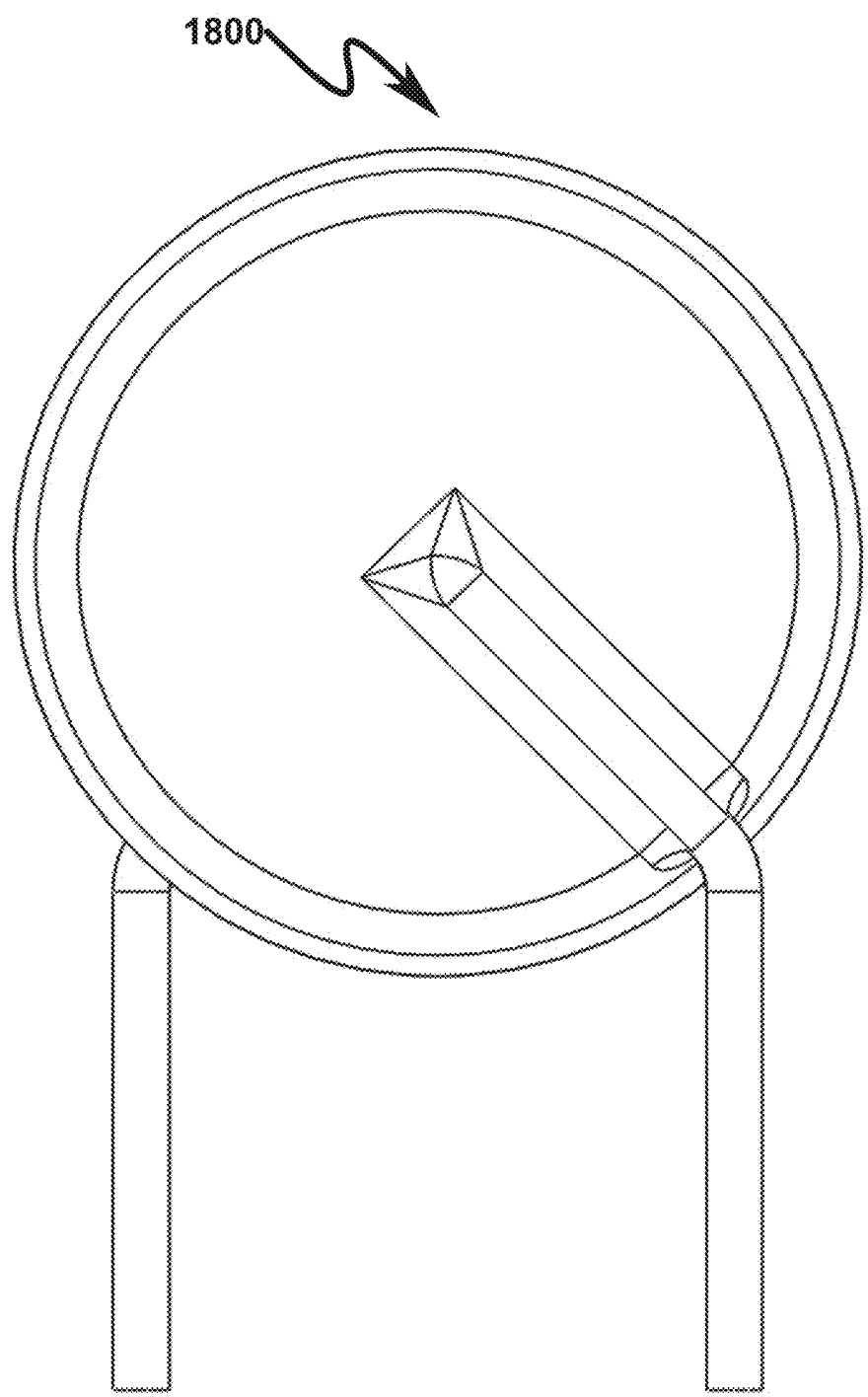
FIG. 18 illustrates a rear view of a prior art metal oxide varistor (MOV)
Figure 20:
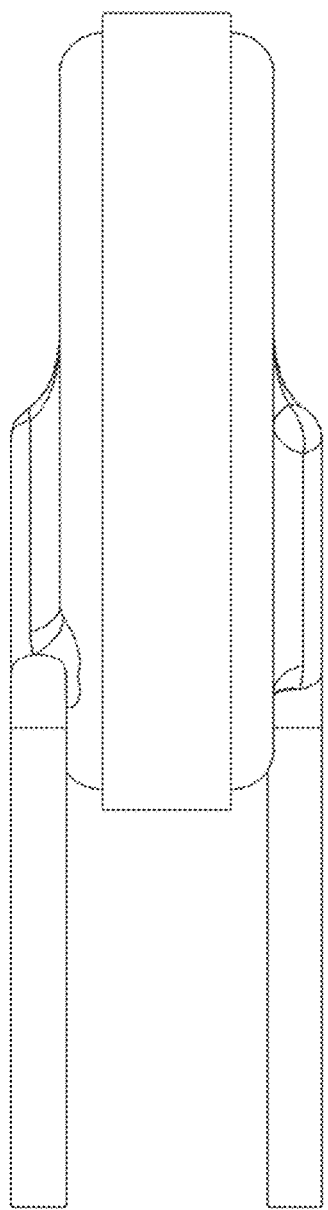
FIG. 20 illustrates a side view of a prior art metal oxide varistor (MOV)
Figure 21:
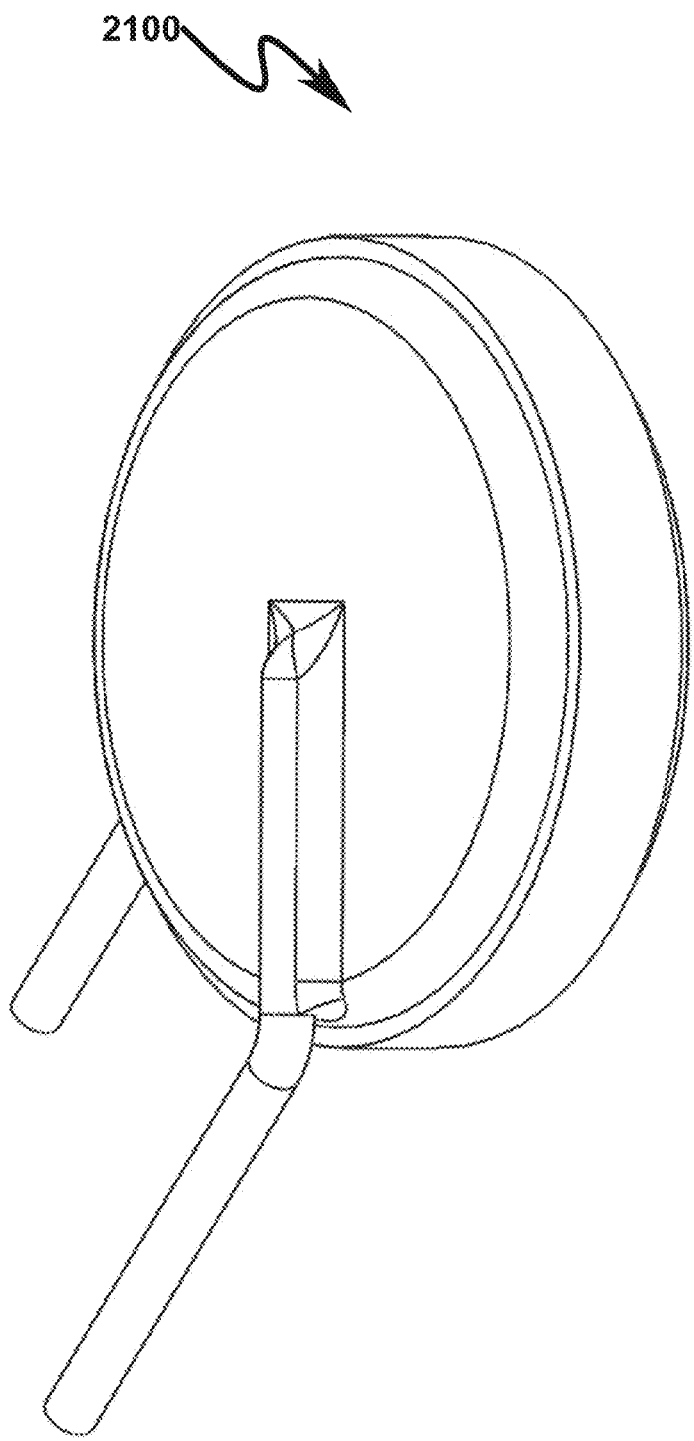
FIG. 21 illustrates a top front right perspective view of a prior art metal oxide varistor (MOV)
Figure 22:
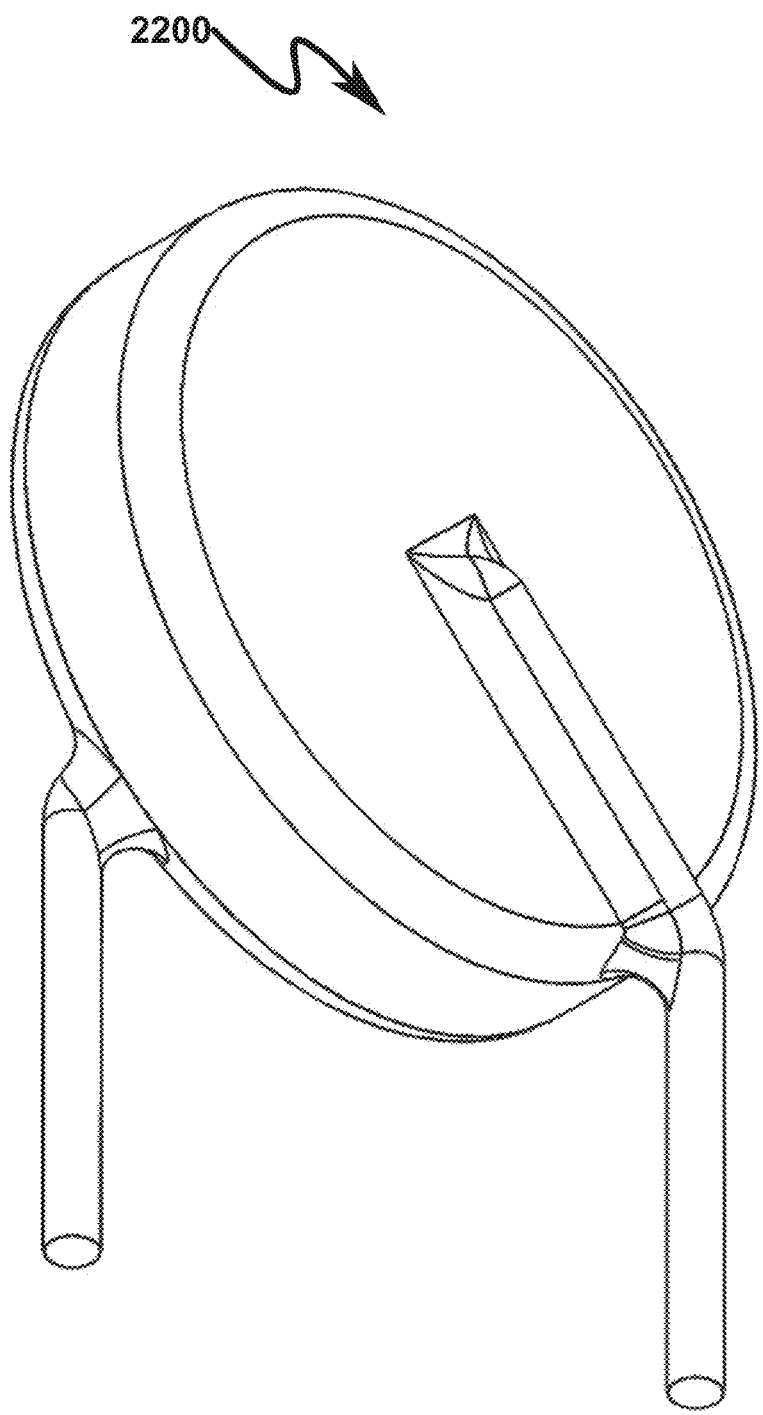
FIG. 22 illustrates a bottom front left perspective view of a prior art metal oxide varistor (MOV)
Figure 23:
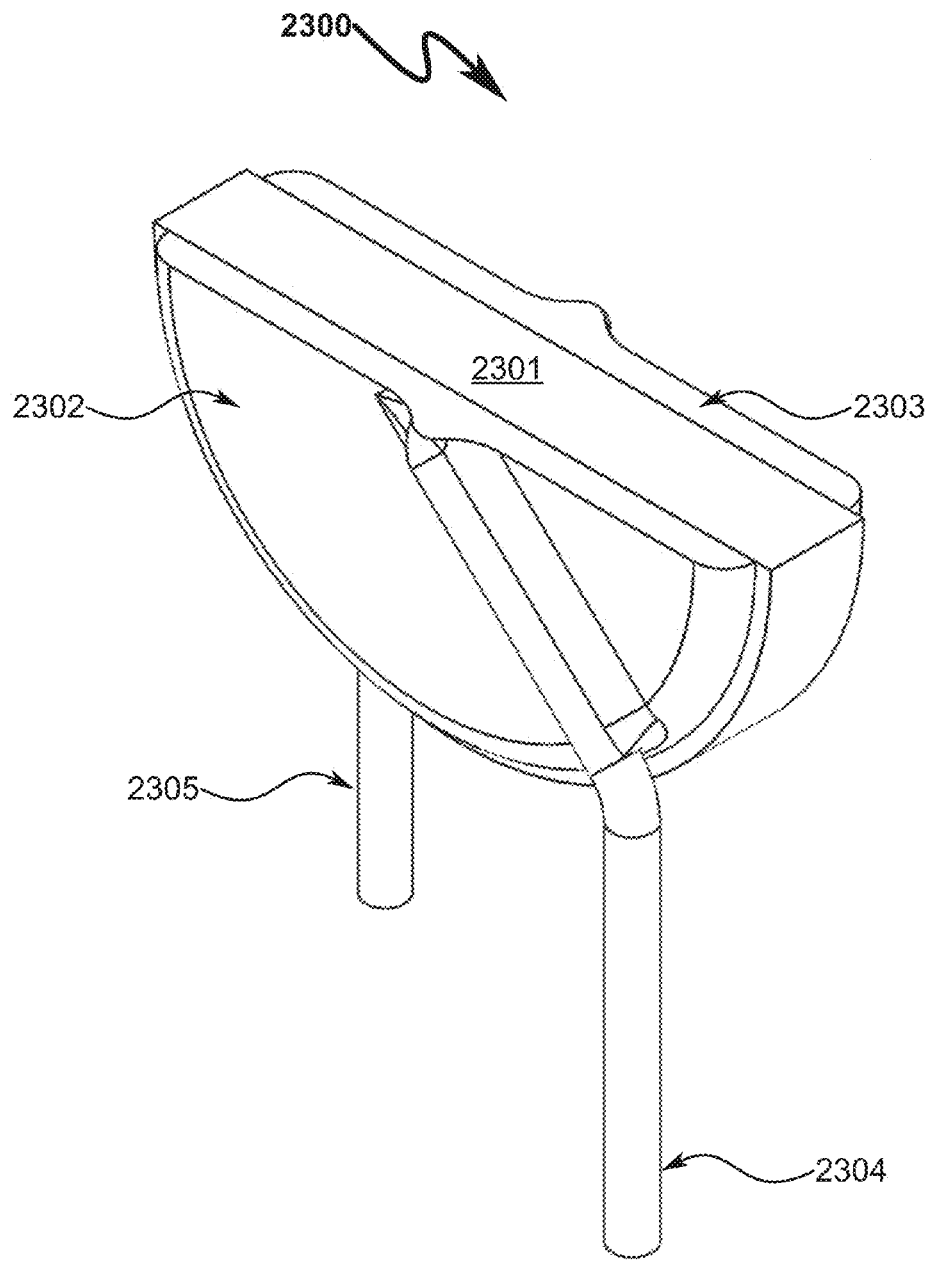
FIG. 23 illustrates a top front right perspective sectional view of a prior art metal oxide varistor (MOV)
Figure 24:
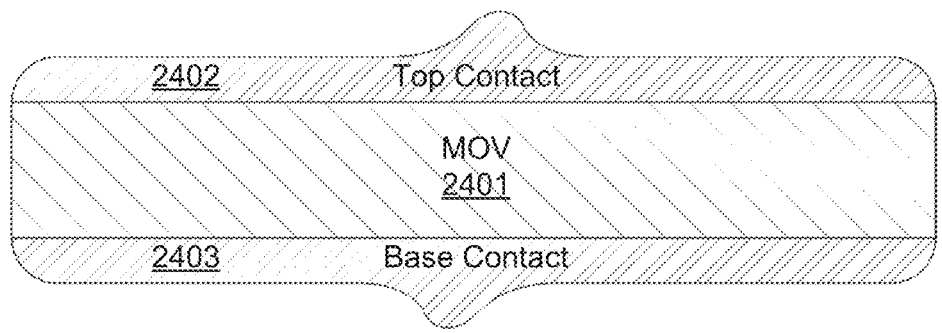
FIG. 24 illustrates a top sectional view of a prior art metal oxide varistor (MOV)

Many preferred invention embodiments utilize metal oxide varistor (MOV) surge suppressors. These devices are well known in the art and as depicted in FIG. 17 (1700)-FIG. 24 (2400). Generally speaking these devices are commonly configured in a two-terminal configuration as depicted with a zinc oxide (ZnO) impregnated ceramic MOV material (2301, 2401) sandwiched between a conducting top contact (2302, 2402) and base contact (2303, 2403) and to which component leads (2304, 2305) are contacted. The entire sandwich structure is generally encapsulated in an insulating material that is not depicted in any of illustrated diagrams but which may take a variety of well known forms.

While the MOV structure may be used individually in many present invention embodiments as discrete components in conjunction with discrete rectifier diodes, many preferred invention embodiments teach a variety of novel integrated MOV+DIODE structures as discussed below.

MOV+DIODE Transient Surge Suppressor (2500)-(3200)

Figure 25:
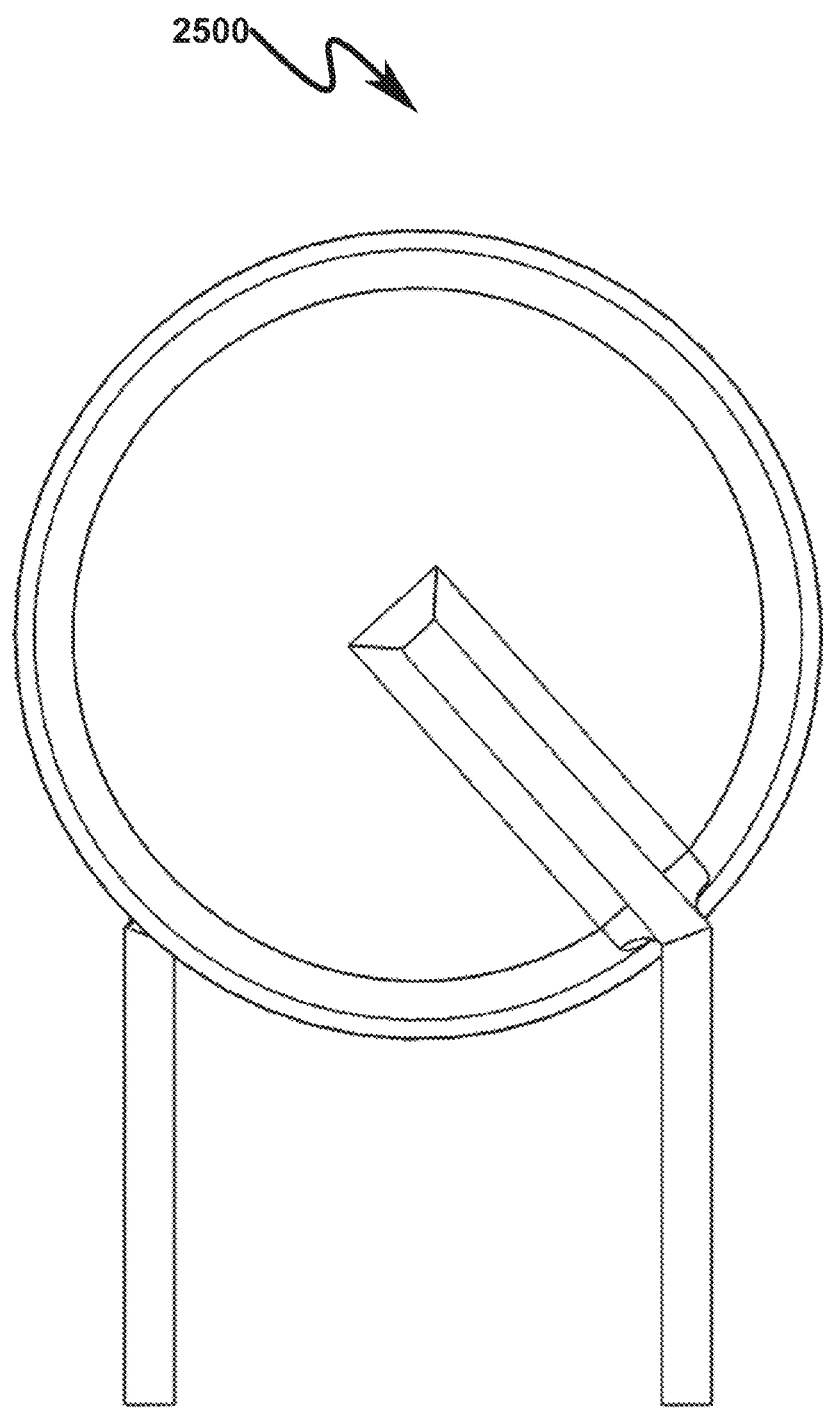
FIG. 25 illustrates a front view of a present invention integrated MOV+DIODE transient surge suppression structure.
Figure 26:
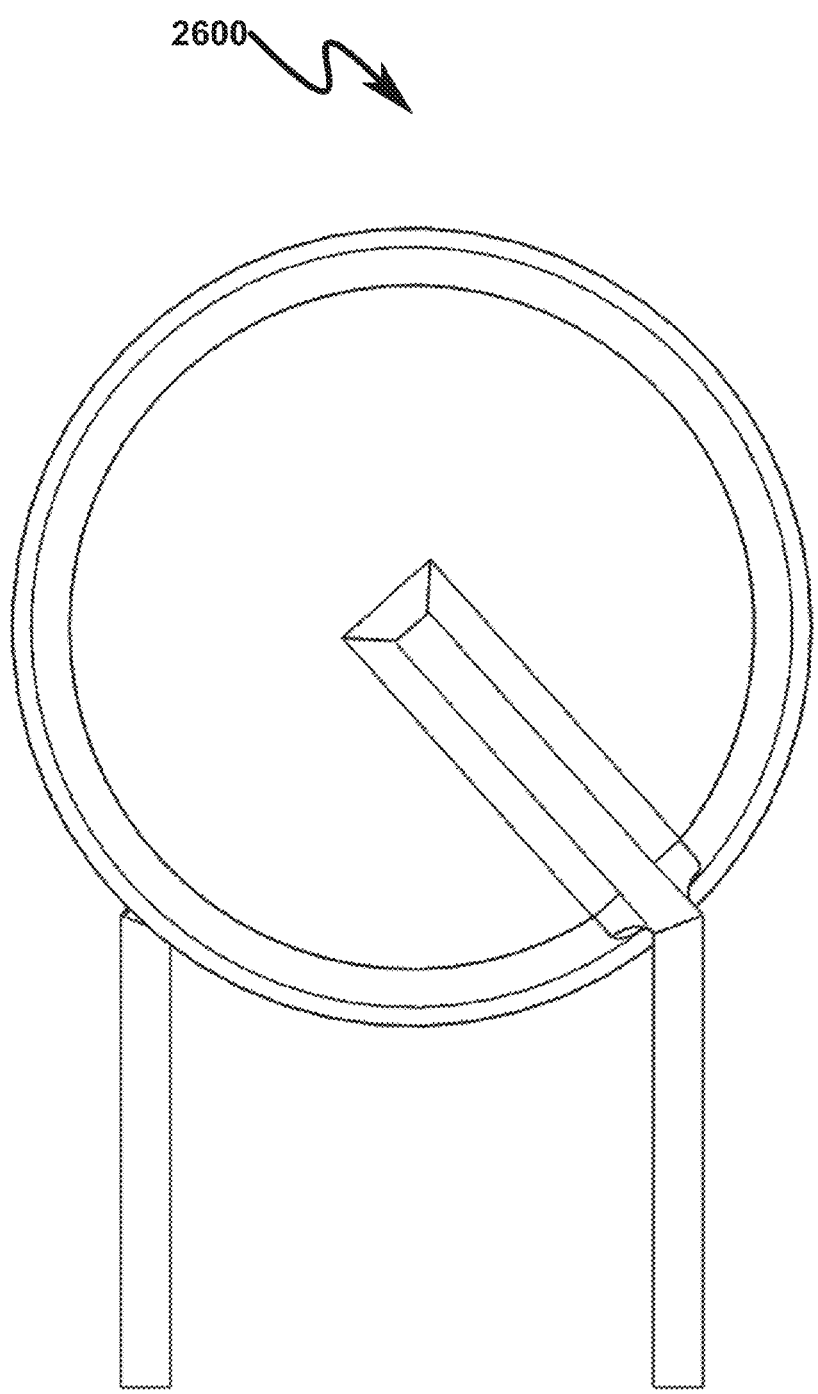
FIG. 26 illustrates a rear view of a present invention integrated MOV+DIODE transient surge suppression structure.
Figure 28:
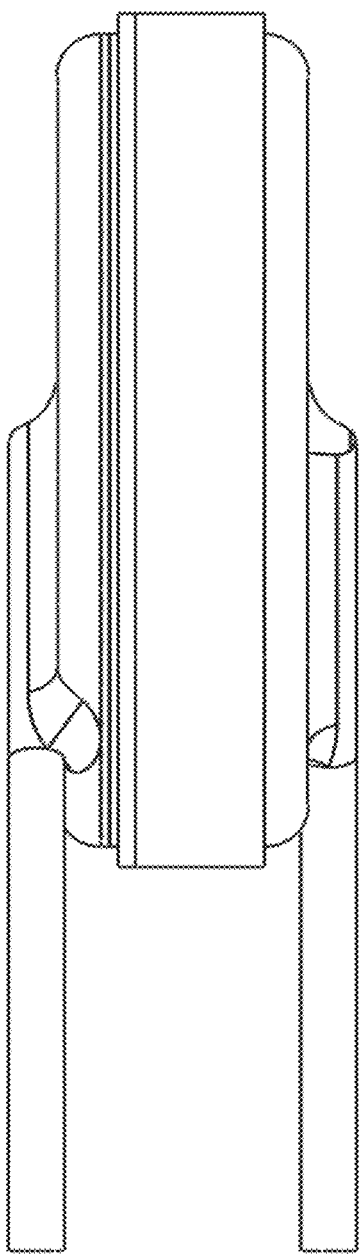
FIG. 28 illustrates a side view of a present invention integrated MOV+DIODE transient surge suppression structure.
Figure 29:
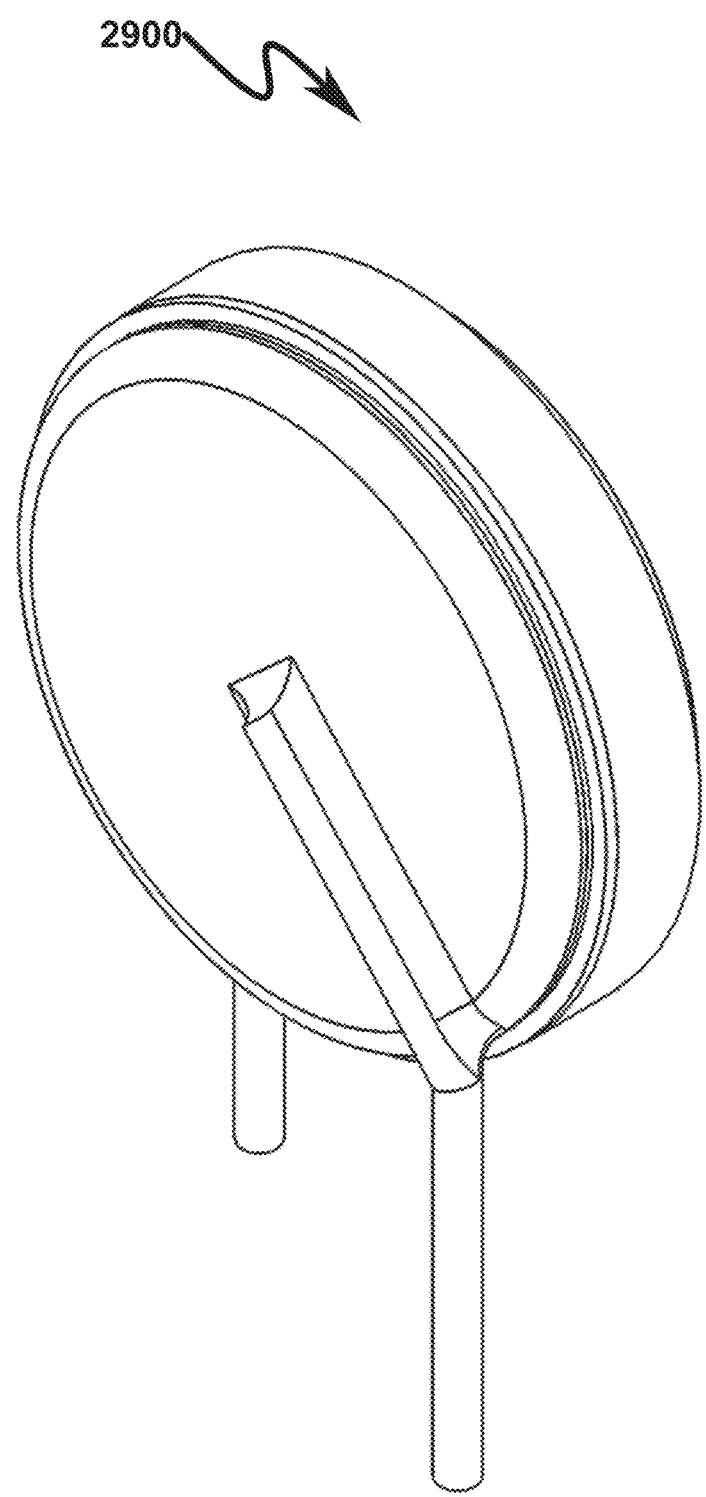
FIG. 29 illustrates a top front right perspective view of a present invention integrated MOV+DIODE transient surge suppression structure.
Figure 30:
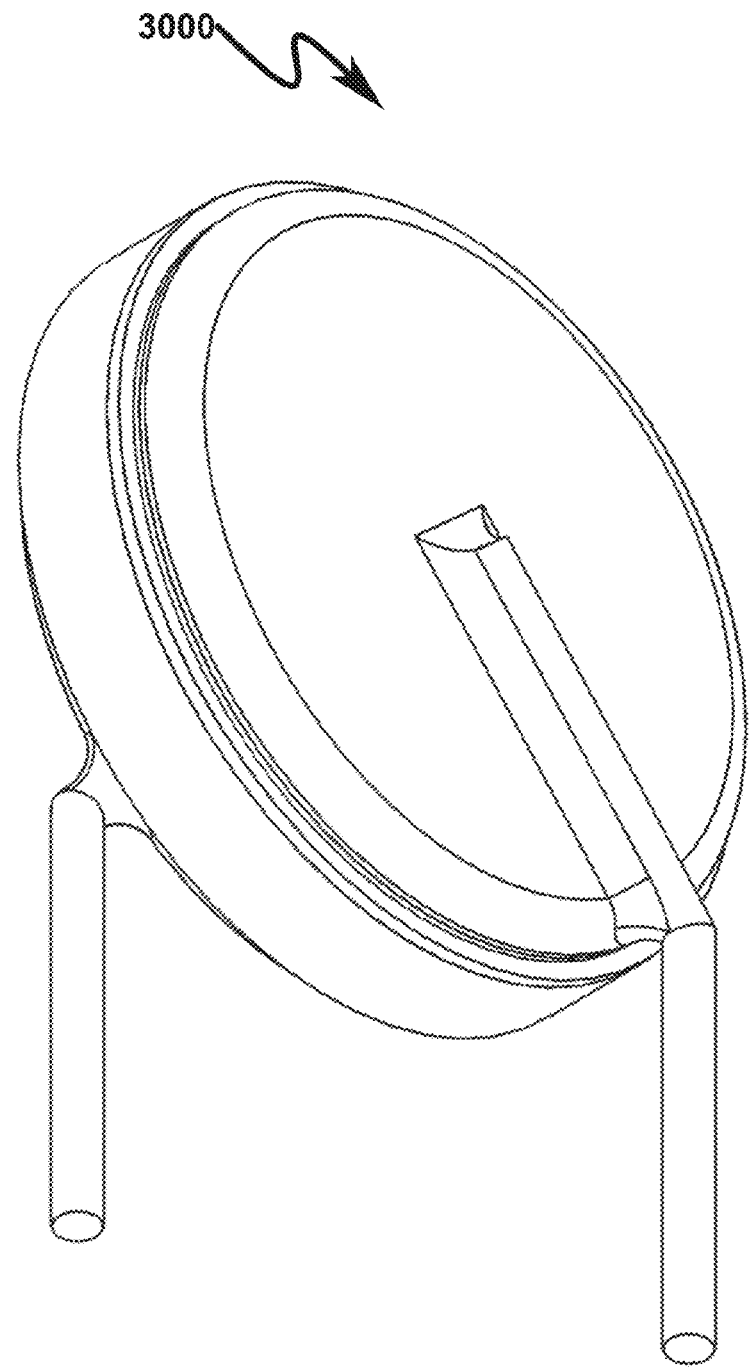
FIG. 30 illustrates a bottom front left perspective view of a present invention integrated MOV+DIODE transient surge suppression structure.
Figure 32:
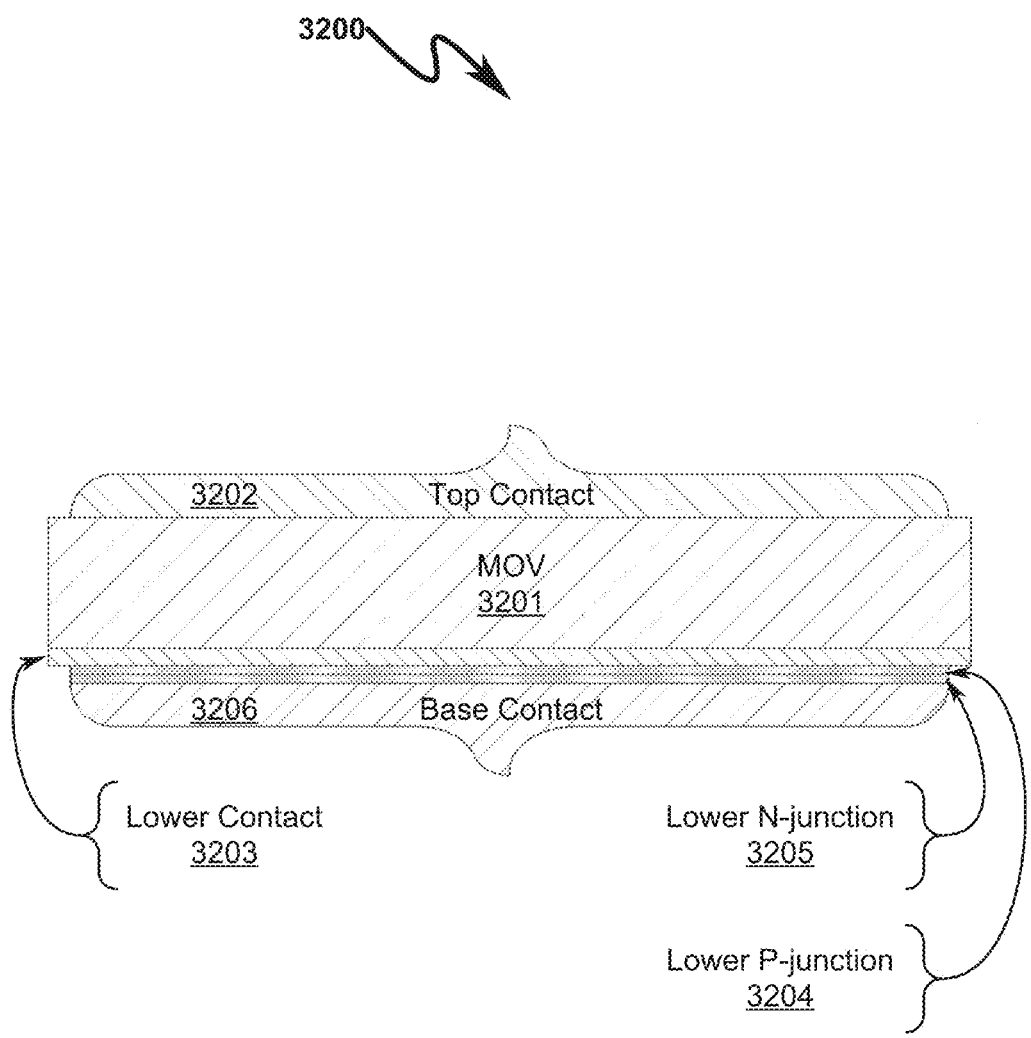
FIG. 32 illustrates a top sectional view of a present invention integrated MOV+DIODE transient surge suppression structure.

The present invention may incorporate an integrated MOV+DIODE transient surge suppressor structure as generally depicted in FIG. 25 (2500)-FIG. 32 (3200). In this two-terminal integrated transient surge suppression structure the MOV device is augmented with a semiconductor P-N diode contacting one side of the MOV. Conventional lead connections to one exposed surface of the MOV and one exposed surface of the P-N semiconductor diode provide two points of electrical connection to the device. As discussed elsewhere, the sandwich structure depicted will typically be encapsulated in an insulating material that is not depicted in these drawings.

Figure 31:
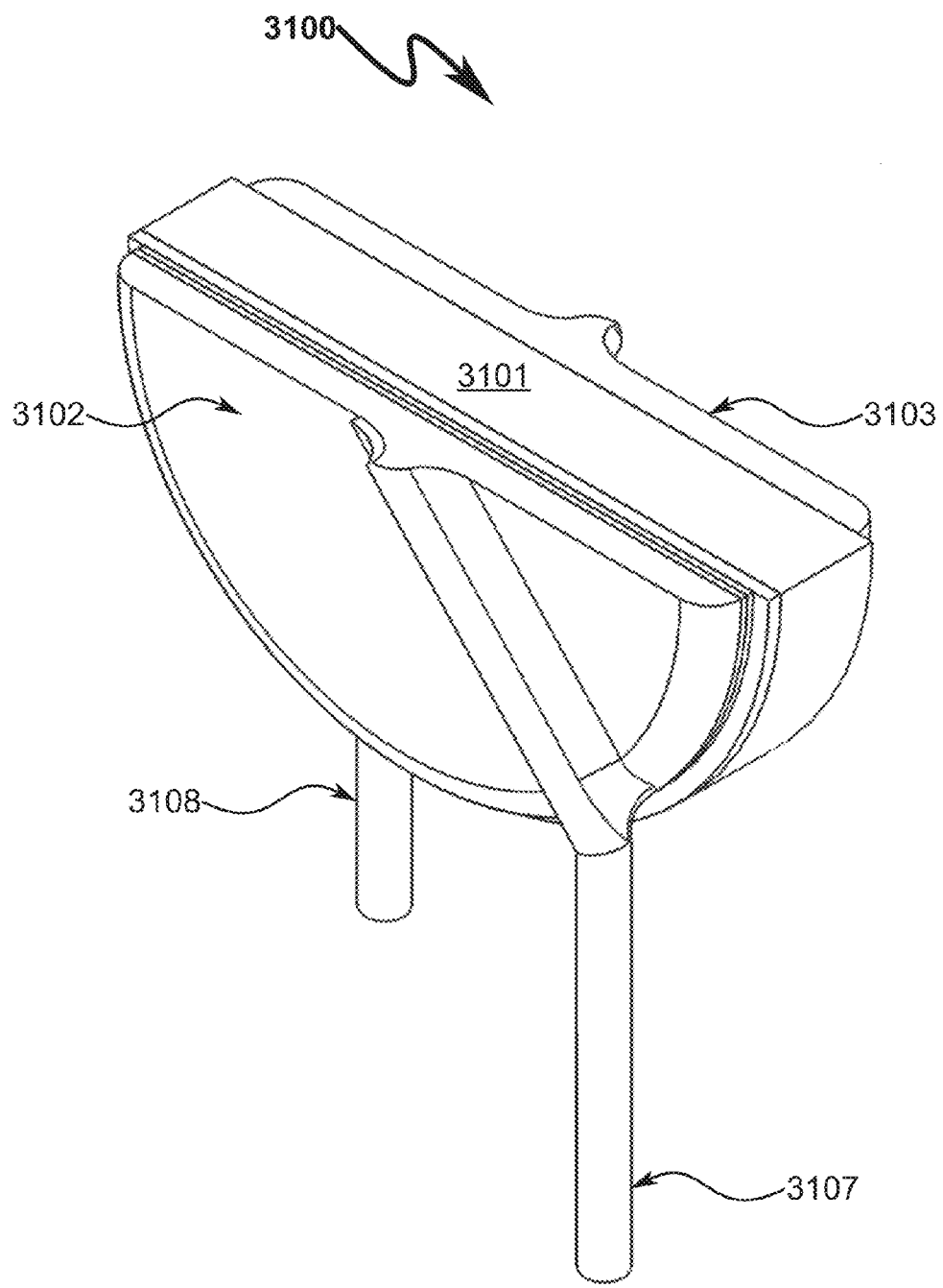
FIG. 31 illustrates a top front right perspective sectional view of a present invention integrated MOV+DIODE transient surge suppression structure.

Referencing the cross section views of FIG. 31 (3100) and FIG. 32 (3200), the integrated MOV+DIODE transient surge suppressor structure can be observed wherein the MOV element (3101, 3201) electrically connects to and is sandwiched between a top contact (3102, 3202) and a lower contact (3103, 3203). The lower contact (3103, 3203) mates to a semiconductor P-N junction (3204, 3205) which electrically connects to and is sandwiched between a base contact (3206) and the lower contact (3103, 3203). The semiconductor P-N junction (3204, 3205) rectification direction may be reversed in some embodiments such that the depicted lower P-junction (3204) is an N-junction and the depicted lower N-junction (3205) is a P-junction. Connection to the integrated MOV-DIODE device is via conventional component wire leads (3107, 3108).

Stud MOV+DIODE Transient Surge Suppressor (3300)-(3600)

Figure 33:
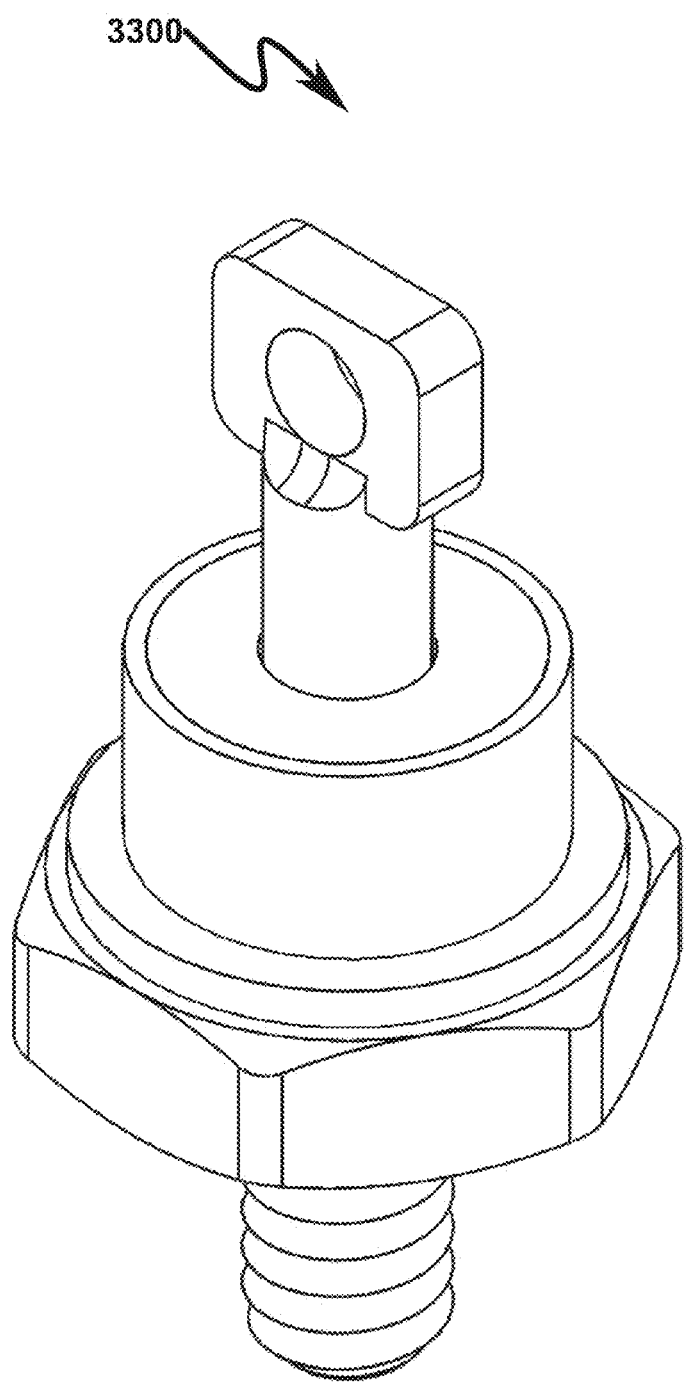
FIG. 33 illustrates a front view of a present invention integrated MOV+DIODE transient surge suppression structure encapsulated within a stud-mounted diode package.
Figure 36:
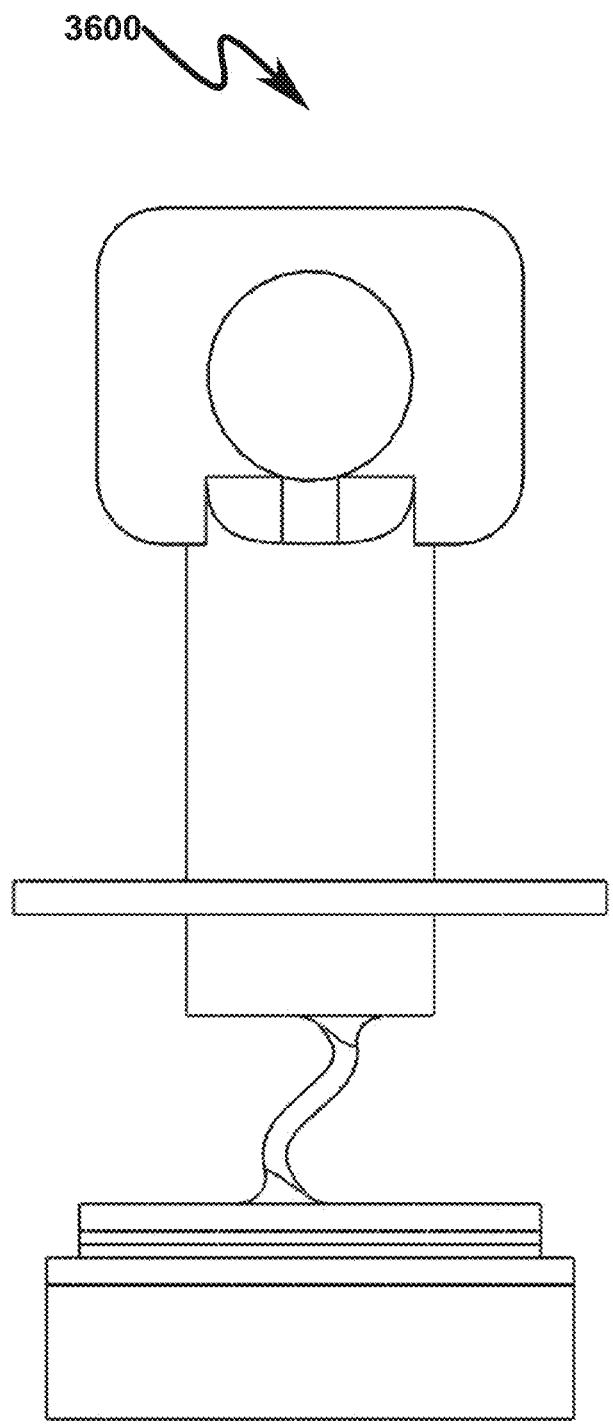
FIG. 36 illustrates a side view of a present invention integrated MOV+DIODE transient surge suppression structure encapsulated within a stud-mounted diode package.

The sandwich structure depicted in FIG. 25 (2500)-FIG. 32 (3200) may also be encapsulated in any number of conventional stud (or epoxy-packaged) rectifier packages as generally depicted in FIG. 33 (3300)-FIG. 36 (3600). In this exemplary two-terminal integrated transient surge suppression structure the stud package (FIG. 33 (3300) as depicted in a typical JEDEC DO-5 package) is augmented with a MOV device combined and a semiconductor P-N diode contacting one side of the MOV. Connections to one exposed surface of the MOV and one exposed surface of the P-N semiconductor diode provide two points of electrical connection to the device using the stud casing and stud input lead.

Figure 34:
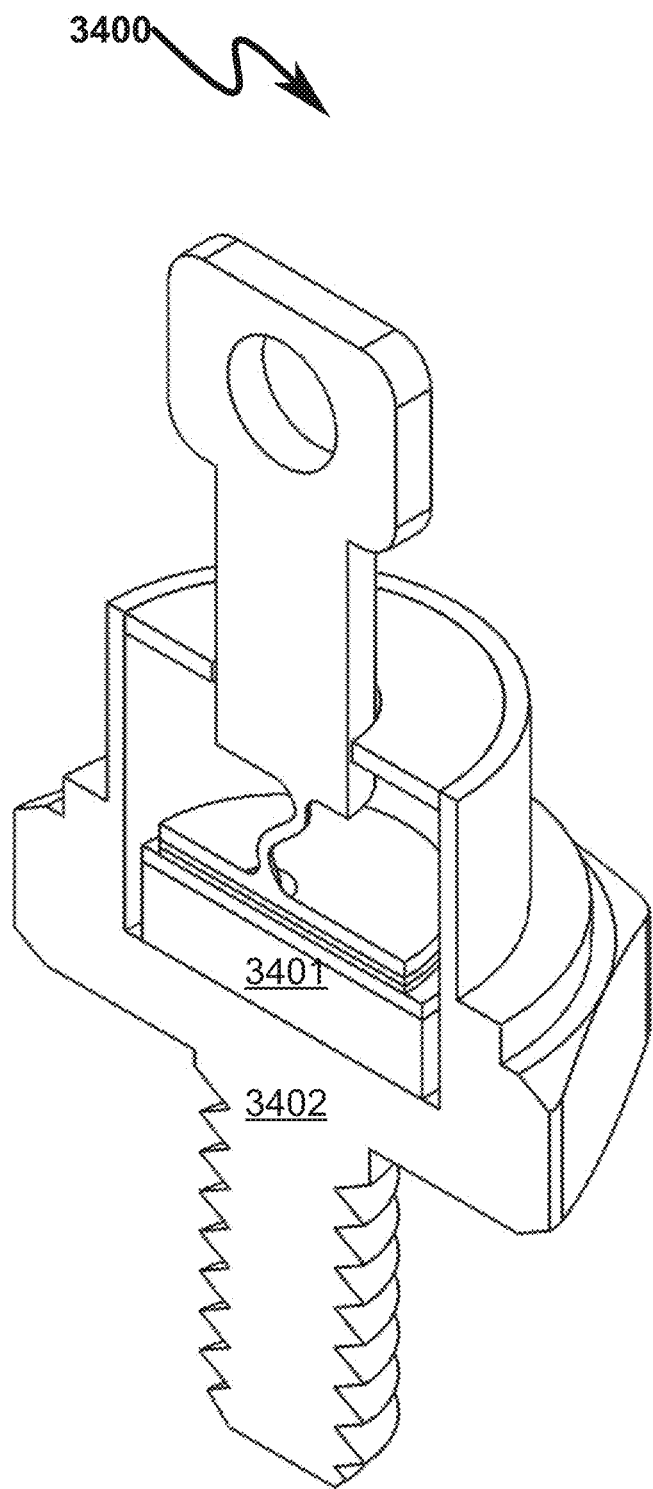
FIG. 34 illustrates a rear view of a present invention integrated MOV+DIODE transient surge suppression structure encapsulated within a stud-mounted diode package.
Figure 35:
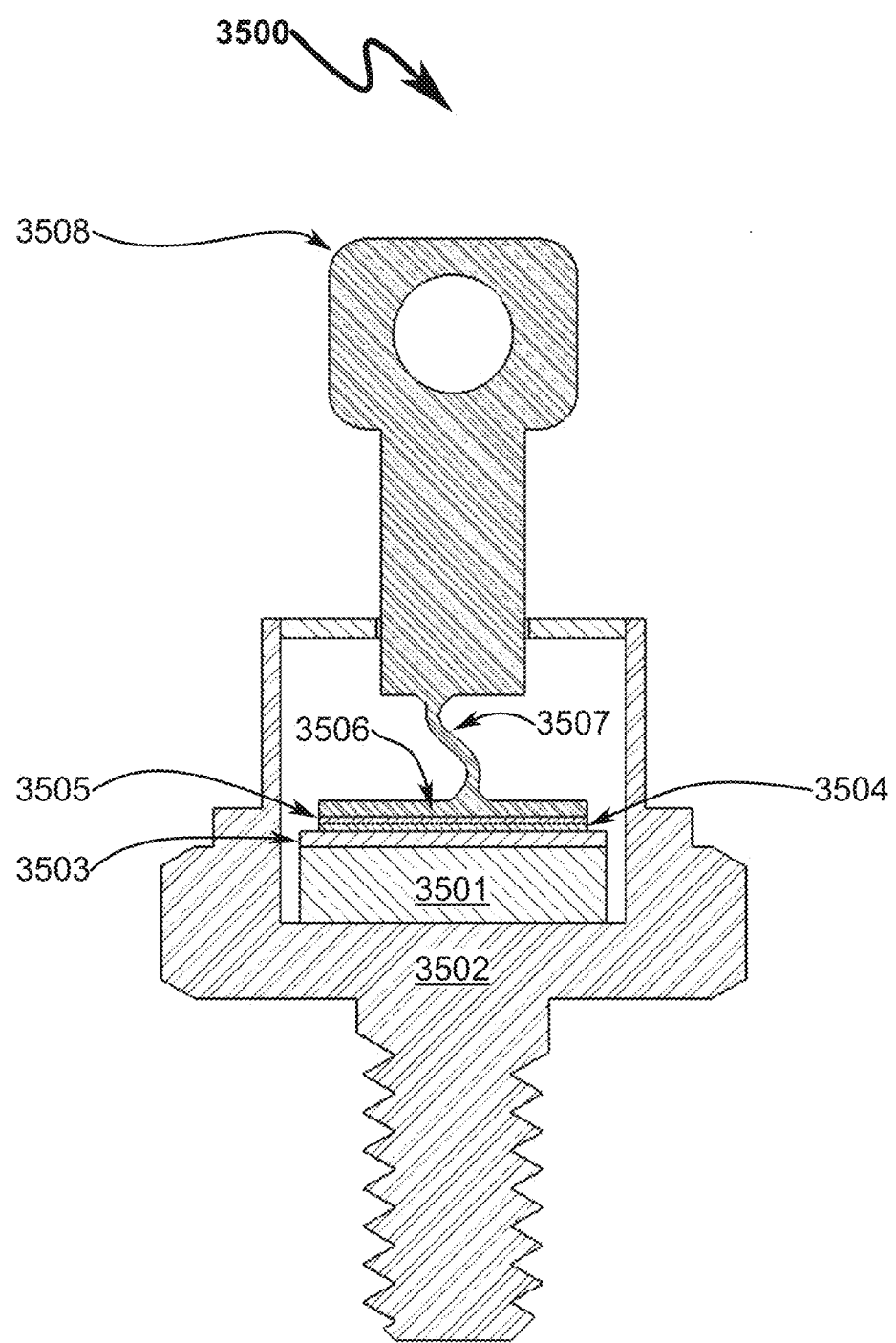
FIG. 35 illustrates top and bottom views of a present invention integrated MOV+DIODE transient surge suppression structure encapsulated within a stud-mounted diode package.

Referencing the cross section views of FIG. 34 (3400)-FIG. 36 (3600), the integrated MOV+DIODE transient surge suppressor structure can be observed wherein the MOV element (3401, 3501) electrically connects to and is sandwiched between a stud case contact (3402, 3502) and a lower contact (3503). The lower contact (3503) mates to a semiconductor P-N junction (3504, 3505) which electrically connects to and is sandwiched between an upper contact (3506) and the lower contact (3503). The semiconductor P-N junction (3504, 3505) rectification direction may be reversed in some embodiments such that the depicted lower P-junction (3504) is an N-junction and the depicted lower N-junction (3505) is a P-junction, thus permitting reverse polarity configurations of the device. The upper contact (3506) is electrically coupled via a bond wire (3507) to the lug terminal (3508) of the device or in some cases the lug terminal (3508) may be directly contacted to the upper contact (3506). Note that the vertical position of the MOV (3401, 3501) and semiconductor P-N junction (3504, 3505) may be reversed in some embodiments with no loss of generality in the functionality of the device.

Dual Stud MOV+DIODE Surge Suppressor (3700)-(4000)

Figure 37:
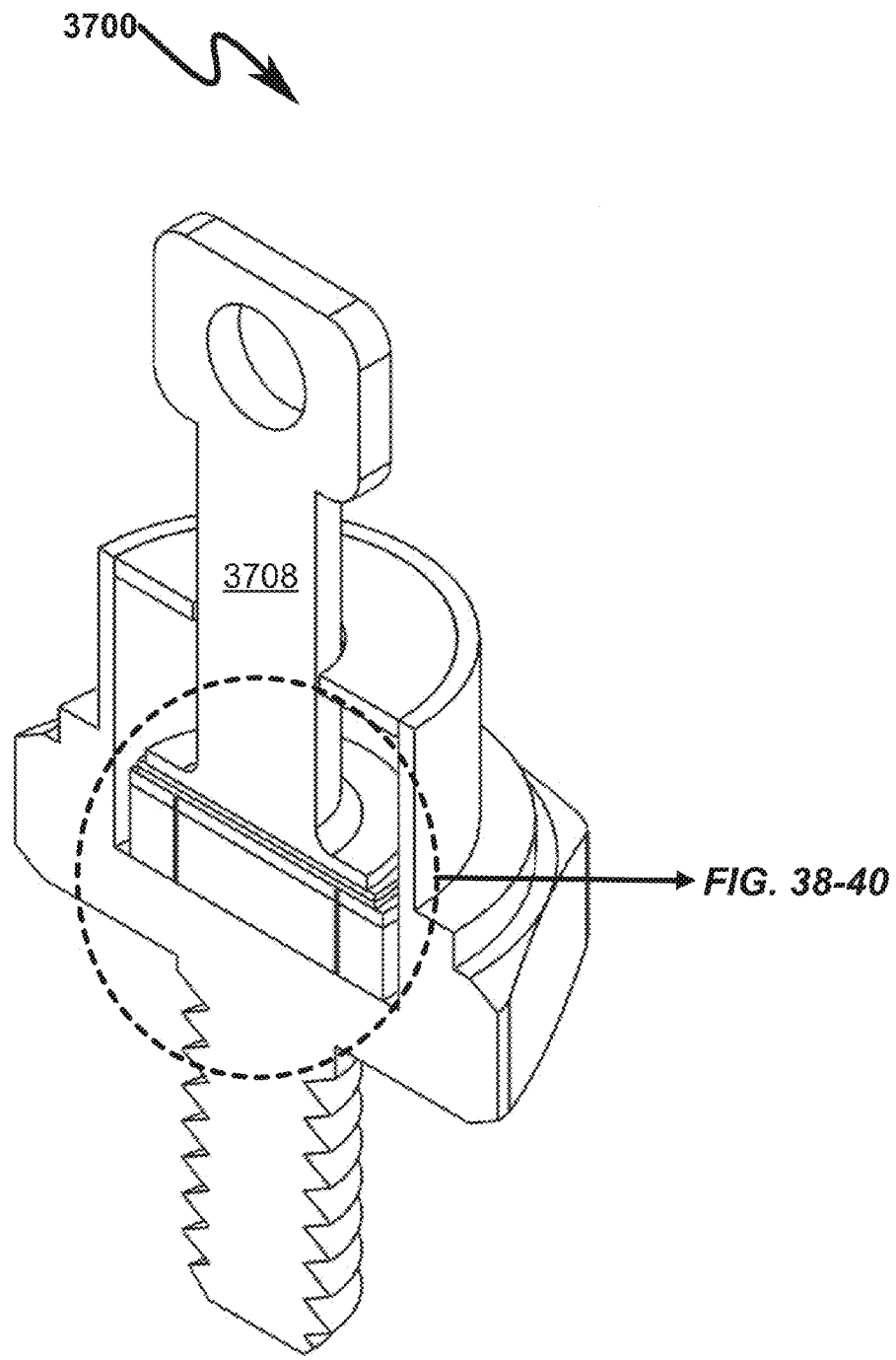
FIG. 37 illustrates a top front right perspective view of a present invention integrated MOV+DIODE transient surge suppression structure encapsulated within a stud-mounted diode package.
Figure 38:
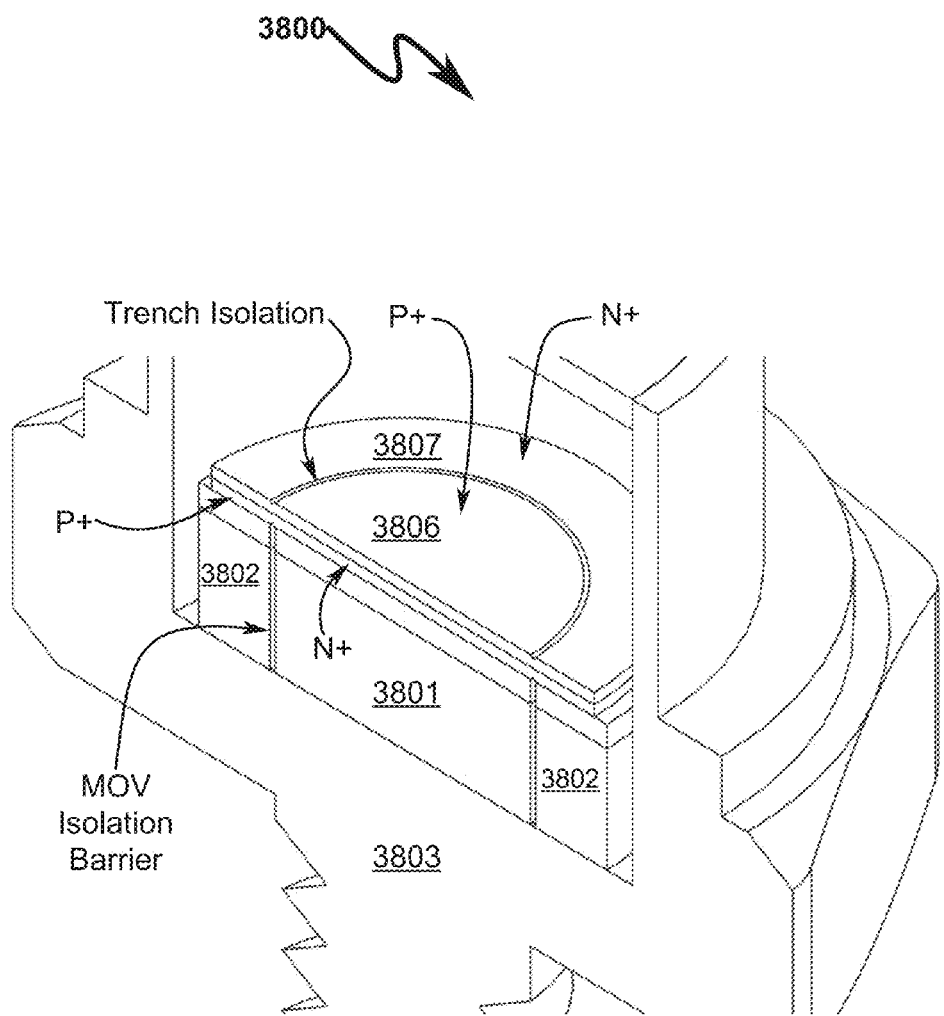
FIG. 38 illustrates a bottom front left perspective view of a present invention integrated MOV+DIODE transient surge suppression structure encapsulated within a stud-mounted diode package.
Figure 39:
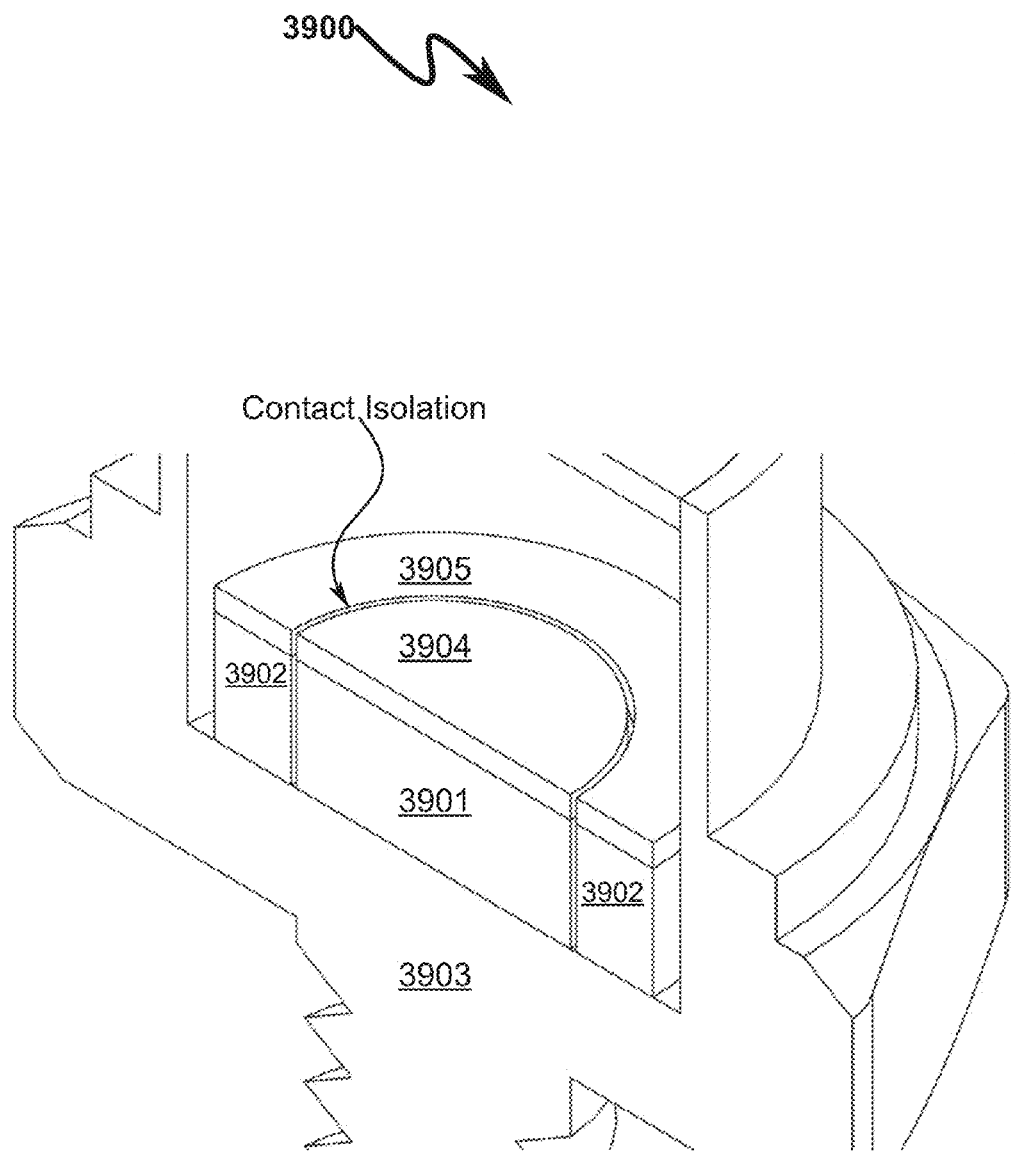
FIG. 39 illustrates a top front right perspective sectional view of a present invention integrated MOV+DIODE transient surge suppression structure encapsulated within a stud-mounted diode package.
Figure 40:
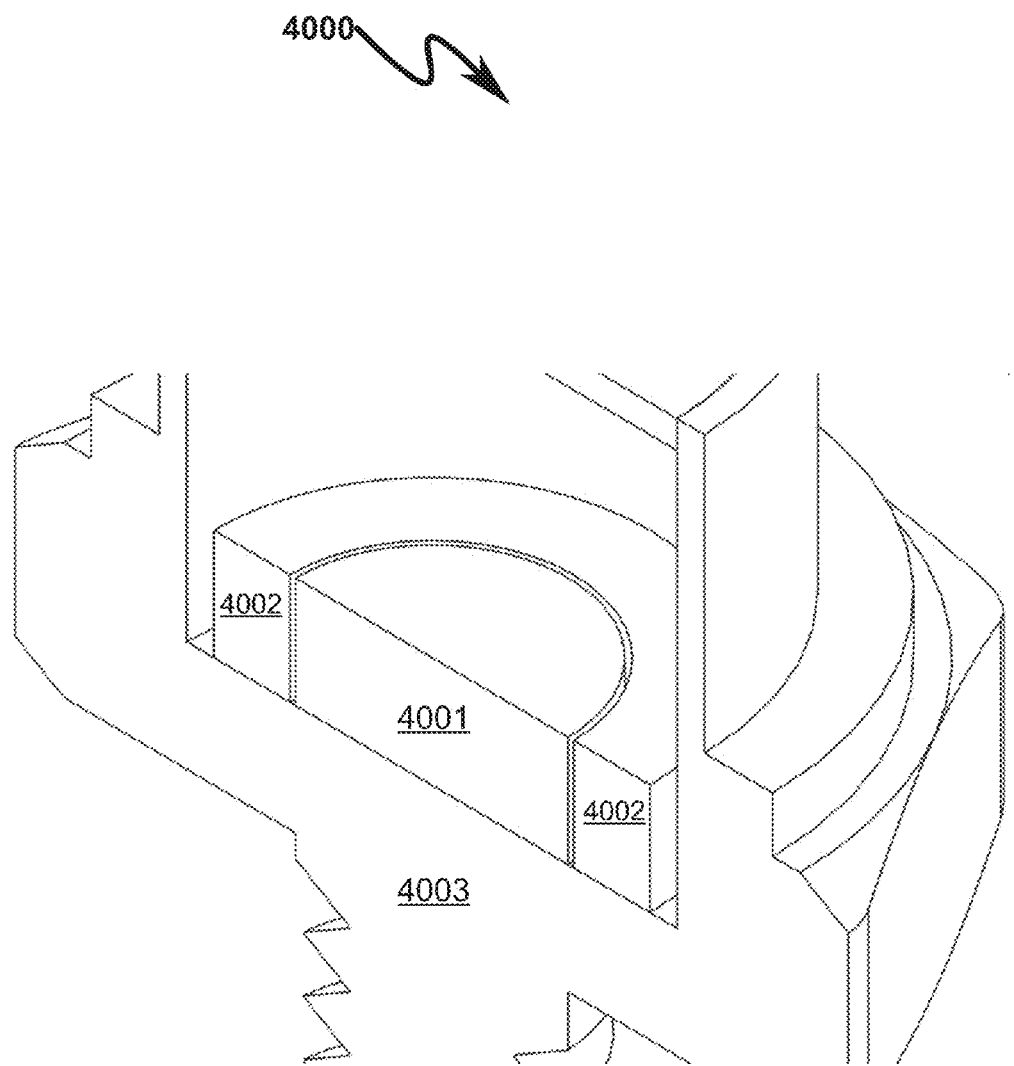
FIG. 40 illustrates a top sectional view of a present invention integrated MOV+DIODE transient surge suppression structure encapsulated within a stud-mounted diode package.

The stud structure depicted in FIG. 33 (3300)-FIG. 36 (3600) may in some embodiments be further integrated to support two MOV structures within one stud (or epoxy-packaged) rectifier package as generally depicted in FIG. 37 (3700)-FIG. 40 (4000). In this exemplary two-terminal integrated transient surge suppression structure the stud package (FIG. 37 (3700) as depicted in a typical JEDEC DO-5 package) is augmented with two MOV devices combined with corresponding semiconductor P-N diodes contacting one side of the MOVs. Connections to one exposed surface of the MOVs and one exposed surface of the P-N semiconductor diodes provide two points of electrical connection to the device using the stud casing and stud input lead.

Referencing the cross section views of FIG. 37 (3700)-FIG. 40 (4000), the integrated MOV+DIODE transient surge suppressor structure can be observed wherein two MOV elements (3801, 3901, 4001)(3802, 3902, 4002) electrically connect to and are sandwiched between a stud case contact (3803, 3903, 4003) and lower contacts (3904, 3905). The lower contacts (3904, 3905) mate to semiconductor P-N junction (3806, 3807) structures which electrically connect to and are sandwiched between an upper contact (3708) (conformal with the lug terminal) and the lower contacts (3904, 3905). The semiconductor P-N junction (3906, 3907) structure is vertically oriented so that both a P-N and N-P junction in the structure permit current to flow from the upper contact (3708) lug terminal through the separated two MOV elements (3801, 3901, 4001)(3802, 3902, 4002). This permits alternate polarity cycles to flow through the separated MOV elements (3801, 3901, 4001)(3802, 3902, 4002) during a transient event.

While the depicted P-N and N-P structures are annular in construction and have depicted trench isolation between the P+ and N+ regions, other approaches to generating P-N junctions of opposite polarity and a common input node are anticipated in this embodiment.

DIODE+MOV+MOV+DIODE Surge Suppressor (4100)-(4800)

Figure 41:
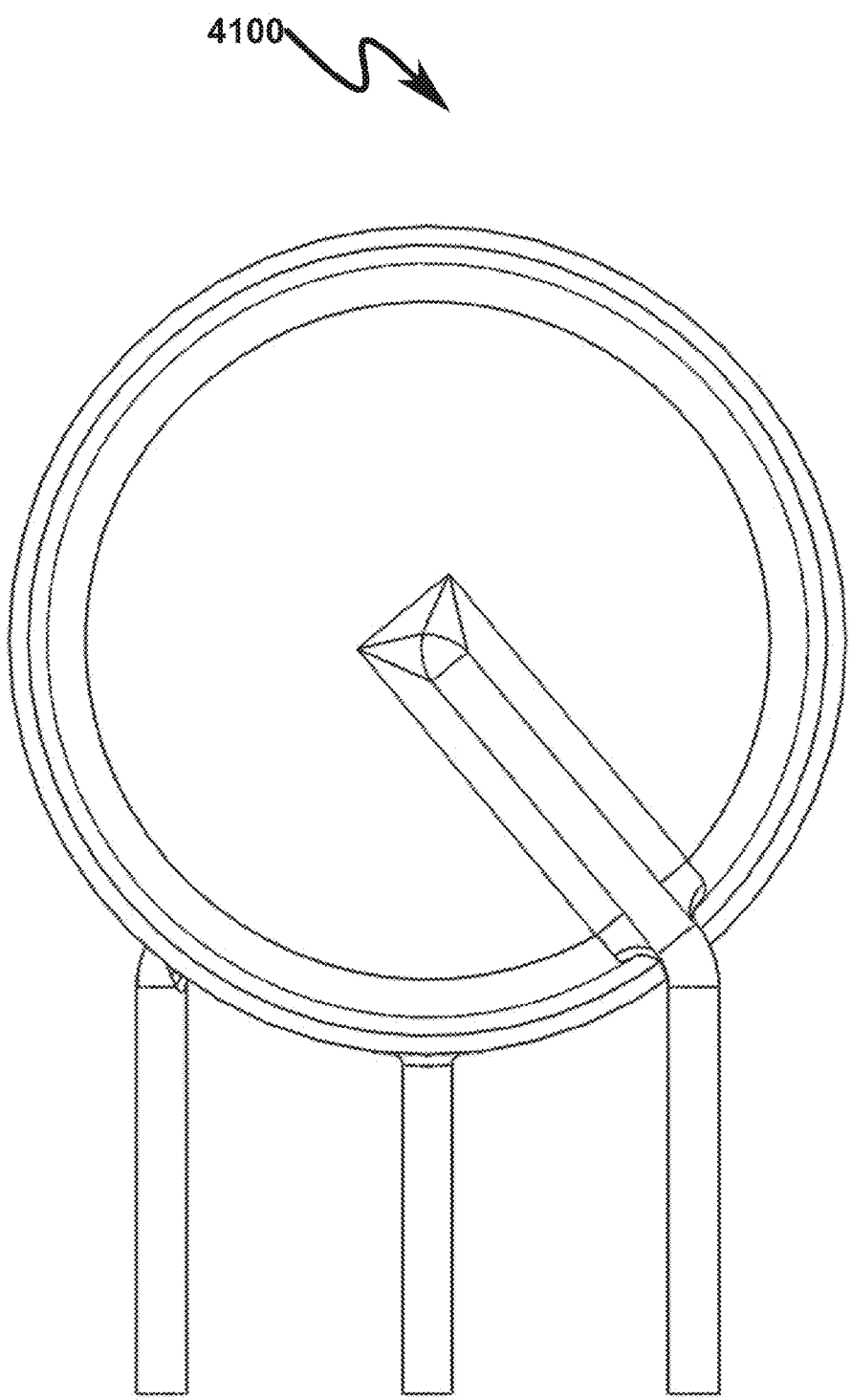
FIG. 41 illustrates a front view of a present invention integrated DIODE+MOV+MOV+DIODE transient surge suppression structure.
Figure 42:
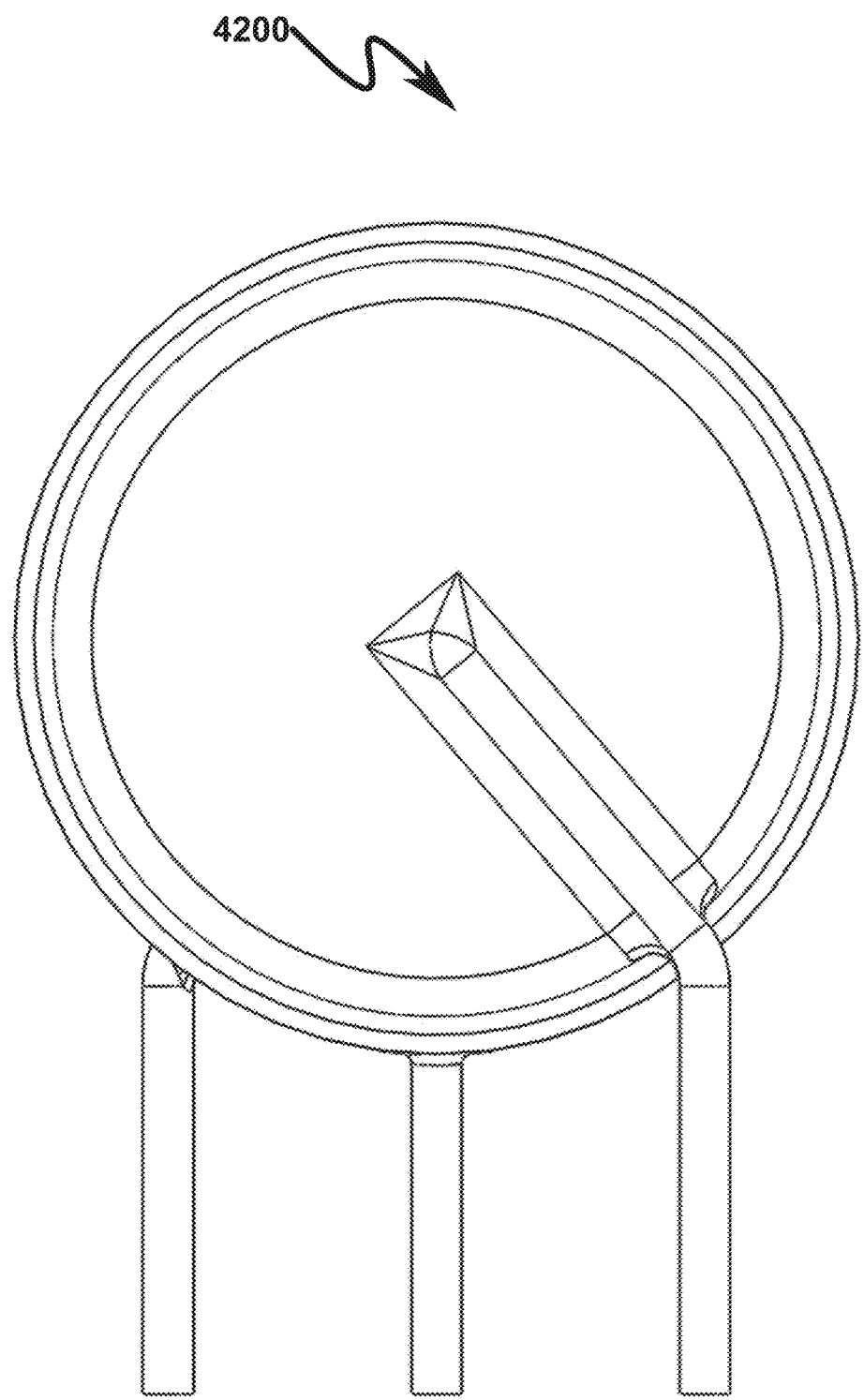
FIG. 42 illustrates a rear view of a present invention integrated DIODE+MOV+MOV+DIODE transient surge suppression structure.
Figure 44:
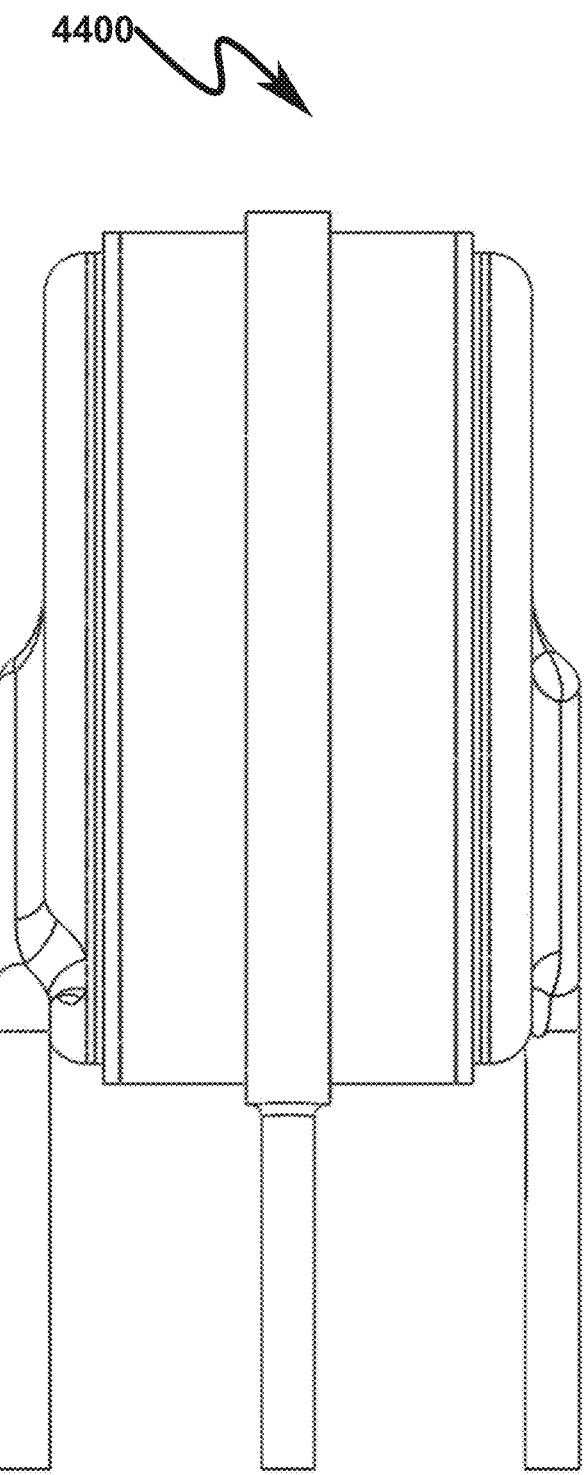
FIG. 44 illustrates a side view of a present invention integrated DIODE+MOV+MOV+DIODE transient surge suppression structure.
Figure 45:
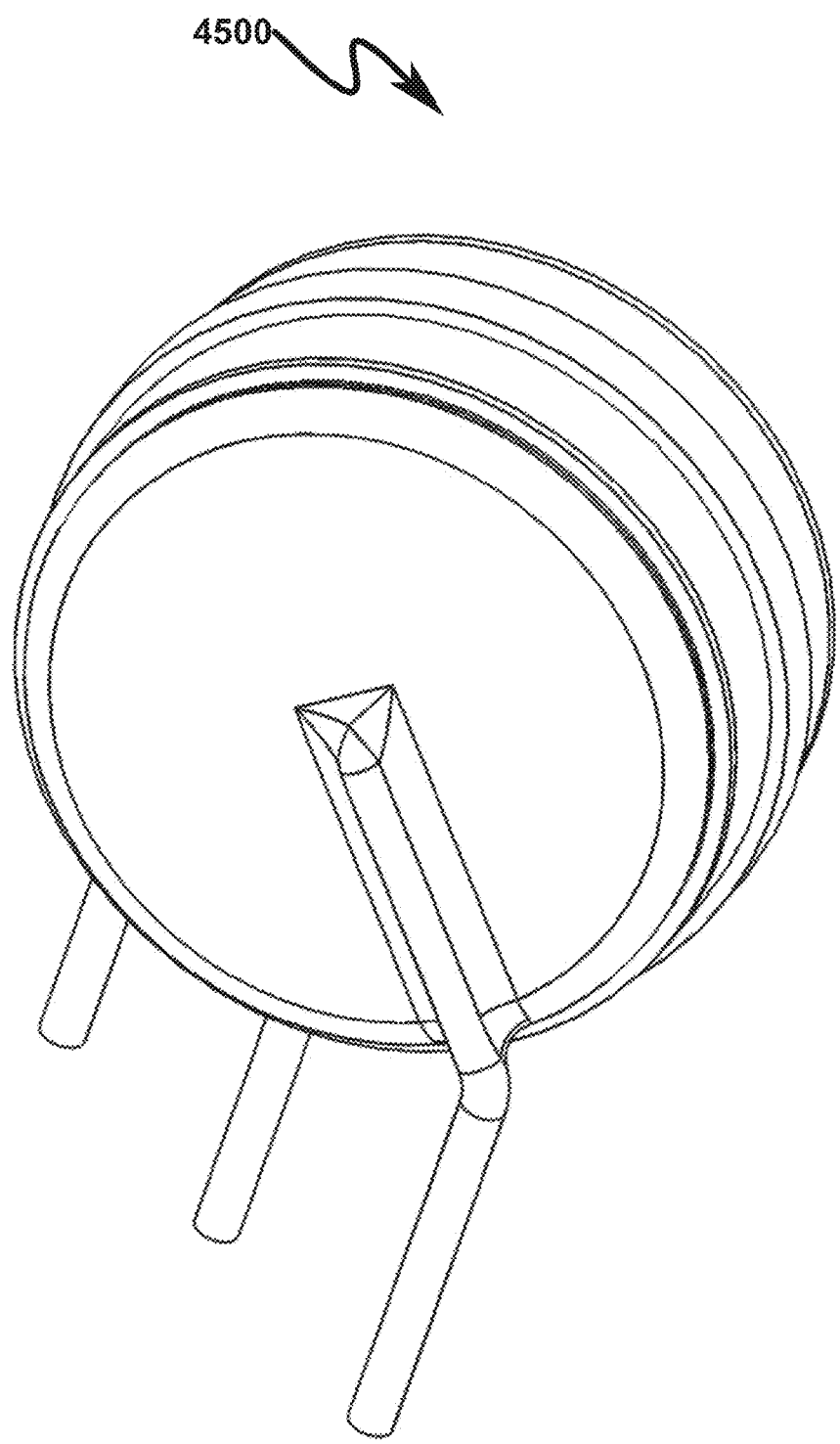
FIG. 45 illustrates a top front right perspective view of a present invention integrated DIODE+MOV+MOV+DIODE transient surge suppression structure.
Figure 46:
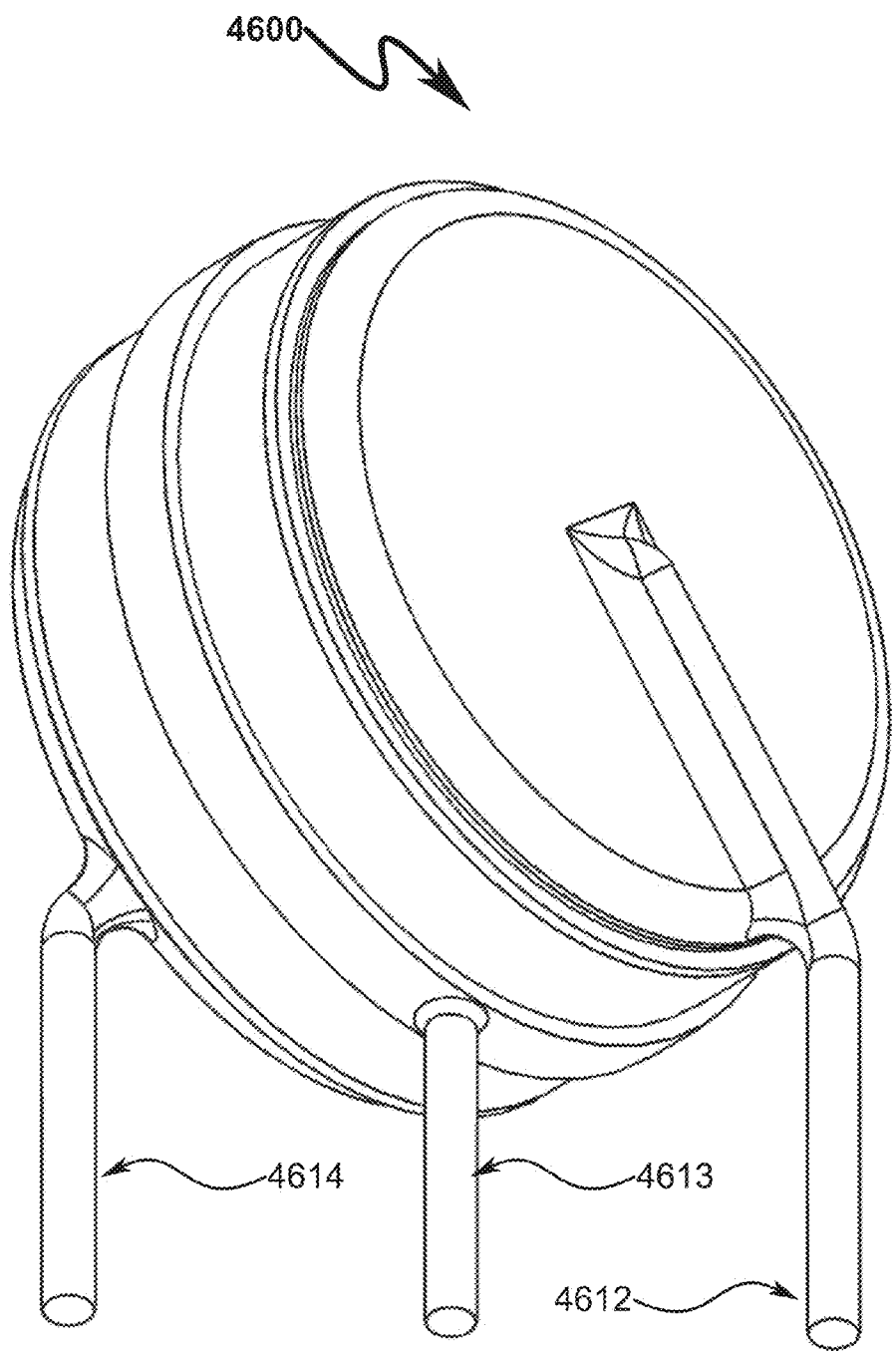
FIG. 46 illustrates a bottom front left perspective view of a present invention integrated DIODE+MOV+MOV+DIODE transient surge suppression structure.
Figure 47:
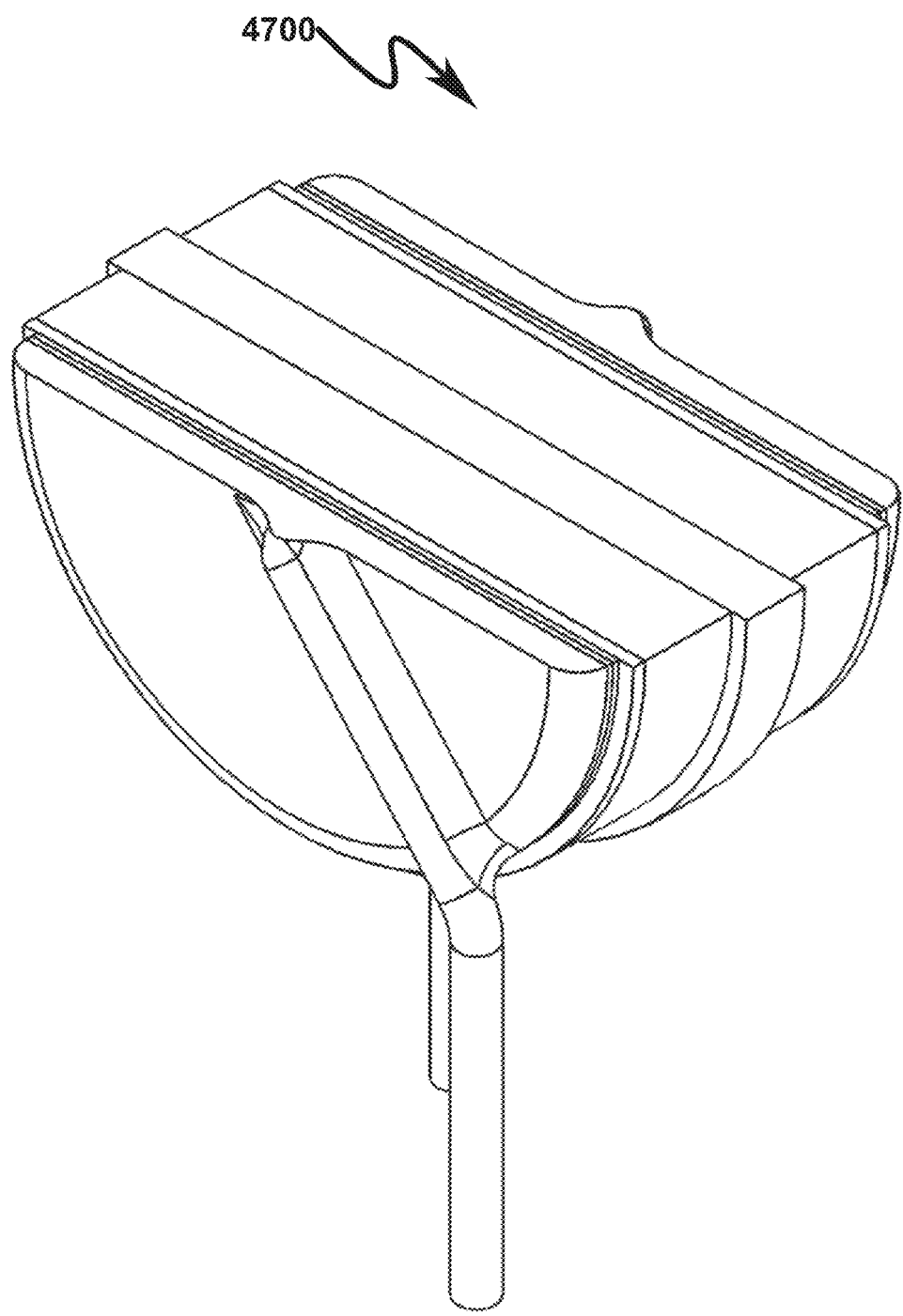
FIG. 47 illustrates a top front right perspective sectional view of a present invention integrated DIODE+MOV+MOV+DIODE transient surge suppression structure.
Figure 48:
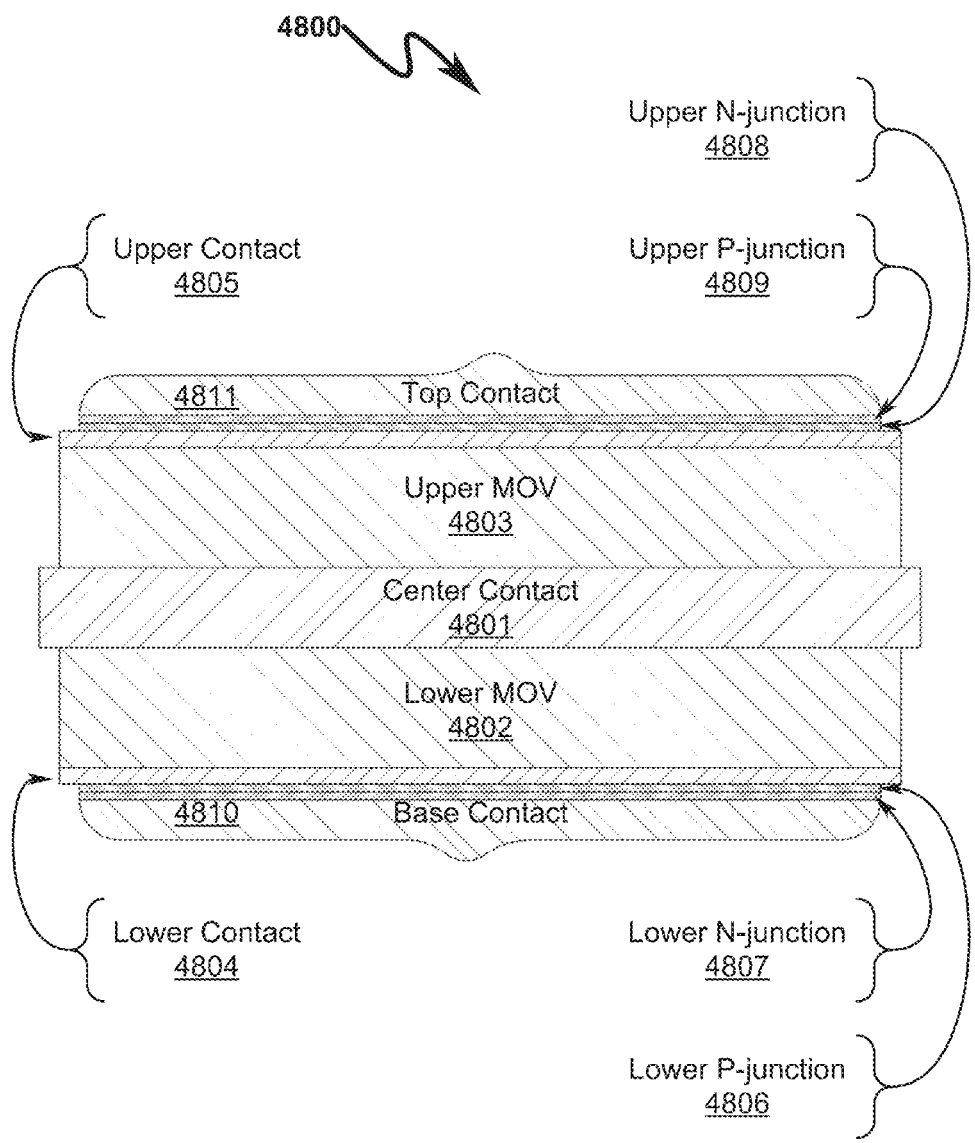
FIG. 48 illustrates a top sectional view of a present invention integrated DIODE+MOV+MOV+DIODE transient surge suppression structure.

The present invention transient surge suppressor may be embodied in a 3-terminal DIODE+MOV+MOV+DIODE device as generally depicted in FIG. 41 (4100)-FIG. 48 (4800). Here a center contact (4801) is sandwiched between a lower MOV (4802) and an upper MOV (4803). The opposing sides of the MOVs (4802, 4803) are mated to corresponding lower contact (4804) and upper contact (4805) conductors. The lower contact (4804) and upper contact (4805) conductors mate to corresponding P-N (4806, 4807) and N-P (4808, 4809) semiconductor junctions that are bonded to these contacts. The remaining side of the P-N (4806, 4807) and N-P (4808, 4809) semiconductor junctions are mated to corresponding base contact (4810) and top contact (4811) conductors. The base contact (4810), center contact (4801), and top contact (4811) conductors are electrically bonded to component leads (4612, 4613, 4614) as generally depicted in FIG. 46 (4600).

MOV+DIODE+DIODE+MOV Surge Suppressor (4900)-(5600)

Figure 49:
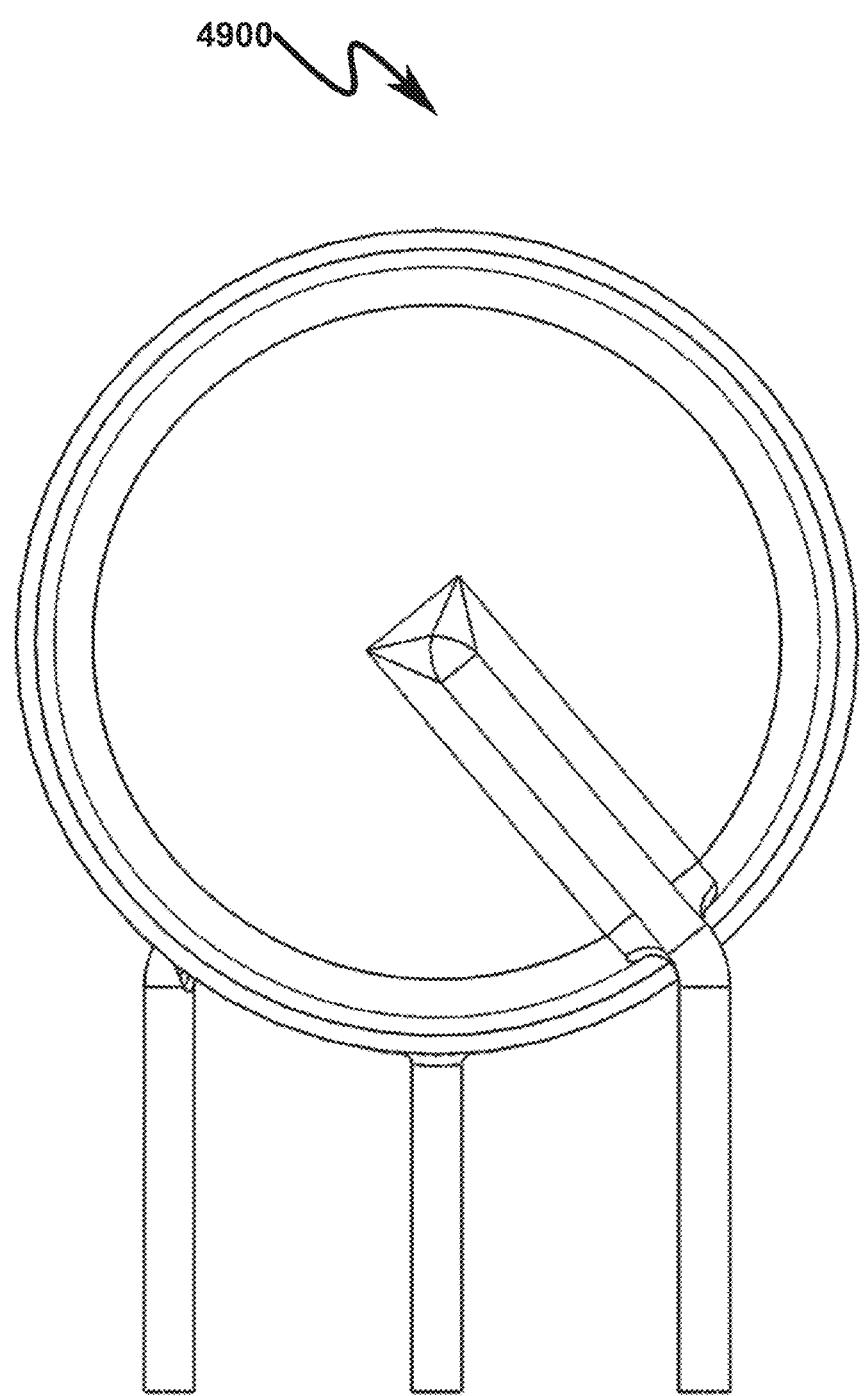
FIG. 49 illustrates a front view of a present invention integrated MOV+DIODE+DIODE+MOV transient surge suppression structure.
Figure 50:
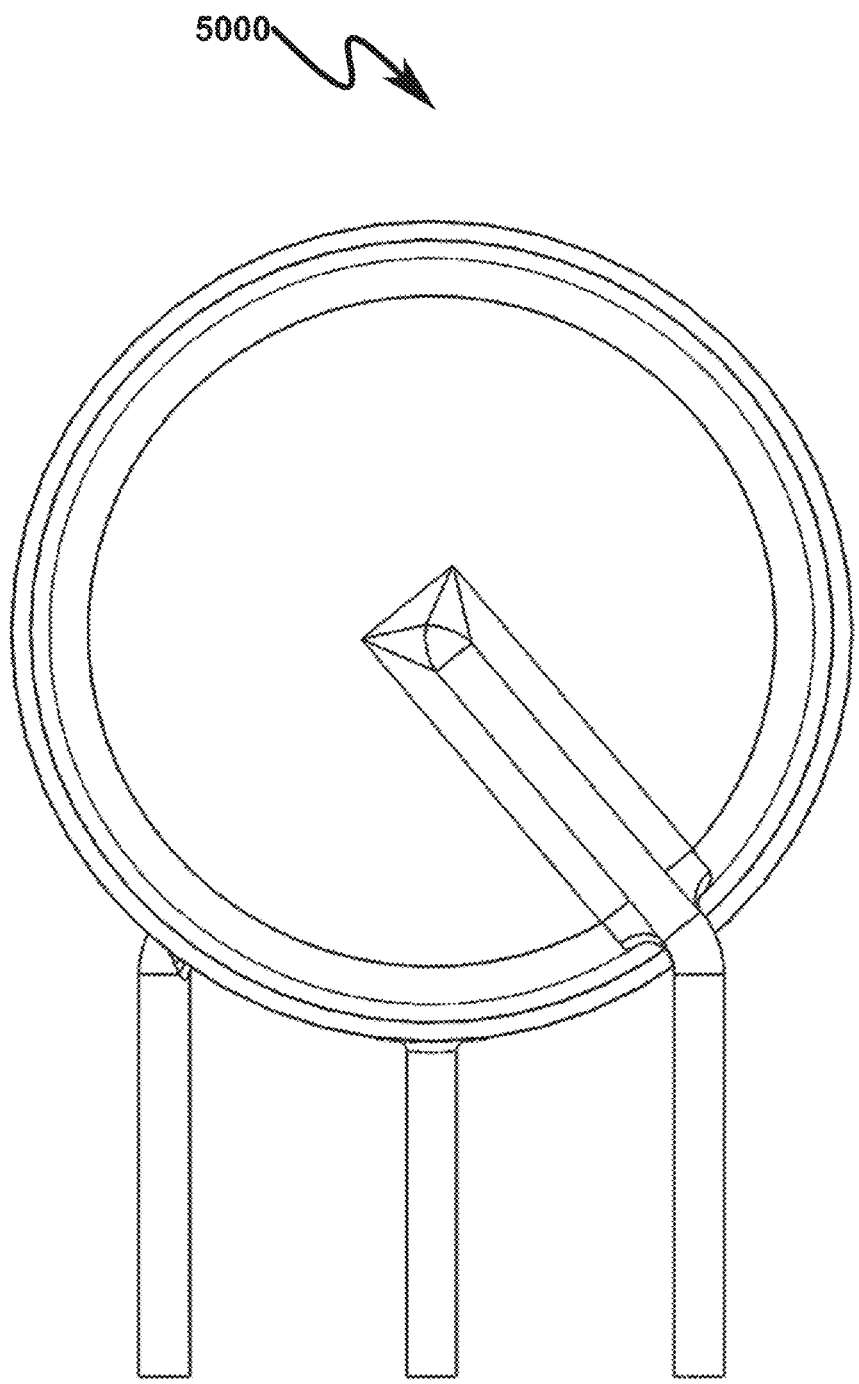
FIG. 50 illustrates a rear view of a present invention integrated MOV+DIODE+DIODE+MOV transient surge suppression structure.
Figure 51:
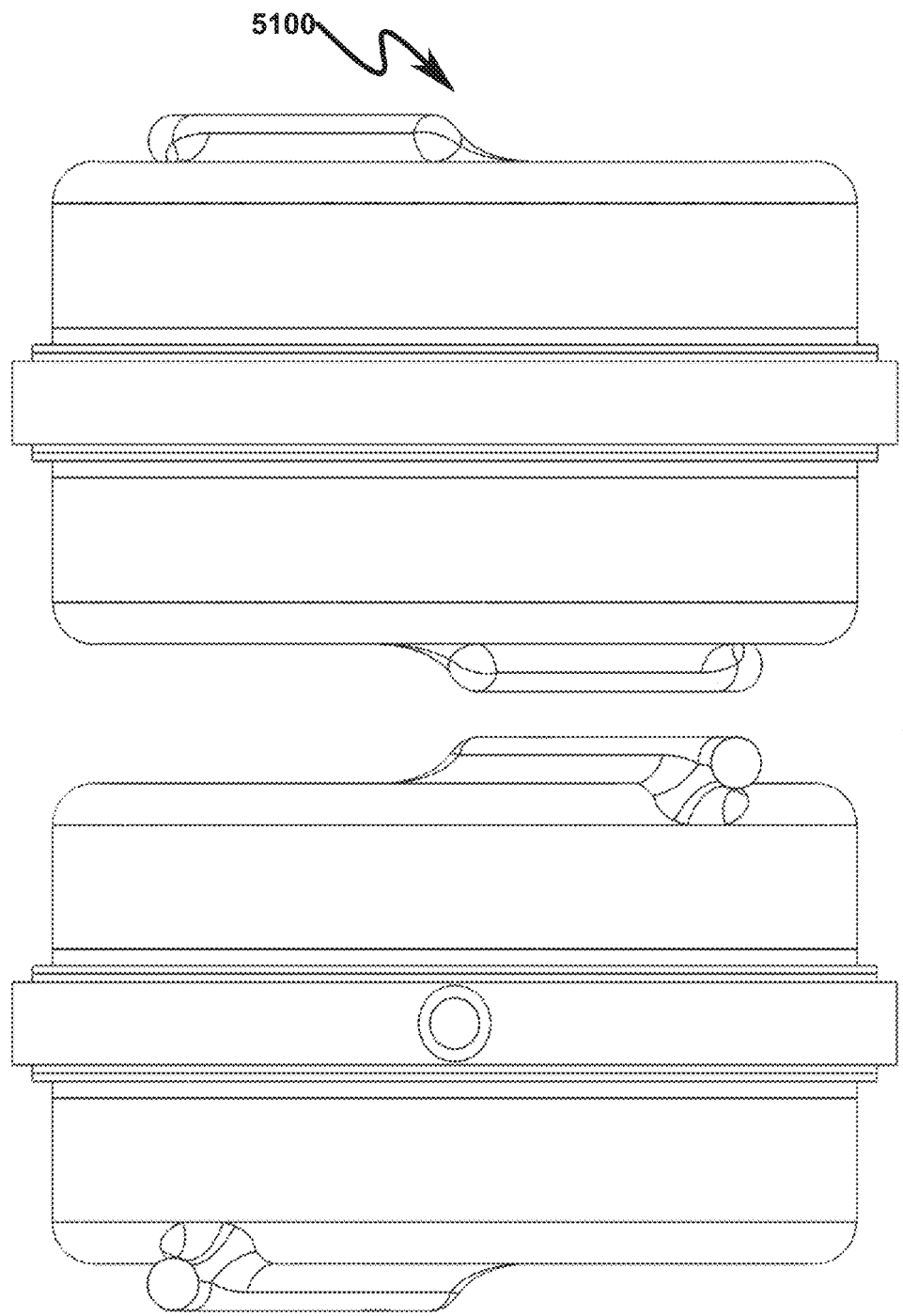
FIG. 51 illustrates top and bottom views of a present invention integrated MOV+DIODE+DIODE+MOV transient surge suppression structure.
Figure 52:
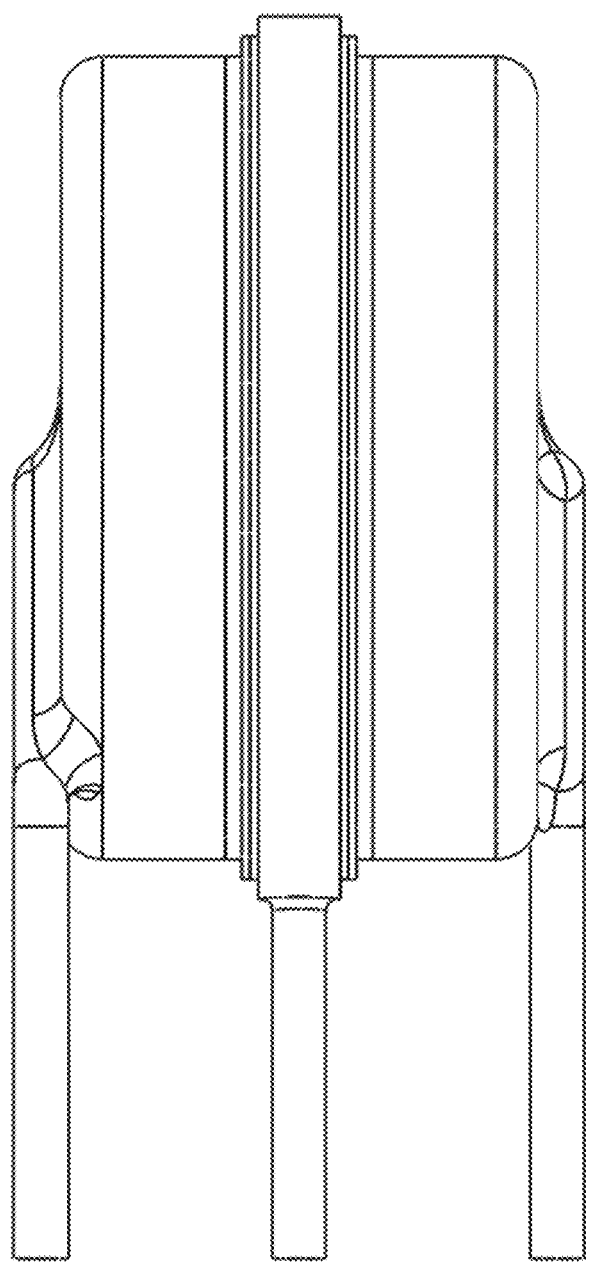
FIG. 52 illustrates a side view of a present invention integrated MOV+DIODE+DIODE+MOV transient surge suppression structure.
Figure 53:
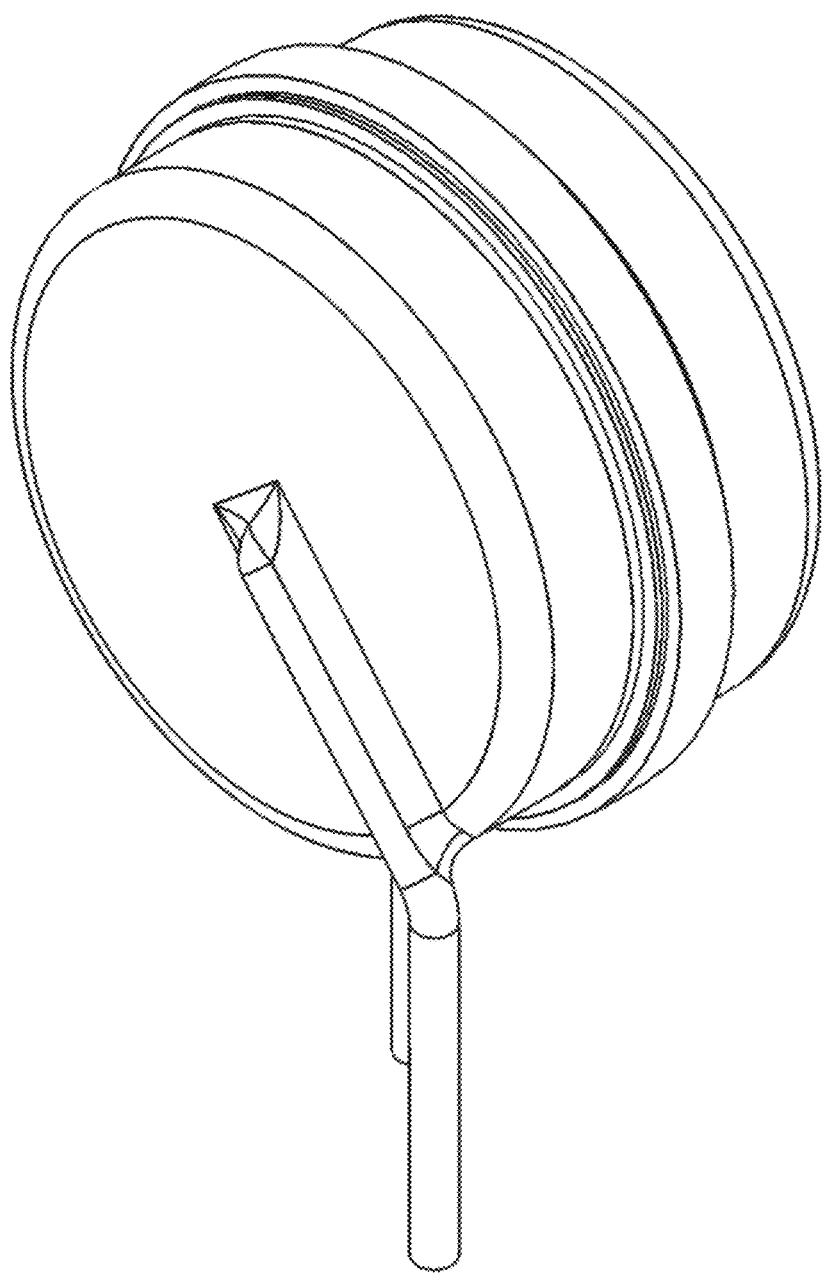
FIG. 53 illustrates a top front right perspective view of a present invention integrated MOV+DIODE+DIODE+MOV transient surge suppression structure.
Figure 54:
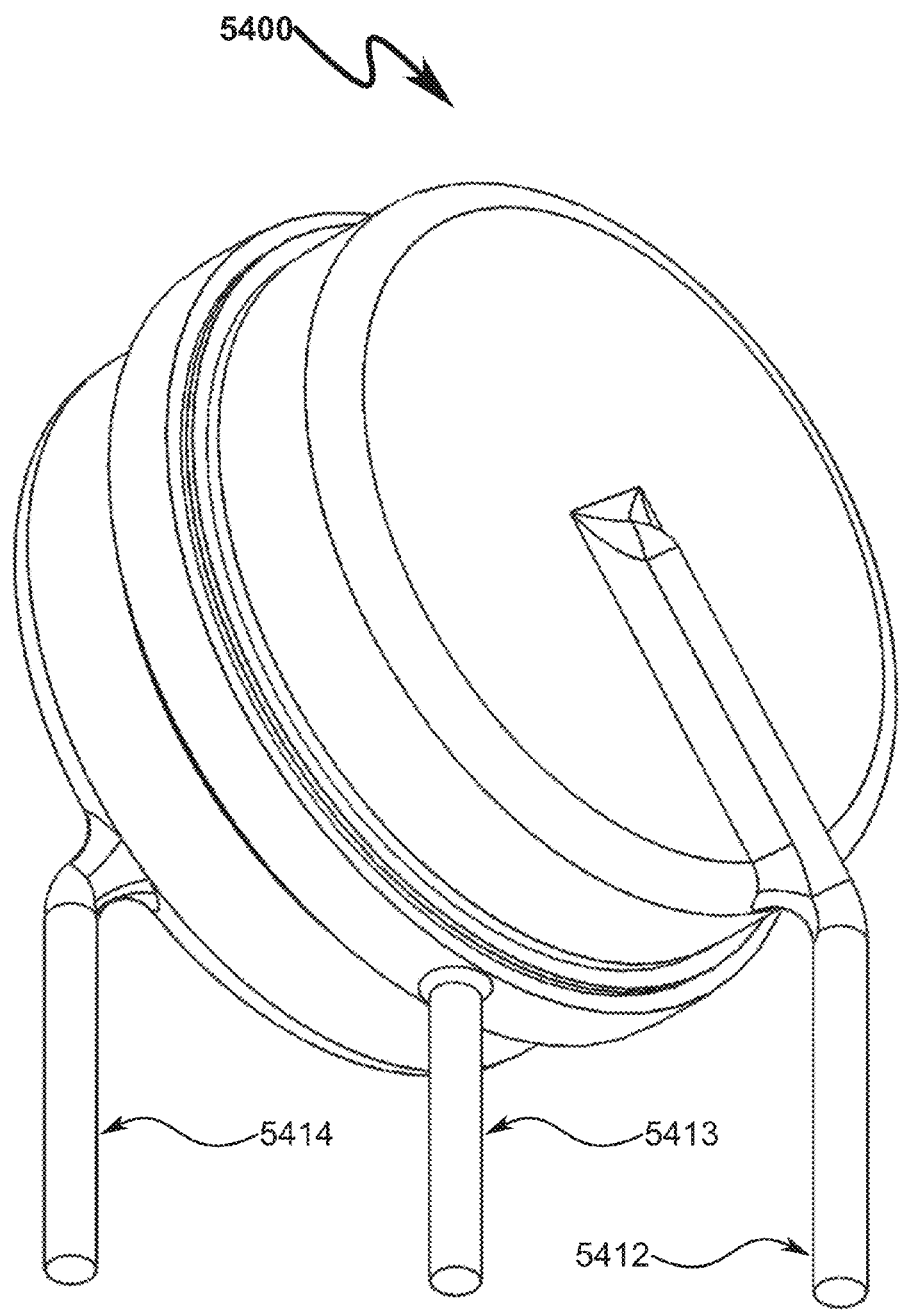
FIG. 54 illustrates a bottom front left perspective view of a present invention integrated MOV+DIODE+DIODE+MOV transient surge suppression structure.
Figure 55:
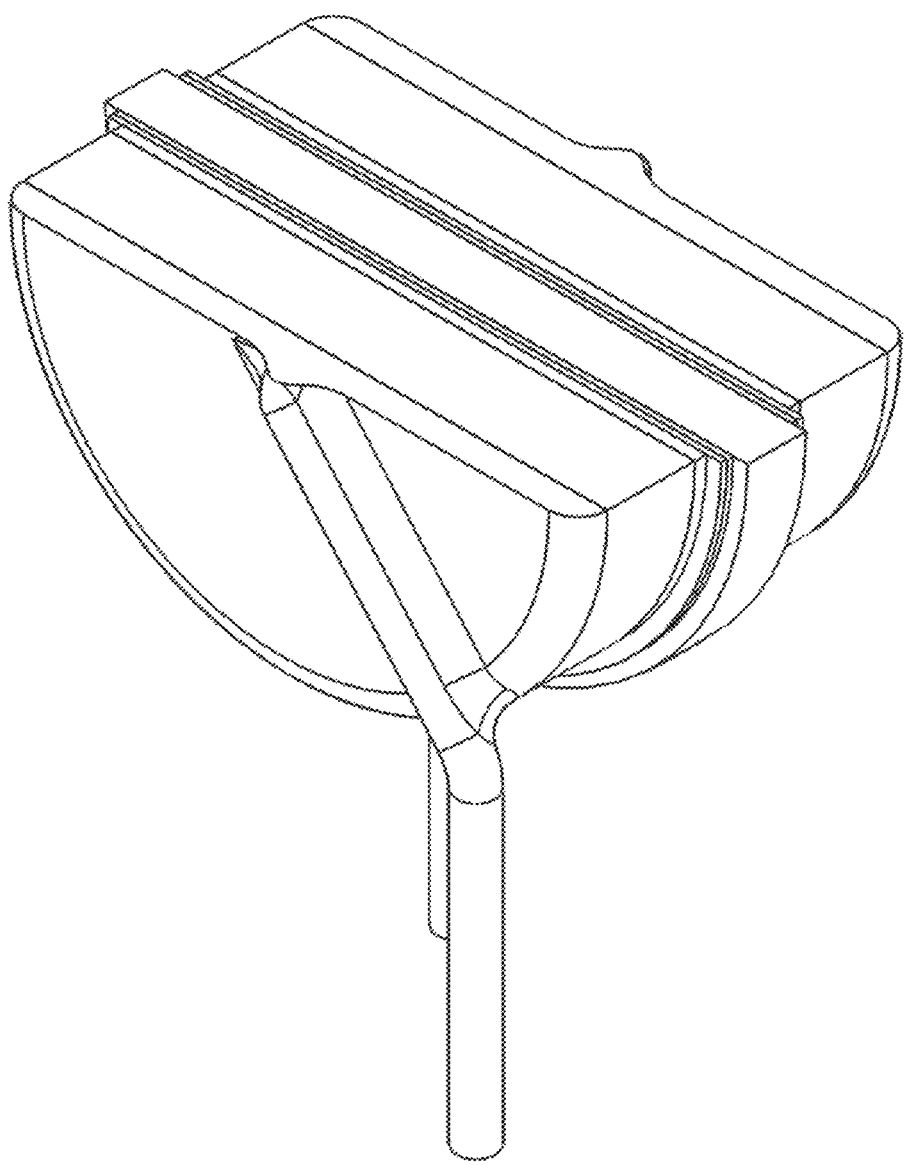
FIG. 55 illustrates a top front right perspective sectional view of a present invention integrated MOV+DIODE+DIODE+MOV transient surge suppression structure.
Figure 56:
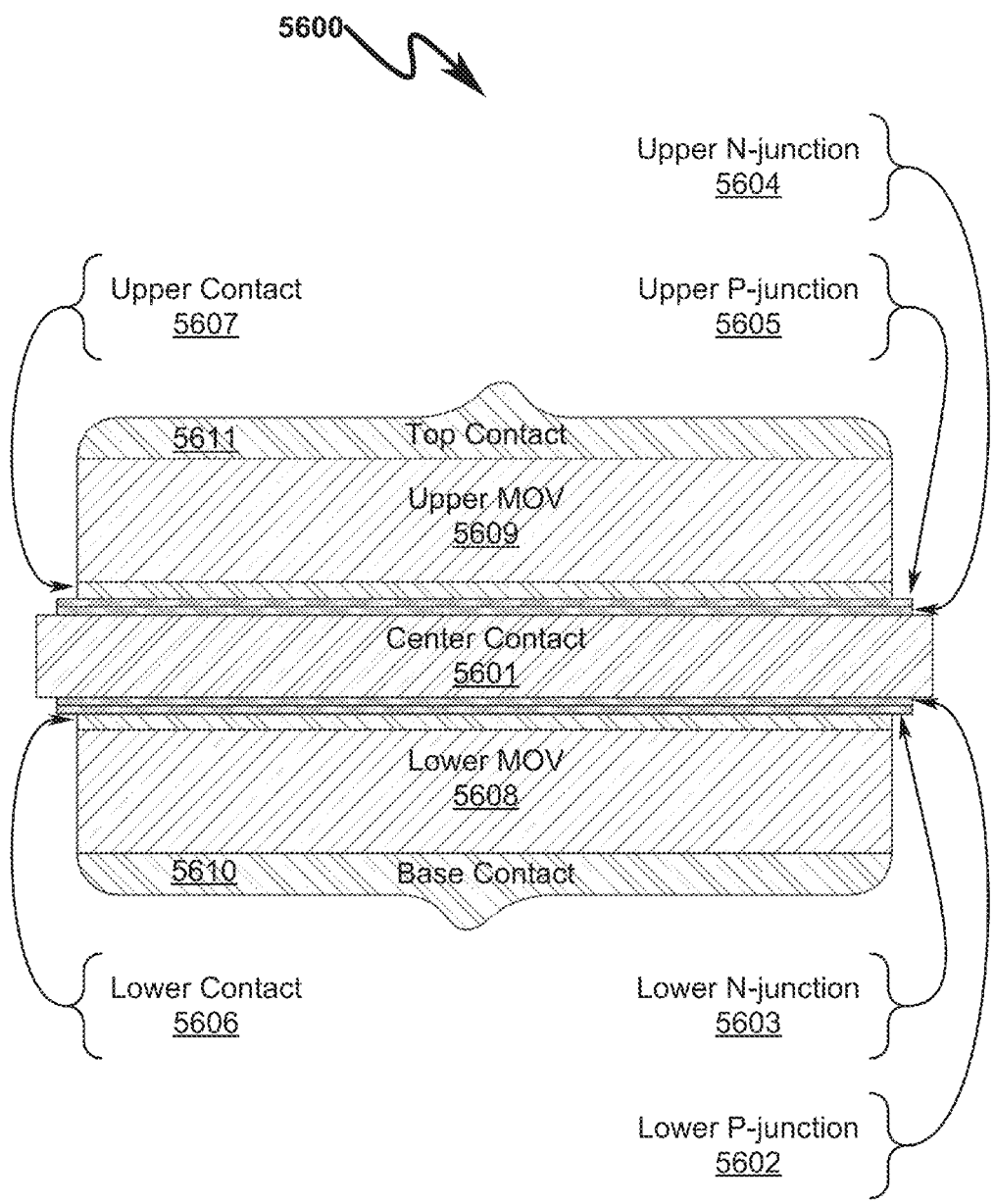
FIG. 56 illustrates a top sectional view of a present invention integrated MOV+DIODE+DIODE+MOV transient surge suppression structure.

The present invention transient surge suppressor may alternatively be embodied in a 3-terminal DIODE+MOV+MOV+DIODE device as generally depicted in FIG. 49 (4900)-FIG. 56 (5600). Here a center contact (5601) is sandwiched between P-N (5602, 5603) and N-P (5604, 5605) semiconductor junctions. The opposing sides of the P-N (5602, 5603) and N-P (5604, 5605) semiconductor junctions are mated to corresponding lower contact (5606) and upper contact (5607) conductors. The lower contact (5606) and upper contact (5607) conductors mate to corresponding lower MOV (5608) and upper MOV (5609) devices that are bonded to these contacts. The remaining side of the MOV (5608, 5609) devices is mated to corresponding base contact (5610) and top contact (5611) conductors. The base contact (5610), center contact (5601), and top contact (5611) conductors are electrically bonded to component leads (5412, 5413, 5414) as generally depicted in FIG. 54 (5400).

One skilled in the art will recognize that hybrid configurations of the structures depicted in FIG. 41 (4100)-FIG. 48 (4800) and FIG. 49 (4900)-FIG. 56 (5600) are possible wherein the positioning of the P-N/N-P junctions and the MOV devices are permuted to produce a variety of transient suppression structures.

DMV+SDR Transient Surge Suppressor (5700)-(6400)

Figure 61:
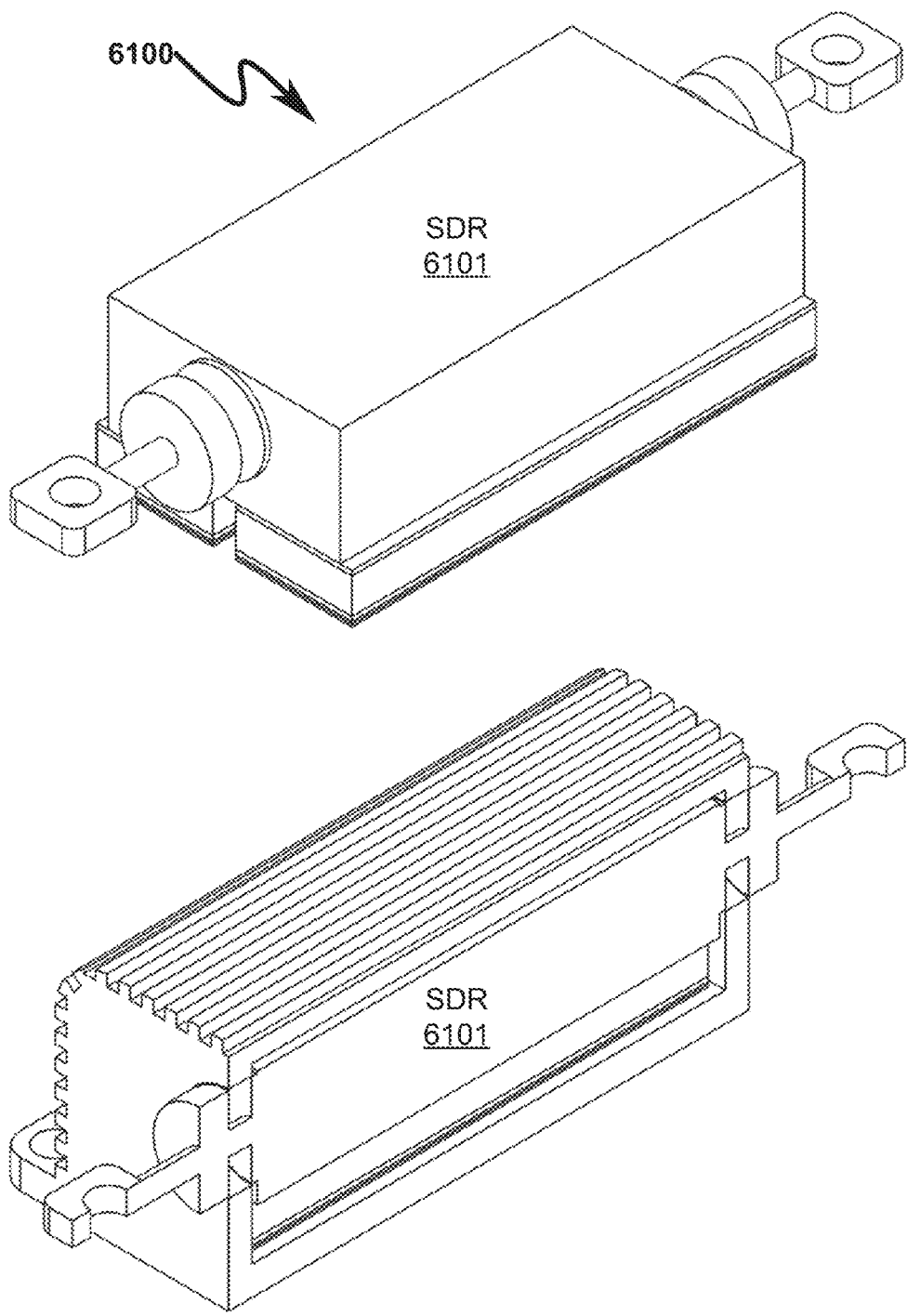
FIG. 61 illustrates top right perspective internal isolation (with case hidden) and sectional views of a present invention integrated DMV+RESISTOR transient surge suppression structure.
Figure 62:
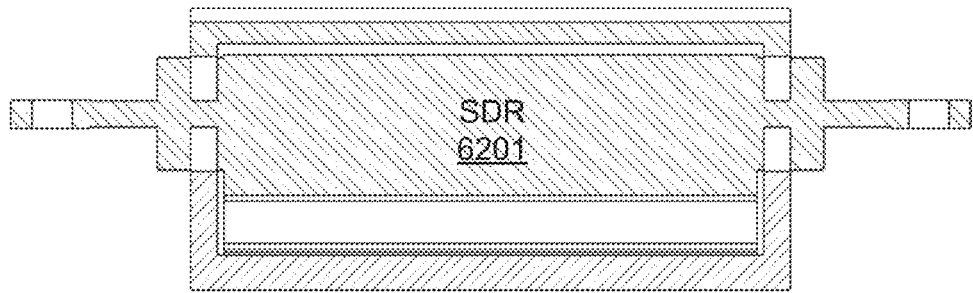
FIG. 62 illustrates side sectional view of a present invention integrated DMV+RESISTOR transient surge suppression structure.
Figure 63:
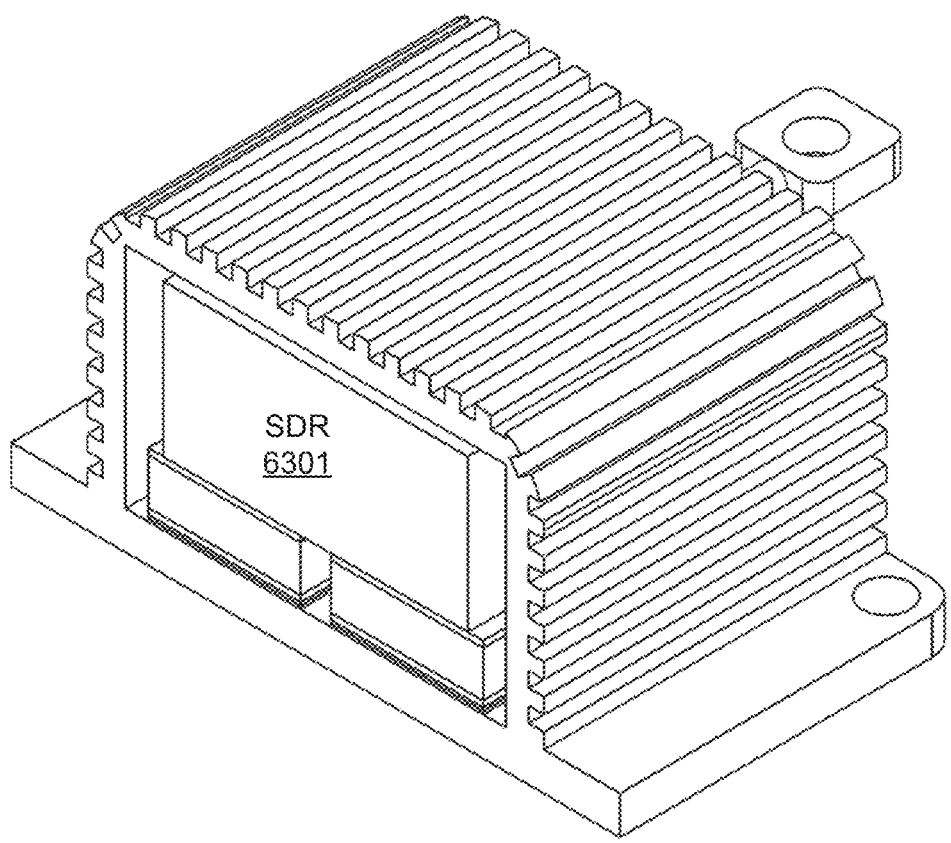
FIG. 63 illustrates a top front right perspective sectional view of a present invention integrated DMV+RESISTOR transient surge suppression structure.

Some preferred embodiments of the present invention form the SDR, MOV, and DIODE structures into an integrated structure. As depicted in FIG. 57 (5700)-FIG. 64 (6400), the integrated DMV+SDR structure may be fabricated within an extruded aluminum structure similar to that used by conventional power resistors. Within this structure the SDR structure (6101, 6201, 6301, 6401) is connected between the input and output terminals (6001, 6002). This series SDR resistor structure as depicted in FIG. 61 (6101) is mated with longitudinal upper contacts (6412, 6422) that connect to MOV structures (6413, 6423). These MOV structures (6413, 6423) mate with lower contacts (6414, 6424) to P-N junction (6415, 6416) and N-P junction (6425, 6426) that are contacted to the case (6407). The distributed nature of the SDR provides a large surface area for passing transient surge currents to the semiconductor diode junctions and to the case connection (typically tied to the NEUTRAL or GROUND connections discussed previously). This configuration provides for surge protection of the PLD while simultaneously providing for necessary heat sinking for the SDR and fire protection in the case of a failure of the MOV device.

As depicted in this exemplary embodiment the MOV structures and semiconductor junctions are physically separated. Other embodiments using a similar structure may eliminate the physical gap and use a single MOV structure with oppositely doped P-N and N-P junction areas above the left (6413) and right (6423) MOV structures.

Preferred Embodiment System Summary

The present invention preferred exemplary system embodiment supporting HOT+GROUND surge protection anticipates a wide variety of variations in the basic theme of construction, but can be generalized as an electrical wiring system comprising:
 (a) HOT wire;
 (b) NEUTRAL wire;
 (c) GROUND wire;
 (d) series drop resistor (SDR);
 (e) first shunt diode (FSD);
 (f) second shunt diode (SSD);
 (g) first shunt metal oxide varistor (MOV) (FSV); and
 (h) second shunt metal oxide varistor (MOV) (SSV);
wherein
 the HOT wire is insulated;
 the NEUTRAL wire is insulated;
 the HOT wire comprises a source end and load end;
 the NEUTRAL wire comprises a source end and load end;
 the GROUND wire comprises a source end and load end;
 the HOT wire source end, the NEUTRAL wire source end, and the GROUND wire source end are configured for electrical connection to a power source;
 the SDR comprises an input terminal and an output terminal;
 the SDR input terminal is electrically coupled to the HOT wire load end;
 the FSD and the FSV are electrically connected in series between the SDR output terminal and the GROUND wire with the FSD oriented such that rectified current in the FSD flows away from the SDR output terminal;
 the SSD and the SSV are electrically connected in series between the SDR output terminal and the GROUND wire with the SSD oriented such that rectified current in the SSD flows towards the SDR output terminal; and
 the SDR output terminal, the NEUTRAL wire, and the GROUND wire are configured to service an electrical load device.

This general system summary may be augmented by the various elements described herein to produce a wide variety of invention embodiments consistent with this overall design description.

Alternate Preferred Embodiment System Summary

A present invention alternate preferred exemplary system embodiment supporting HOT+NEUTRAL surge protection anticipates a wide variety of variations in the basic theme of construction, but can be generalized as an electrical wiring system comprising:
 (a) HOT wire;
 (b) NEUTRAL wire;
 (c) GROUND wire;
 (d) series drop resistor (SDR);
 (e) first shunt diode (FSD);
 (f) second shunt diode (SSD);
 (g) first shunt metal oxide varistor (MOV) (FSV); and
 (h) second shunt metal oxide varistor (MOV) (SSV);
wherein
 the HOT wire is insulated;
 the NEUTRAL wire is insulated;
 the HOT wire comprises a source end and load end;
 the NEUTRAL wire comprises a source end and load end;
 the GROUND wire comprises a source end and load end;

the HOT wire source end, the NEUTRAL wire source end, and the GROUND wire source end are configured for electrical connection to a power source;

the SDR comprises an input terminal and an output terminal;

the SDR input terminal is electrically coupled to the HOT wire load end;

the FSD and the FSV are electrically connected in series between the SDR output terminal and the NEUTRAL wire with the FSD oriented such that rectified current in the FSD flows away from the SDR output terminal;

the SSD and the SSV are electrically connected in series between the SDR output terminal and the NEUTRAL wire with the SSD oriented such that rectified current in the SSD flows towards the SDR output terminal; and the SDR output terminal, the NEUTRAL wire, and the GROUND wire are configured to service an electrical load device.

This general system summary may be augmented by the various elements described herein to produce a wide variety of invention embodiments consistent with this overall design description.

Alternate Preferred Embodiment System Summary

A present invention alternate preferred exemplary system embodiment supporting HOT+GROUND+NEUTRAL surge protection anticipates a wide variety of variations in the basic theme of construction, but can be generalized as an electrical wiring system comprising:
(a) HOT wire;
(b) NEUTRAL wire;
(c) GROUND wire;
(d) series drop resistor (SDR);
(e) first shunt diode (FSD);
(f) second shunt diode (SSD);
(g) third shunt diode (TSD);
(h) fourth shunt diode (RSD);
(i) first shunt metal oxide varistor (MOV) (FSV); and
(j) second shunt metal oxide varistor (MOV) (SSV);
(k) third shunt metal oxide varistor (MOV) (TSV); and
(l) fourth shunt metal oxide varistor (MOV) (RSV);
wherein
the HOT wire is insulated;
the NEUTRAL wire is insulated;
the HOT wire comprises a source end and load end;
the NEUTRAL wire comprises a source end and load end;
the GROUND wire comprises a source end and load end;
the HOT wire source end, the NEUTRAL wire source end, and the GROUND wire source end are configured for electrical connection to a power source;
the SDR comprises an input terminal and an output terminal;
the SDR input terminal is electrically coupled to the HOT wire load end;
the FSD and the FSV are electrically connected in series between the SDR output terminal and the GROUND wire with the FSD oriented such that rectified current in the FSD flows away from the SDR output terminal;
the SSD and the SSV are electrically connected in series between the SDR output terminal and the GROUND wire with the SSD oriented such that rectified current in the SSD flows towards the SDR output terminal;
the TSD and the TSV are electrically connected in series between the SDR output terminal and the NEUTRAL wire with the TSD oriented such that rectified current in the TSD flows away from the SDR output terminal;

the RSD and the RSV are electrically connected in series between the SDR output terminal and the NEUTRAL wire with the RSD oriented such that rectified current in the RSD flows towards the SDR output terminal; and the SDR output terminal, the NEUTRAL wire, and the GROUND wire are configured to service an electrical load device.

This general system summary may be augmented by the various elements described herein to produce a wide variety of invention embodiments consistent with this overall design description.

MOV+DIODE Surge Suppressor System Summary

The present invention preferred exemplary surge suppressor system embodiment incorporating an integrated MOV+DIODE structure anticipates a wide variety of variations in the basic theme of construction, but can be generalized as an electrical wiring system comprising:
(a) metal oxide varistor (MOV);
(b) base metal contact (BMC);
(c) middle metal contact (MMC);
(d) top metal contact (TMC);
(e) semiconductor P-N diode (PND);
(f) first component lead (FCL); and
(g) second component lead (SCL);
wherein
the MOV comprises a first surface and a second surface;
the BMC comprises a first surface and a second surface;
the MMC comprises a first surface and a second surface;
the PND comprises a doped semiconducting material having a first surface and a second surface with a semiconductor P-N junction formed between the PND first surface and the PND second surface;
the TMC comprises a first surface and a second surface;
the FCL is coincident with and electrically contacted to the first surface of the BMC;
the MOV first surface is coincident with and electrically contacted to the BMC second surface;
the MOV second surface is coincident with and electrically contacted to the MMC first surface;
the MMC second surface is coincident with and electrically contacted to the PND first surface;
the PND second surface is coincident with and electrically contacted to the TMC first surface;
the SCL is coincident with and electrically contacted to the second surface of the TMC; and
the FCL contact, the SCL contact, the BMC, the MOV, the MMC, the PND, and the TMC, are encapsulated in an insulating material.

This general system summary may be augmented by the various elements described herein to produce a wide variety of invention embodiments consistent with this overall design description.

DIODE+MOV+MOV+DIODE Surge Suppressor System Summary

The present invention preferred exemplary surge suppressor system embodiment incorporating an integrated DIODE+MOV+MOV+DIODE structure anticipates a wide variety of variations in the basic theme of construction, but can be generalized as an electrical wiring system comprising:
(a) bottom metal oxide varistor (BMV);
(b) top metal oxide varistor (TMV);
(c) base metal contact (BMC);
(d) lower metal contact (LMC);
(e) center metal contact (CMC);
(f) upper metal contact (UMC);

(g) top metal contact (TMC);
(h) first semiconductor P-N diode (FPN);
(i) second semiconductor P-N diode (SPN);
(j) first component lead (FCL);
(k) second component lead (SCL); and
(l) center component lead (CCL);
wherein
the BMV comprises a first surface and a second surface;
the TMV comprises a first surface and a second surface;
the BMC comprises a first surface and a second surface;
the CMC comprises a first surface, a second surface, and a center surface;
the LMC comprises a first surface and a second surface;
the FPN comprises a doped semiconducting material having a first surface and a second surface with a semiconductor P-N junction formed between the FPN first surface and the FPN second surface;
the SPN comprises a doped semiconducting material having a first surface and a second surface with a semiconductor P-N junction formed between the SPN first surface and the SPN second surface;
the UMC comprises a first surface and a second surface;
the TMC comprises a first surface and a second surface;
the FCL is coincident with and electrically contacted to the first surface of the BMC;
the FPN first surface is coincident with and electrically contacted to the BMC second surface;
the FPN second surface is coincident with and electrically contacted to the LMC first surface;
the LMC second surface is coincident with and electrically contacted to the BMV first surface;
the BMV second surface is coincident with and electrically contacted to the CMC first surface;
the CMC second surface is coincident with and electrically contacted to the TMV first surface;
the TMV second surface is coincident with and electrically contacted to the UMC first surface;
the UMC second surface is coincident with and electrically contacted to the SPN first surface;
the SPN second surface is coincident with and electrically contacted to the TMC first surface;
the SCL is coincident with and electrically contacted to the second surface of the TMC;
the CCL is coincident with and electrically contacted to the center surface of the CMC; and
the CCL contact, the FCL contact, the SCL contact, the BMC, the BMV, the LMC, the FPN, the CMC, the SPN, the UMC, the TMV, and the TMC, are encapsulated in an insulating material.

This general system summary may be augmented by the various elements described herein to produce a wide variety of invention embodiments consistent with this overall design description.

MOV+DIODE+DIODE+MOV Surge Suppressor System Summary

The present invention preferred exemplary surge suppressor system embodiment incorporating an integrated MOV+DIODE+DIODE+MOV structure anticipates a wide variety of variations in the basic theme of construction, but can be generalized as an electrical wiring system comprising:
(a) bottom metal oxide varistor (BMV);
(b) top metal oxide varistor (TMV);
(c) base metal contact (BMC);
(d) lower metal contact (LMC);
(e) center metal contact (CMC);
(f) upper metal contact (UMC);
(g) top metal contact (TMC);
(h) first semiconductor P-N diode (FPN);
(i) second semiconductor P-N diode (SPN);
(j) first component lead (FCL);
(k) second component lead (SCL); and
(l) center component lead (CCL);
wherein
the BMV comprises a first surface and a second surface;
the TMV comprises a first surface and a second surface;
the BMC comprises a first surface and a second surface;
the LMC comprises a first surface and a second surface;
the FPN comprises a doped semiconducting material having a first surface and a second surface with a semiconductor P-N junction formed between the FPN first surface and the FPN second surface;
the CMC comprises a first surface, a second surface, and a center surface;
the SPN comprises a doped semiconducting material having a first surface and a second surface with a semiconductor P-N junction formed between the SPN first surface and the SPN second surface;
the UMC comprises a first surface and a second surface;
the TMC comprises a first surface and a second surface;
the FCL is coincident with and electrically contacted to the first surface of the BMC;
the BMV first surface is coincident with and electrically contacted to the BMC second surface;
the BMV second surface is coincident with and electrically contacted to the LMC first surface;
the LMC second surface is coincident with and electrically contacted to the FPN first surface;
the FPN second surface is coincident with and electrically contacted to the CMC first surface;
the CMC second surface is coincident with and electrically contacted to the SPN first surface;
the SPN second surface is coincident with and electrically contacted to the UMC first surface;
the UMC second surface is coincident with and electrically contacted to the TMV first surface;
the TMV second surface is coincident with and electrically contacted to the TMC first surface;
the SCL is coincident with and electrically contacted to the second surface of the TMC;
the CCL is coincident with and electrically contacted to the center surface of the PND; and
the CCL contact, the FCL contact, the SCL contact, the BMC, the BMV, the LMC, the FPN, the CMC, the SPN, the UMC, the TMV, and the TMC, are encapsulated in an insulating material.

This general system summary may be augmented by the various elements described herein to produce a wide variety of invention embodiments consistent with this overall design description.

MOV+PNIPN+MOV Surge Suppressor System Summary

The present invention preferred exemplary surge suppressor system embodiment incorporating an integrated MOV+PNIPN+MOV structure anticipates a wide variety of variations in the basic theme of construction, but can be generalized as an electrical wiring system comprising:
(a) bottom metal oxide varistor (BMV);
(b) top metal oxide varistor (TMV);
(c) base metal contact (BMC);
(d) lower metal contact (LMC);
(e) center metal contact (CMC);
(f) upper metal contact (UMC);
(g) top metal contact (TMC);
(h) P-N-I-P-N semiconductor diode (PND);
(i) first component lead (FCL);

(j) second component lead (SCL); and
(k) center component lead (CCL);
wherein
the BMV comprises a first surface and a second surface;
the TMV comprises a first surface and a second surface;
the BMC comprises a first surface and a second surface;
the LMC comprises a first surface and a second surface;
the PND comprises a doped semiconducting material having a first surface, a second surface, and a center surface with a semiconductor P-N-INTRINSIC-P-N layered junction formed between the PND first surface and the PNL second surface and the center surface electrically contacting the INTRINSIC region of the semiconductor P-N-INTRINSIC-P-N layered junction;
the UMC comprises a first surface and a second surface;
the TMC comprises a first surface and a second surface;
the FCL is coincident with and electrically contacted to the first surface of the BMC;
the BMV first surface is coincident with and electrically contacted to the BMC second surface;
the BMV second surface is coincident with and electrically contacted to the LMC first surface;
the LMC second surface is coincident with and electrically contacted to the PND first surface;
the PND second surface is coincident with and electrically contacted to the UMC first surface;
the UMC second surface is coincident with and electrically contacted to the TMV first surface;
the TMV second surface is coincident with and electrically contacted to the TMC first surface;
the SCL is coincident with and electrically contacted to the second surface of the TMC;
the CCL is coincident with and electrically contacted to the center surface of the PND; and
the CCL contact, the FCL contact, the SCL contact, the BMC, the BMV, the LMC, the PND, the UMC, the TMV, and the TMC, are encapsulated in an insulating material.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as an electrical wiring method wherein the method utilizes an electrical wiring system comprising:
(a) HOT wire;
(b) NEUTRAL wire;
(c) GROUND wire;
(d) series drop resistor (SDR);
(e) first shunt diode (FSD);
(f) second shunt diode (SSD);
(g) third shunt diode (TSD);
(h) fourth shunt diode (RSD);
(i) first shunt metal oxide varistor (MOV) (FSV); and
(j) second shunt metal oxide varistor (MOV) (SSV);
(k) third shunt metal oxide varistor (MOV) (TSV); and
(l) fourth shunt metal oxide varistor (MOV) (RSV);
wherein
the HOT wire is insulated;
the NEUTRAL wire is insulated;
the HOT wire comprises a source end and load end;
the NEUTRAL wire comprises a source end and load end;
the GROUND wire comprises a source end and load end; and
the SDR comprises an input terminal and an output terminal;
with the method comprising the steps of:
(1) configuring the HOT wire source end, the NEUTRAL wire source end, and the GROUND wire source end for electrical connection to a power source;
(2) electrically coupling the SDR input terminal to the HOT wire load end;
(3) electrically connecting the FSD and the FSV in series between the SDR output terminal and the GROUND wire with the FSD oriented such that rectified current in the FSD flows away from the SDR output terminal;
(4) electrically connecting the SSD and the SSV in series between the SDR output terminal and the GROUND wire with the SSD oriented such that rectified current in the SSD flows towards the SDR output terminal;
(5) electrically connecting the TSD and the TSV in series between the SDR output terminal and the NEUTRAL wire with the TSD oriented such that rectified current in the TSD flows away from the SDR output terminal;
(6) electrically connecting the RSD and the RSV in series between the SDR output terminal and the NEUTRAL wire with the RSD oriented such that rectified current in the RSD flows towards the SDR output terminal; and
(7) configuring the SDR output terminal, the NEUTRAL wire, and the GROUND wire to service an electrical load device.

One skilled in the art will recognize that these method steps may be augmented or rearranged without limiting the teachings of the present invention.

System/Method Variations

It will be evident to those skilled in the art that there has been described herein an improved method and apparatus for connecting to, and supplying power for, a device or appliance that is protected by certain surge suppression circuits. Although the invention hereof has been described by way of preferred embodiments, it is evident that other adaptations and modifications can be employed without departing from the spirit and scope thereof.

The present invention anticipates a wide variety of variations in the basic theme of construction. The examples presented previously do not represent the entire scope of possible usages. They are meant to cite a few of the almost limitless possibilities. The basic system and method described above may be augmented with a variety of ancillary embodiments, including but not limited to:
  An embodiment wherein the GROUND wire has a larger cross-sectional area than the HOT wire.
  An embodiment wherein the GROUND wire has lower resistance than the HOT wire.
  An embodiment wherein the GROUND wire comprises a metal having a lower resistivity than the material comprising the HOT wire.
  An embodiment wherein the NEUTRAL wire has a larger cross-sectional area than the HOT wire.
  An embodiment wherein the NEUTRAL wire has lower resistance than the HOT wire.
  An embodiment wherein the NEUTRAL wire comprises a metal having a lower resistivity than the material comprising the HOT wire.
  An embodiment wherein the NEUTRAL wire and the GROUND wire are at least two AWG sizes larger in cross-sectional area than the HOT wire.

An embodiment wherein the NEUTRAL wire comprises #12 AWG copper wire, the GROUND wire comprises #12 AWG copper wire, and the HOT wire comprises #14 AWG copper wire.

An embodiment wherein the NEUTRAL wire comprises #10 AWG copper wire, the GROUND wire comprises #10 AWG copper wire, and the HOT wire comprises #12 AWG copper wire.

An embodiment wherein the NEUTRAL wire and the GROUND wire are at least four AWG sizes larger in cross-sectional area than the HOT wire.

An embodiment wherein the NEUTRAL wire comprises #10 AWG copper wire, the GROUND wire comprises #10 AWG copper wire, and the HOT wire comprises #14 AWG copper wire.

An embodiment wherein the HOT wire further comprises a plurality of HOT wires.

An embodiment wherein the SDR output terminal is electrically connected to a TVSS.

An embodiment wherein the NEUTRAL wire load end is electrically connected to a TVSS.

An embodiment wherein the HOT wire source end is electrically connected to a circuit breaker.

An embodiment wherein the HOT wire source end and the NEUTRAL wire source end are electrically connected to a circuit breaker.

An embodiment wherein the SDR output terminal and the NEUTRAL wire load end are electrically connected to corresponding HOT and NEUTRAL connections of an electrical load contained within an appliance chassis and the GROUND wire load end is electrically connected to the appliance chassis.

An embodiment wherein the HOT wire source end, the NEUTRAL wire source end, and the GROUND wire source end are electrically connected to corresponding HOT, NEUTRAL, and GROUND connections of an AC three-prong power plug and the SDR output terminal, the NEUTRAL wire load end, and the GROUND wire load end are electrically connected to corresponding HOT, NEUTRAL, and GROUND connections of a surge protector power strip containing a TVSS.

An embodiment wherein the SDR comprises a resistor having a resistance in the range of 0.01 ohms to 10.0 ohms.

An embodiment wherein the SDR comprises a resistor having a resistance of 0.1 ohms ±10%.

An embodiment wherein the HOT wire, the NEUTRAL wire, and the GROUND wire are surrounded by a polymer jacket.

An embodiment wherein the GROUND wire is insulated.

An embodiment wherein the FSD and the FSV series interconnection, and the SSD and the SSV interconnection are formed in integrated two-terminal device packages incorporating a combined semiconductor P-N junction and MOV structure.

An embodiment wherein the FSD and the FSV series interconnection, and the SSD and the SSV interconnection are formed in integrated three-terminal device packages incorporating a combined semiconductor P-N junction and MOV structure.

An embodiment wherein the PND is oriented such that rectified current flows in the PND from the PND first surface to the PND second surface.

An embodiment wherein the PND is oriented such that rectified current flows in the PND from the PND second surface to the PND first surface.

An embodiment wherein the PND comprises a Schottky barrier diode.

An embodiment wherein the PND comprises a DIAC (diode for alternating current).

An embodiment wherein the PND comprises a SIDAC (silicon diode for alternating current).

An embodiment wherein the MOV comprises zinc oxide (ZnO) interspersed within a ceramic substrate.

An embodiment wherein the BMC, the MOV, the MMC, the PND, and the TMC are cylindrically constructed and concentrically positioned along a common radial axis.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to *In re Beauregard*, 35 USPQ2d 1383 (U.S. Pat. No. 5,710,578), the present invention anticipates and includes this type of computer readable media within the scope of the invention. Pursuant to *In re Nuijten*, 500 F.3d 1346 (Fed. Cir. 2007) (U.S. patent application Ser. No. 09/211,928), the present invention scope is limited to computer readable media wherein the media is both tangible and non-transitory.

CONCLUSION

An electrical wiring system/method implementing transient voltage suppression has been disclosed. The system/method incorporates HOT, NEUTRAL, GROUND wiring in conjunction with a series drop resistor (SDR) on the HOT conductor that supplies current to the load device. Parallel shunting metal oxide varistors (MOVs) are used in conjunction with corresponding shunt diode rectifiers (SDRs) to suppress transients on the HOT conductor to either the GROUND conductor and/or NEUTRAL conductor. The parallel shunting MOV/SDR pairs may be integrated into a singular structure that is encapsulated in an insulating material to permit implementation of the transient protection wiring system/method into electrical loads and common power distribution equipment such as electrical outlets and power strips.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. §112(f) and such claim shall be construed to cover the corresponding structure, material, or acts described in the specification and equivalents thereof.

The phrase "MEANS FOR" specifically invokes the means-plus-function claims limitation recited in 35 U.S.C. 112(f) and such claim shall be construed to cover the corresponding structure, material, or acts described in the specification and equivalents thereof.

The phrase "STEP FOR" specifically invokes the step-plus-function claims limitation recited in 35 U.S.C. §112(f) and such claim shall be construed to cover the corresponding structure, material, or acts described in the specification and equivalents thereof.

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A surge suppressor system comprising:
(a) metal oxide varistor (MOV);
(b) base metal contact (BMC);
(c) middle metal contact (MMC);
(d) top metal contact (TMC);
(e) semiconductor P-N diode (PND);
(f) first component lead (FCL); and
(g) second component lead (SCL);
wherein
said MOV comprises a first surface and a second surface;
said BMC comprises a first surface and a second surface;
said MMC comprises a first surface and a second surface;
said PND comprises a doped semiconducting material having a first surface and a second surface with a semiconductor P-N junction formed between said PND first surface and said PND second surface;
said TMC comprises a first surface and a second surface;
said FCL is coincident with and electrically contacted to said first surface of said BMC;
said MOV first surface is coincident with and electrically contacted to said BMC second surface;
said MOV second surface is coincident with and electrically contacted to said MMC first surface;
said MMC second surface is coincident with and electrically contacted to said PND first surface;
said PND second surface is coincident with and electrically contacted to said TMC first surface;
said SCL is coincident with and electrically contacted to said second surface of said TMC; and
said FCL contact, said SCL contact, said BMC, said MOV, said MMC, said PND, and said TMC, are encapsulated in an insulating material.

2. The surge suppressor system of claim 1 wherein said PND is oriented such that rectified current flows in said PND from said PND first surface to said PND second surface.

3. The surge suppressor system of claim 1 wherein said PND is oriented such that rectified current flows in said PND from said PND second surface to said PND first surface.

4. The surge suppressor system of claim 1 wherein said PND comprises a Schottky barrier diode.

5. The surge suppressor system of claim 1 wherein said PND comprises a DIAC (diode for alternating current).

6. The surge suppressor system of claim 1 wherein said PND comprises a SIDAC (silicon diode for alternating current).

7. The surge suppressor system of claim 1 wherein said MOV comprises zinc oxide (ZnO) interspersed within a ceramic substrate.

8. The surge suppressor system of claim 1 wherein said BMC, said MOV, said MMC, said PND, and said TMC are cylindrically constructed and concentrically positioned along a common radial axis.

9. A surge suppressor system comprising:
(a) bottom metal oxide varistor (BMV);
(b) top metal oxide varistor (TMV);
(c) base metal contact (BMC);
(d) lower metal contact (LMC);
(e) center metal contact (CMC);
(f) upper metal contact (UMC);
(g) top metal contact (TMC);
(h) first semiconductor P-N diode (FPN);
(i) second semiconductor P-N diode (SPN);
(j) first component lead (FCL);
(k) second component lead (SCL); and
(l) center component lead (CCL);
wherein
said BMV comprises a first surface and a second surface;
said TMV comprises a first surface and a second surface;
said BMC comprises a first surface and a second surface;
said CMC comprises a first surface, a second surface, and a center surface;
said LMC comprises a first surface and a second surface;
said FPN comprises a doped semiconducting material having a first surface and a second surface with a semiconductor P-N junction formed between said FPN first surface and said FPN second surface;
said SPN comprises a doped semiconducting material having a first surface and a second surface with a semiconductor P-N junction formed between said SPN first surface and said SPN second surface;
said UMC comprises a first surface and a second surface;
said TMC comprises a first surface and a second surface;
said FCL is coincident with and electrically contacted to said first surface of said BMC;
said FPN first surface is coincident with and electrically contacted to said BMC second surface;
said FPN second surface is coincident with and electrically contacted to said LMC first surface;
said LMC second surface is coincident with and electrically contacted to said BMV first surface;
said BMV second surface is coincident with and electrically contacted to said CMC first surface;
said CMC second surface is coincident with and electrically contacted to said TMV first surface;
said TMV second surface is coincident with and electrically contacted to said UMC first surface;
said UMC second surface is coincident with and electrically contacted to said SPN first surface;
said SPN second surface is coincident with and electrically contacted to said TMC first surface;
said SCL is coincident with and electrically contacted to said second surface of said TMC;
said CCL is coincident with and electrically contacted to said center surface of said CMC; and
said CCL contact, said FCL contact, said SCL contact, said BMC, said BMV, said LMC, said FPN, said CMC, said SPN, said UMC, said TMV, and said TMC, are encapsulated in an insulating material.

10. The surge suppressor system of claim 9 wherein said FPN is oriented such that rectified current flows in said FPN from said FPN first surface to said FPN second surface and said SPN is oriented such that rectified current flows in said SPN from said SPN first surface to said SPN second surface.

11. The surge suppressor system of claim 9 wherein said FPN and said SPN form a P-N-INTRINSIC-P-N semiconductor structure.

12. The surge suppressor system of claim 9 wherein said FPN and said SPN are Schottky barrier diodes.

13. The surge suppressor system of claim 9 wherein said FPN and said SPN are DIACs (diode for alternating current).

14. The surge suppressor system of claim 9 wherein said FPN and said SPN are SIDACs (silicon diode for alternating current).

15. The surge suppressor system of claim 9 wherein said BMV and said TMV comprise zinc oxide (ZnO) interspersed within a ceramic substrate.

16. The surge suppressor system of claim 9 wherein said BMC, said BMV, said LMC, said FPN, said CMC, said SPN, said UMC, said TMV, and said TMC, are cylindrically constructed and concentrically positioned along a common radial axis.

17. A surge suppressor system comprising:
(a) bottom metal oxide varistor (BMV);
(b) top metal oxide varistor (TMV);
(c) base metal contact (BMC);
(d) lower metal contact (LMC);
(e) center metal contact (CMC);
(f) upper metal contact (UMC);
(g) top metal contact (TMC);
(h) first semiconductor P-N diode (FPN);
(i) second semiconductor P-N diode (SPN);
(j) first component lead (FCL);
(k) second component lead (SCL); and
(l) center component lead (CCL);
wherein
said BMV comprises a first surface and a second surface;
said TMV comprises a first surface and a second surface;
said BMC comprises a first surface and a second surface;
said LMC comprises a first surface and a second surface;
said FPN comprises a doped semiconducting material having a first surface and a second surface with a semiconductor P-N junction formed between said FPN first surface and said FPN second surface;
said CMC comprises a first surface, a second surface, and a center surface;
said SPN comprises a doped semiconducting material having a first surface and a second surface with a semiconductor P-N junction formed between said SPN first surface and said SPN second surface;
said UMC comprises a first surface and a second surface;
said TMC comprises a first surface and a second surface;
said FCL is coincident with and electrically contacted to said first surface of said BMC;
said BMV first surface is coincident with and electrically contacted to said BMC second surface;
said BMV second surface is coincident with and electrically contacted to said LMC first surface;
said LMC second surface is coincident with and electrically contacted to said FPN first surface;
said FPN second surface is coincident with and electrically contacted to said CMC first surface;
said CMC second surface is coincident with and electrically contacted to said SPN first surface;
said SPN second surface is coincident with and electrically contacted to said UMC first surface;
said UMC second surface is coincident with and electrically contacted to said TMV first surface;
said TMV second surface is coincident with and electrically contacted to said TMC first surface;
said SCL is coincident with and electrically contacted to said second surface of said TMC;
said CCL is coincident with and electrically contacted to said center surface of said PND; and
said CCL contact, said FCL contact, said SCL contact, said BMC, said BMV, said LMC, said FPN, said CMC, said SPN, said UMC, said TMV, and said TMC, are encapsulated in an insulating material.

18. The surge suppressor system of claim 17 wherein said FPN is oriented such that rectified current flows in said FPN from said FPN first surface to said FPN second surface and said SPN is oriented such that rectified current flows in said SPN from said SPN first surface to said SPN second surface.

19. The surge suppressor system of claim 17 wherein said FPN and said SPN form a P-N-INTRINSIC-P-N semiconductor structure with said CMC electrically coincident with and contacting the INTRINSIC (I) region of said P-N-INTRINSIC-P-N semiconductor structure.

20. The surge suppressor system of claim 17 wherein said FPN and said SPN are Schottky barrier diodes.

21. The surge suppressor system of claim 17 wherein said FPN and said SPN are DIACs (diode for alternating current).

22. The surge suppressor system of claim 17 wherein said FPN and said SPN are SIDACs (silicon diode for alternating current).

23. The surge suppressor system of claim 17 wherein said BMV and said TMV comprise zinc oxide (ZnO) interspersed within a ceramic substrate.

24. The surge suppressor system of claim 17 wherein said BMC, said BMV, said LMC, said FPN, said CMC, said SPN, said UMC, said TMV, and said TMC, are cylindrically constructed and concentrically positioned along a common radial axis.

25. A surge suppressor system comprising:
(a) bottom metal oxide varistor (BMV);
(b) top metal oxide varistor (TMV);
(c) base metal contact (BMC);
(d) lower metal contact (LMC);
(e) center metal contact (CMC);

(f) upper metal contact (UMC);
(g) top metal contact (TMC);
(h) P-N-I-P-N semiconductor diode (PND);
(i) first component lead (FCL);
(j) second component lead (SCL); and
(k) center component lead (CCL);
wherein
said BMV comprises a first surface and a second surface;
said TMV comprises a first surface and a second surface;
said BMC comprises a first surface and a second surface;
said LMC comprises a first surface and a second surface;
said PND comprises a doped semiconducting material having a first surface, a second surface, and a center surface with a semiconductor P-N-INTRINSIC-P-N layered junction formed between said PND first surface and said PNL second surface and said center surface electrically contacting said INTRINSIC region of said semiconductor P-N-INTRINSIC-P-N layered junction;
said UMC comprises a first surface and a second surface;
said TMC comprises a first surface and a second surface;
said FCL is coincident with and electrically contacted to said first surface of said BMC;
said BMV first surface is coincident with and electrically contacted to said BMC second surface;
said BMV second surface is coincident with and electrically contacted to said LMC first surface;
said LMC second surface is coincident with and electrically contacted to said PND first surface;
said PND second surface is coincident with and electrically contacted to said UMC first surface;
said UMC second surface is coincident with and electrically contacted to said TMV first surface;
said TMV second surface is coincident with and electrically contacted to said TMC first surface;
said SCL is coincident with and electrically contacted to said second surface of said TMC;
said CCL is coincident with and electrically contacted to said center surface of said PND; and
said CCL contact, said FCL contact, said SCL contact, said BMC, said BMV, said LMC, said PND, said UMC, said TMV, and said TMC, are encapsulated in an insulating material.

26. The surge suppressor system of claim 25 wherein said BMV and said TMV comprise zinc oxide (ZnO) interspersed within a ceramic substrate.

27. The surge suppressor system of claim 25 wherein said BMC, said BMV, said LMC, said PND, said UMC, said TMV, and said TMC, are cylindrically constructed and concentrically positioned along a common radial axis.

\* \* \* \* \*